(12) United States Patent
Davidson et al.

(10) Patent No.: US 10,937,257 B2
(45) Date of Patent: Mar. 2, 2021

(54) TELEMATICALLY MONITORING AND PREDICTING A VEHICLE BATTERY STATE

(71) Applicant: Geotab Inc., Oakville (CA)

(72) Inventors: Mark Jeffrey Davidson, Alpharetta, GA (US); John Robert Ford Kyes, Burlington (CA); Thomas Arthur Walli, Hamilton (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 16/943,212

(22) Filed: Jul. 30, 2020

(65) Prior Publication Data
US 2020/0357201 A1 Nov. 12, 2020

Related U.S. Application Data

(63) Continuation of application No. 16/225,675, filed on Dec. 19, 2018.
(Continued)

(51) Int. Cl.
| | |
|---|---|
| *G07C 5/08* | (2006.01) |
| *G07C 5/00* | (2006.01) |
| *B60W 50/02* | (2012.01) |
| *G06N 5/04* | (2006.01) |
| *B60L 58/16* | (2019.01) |

(Continued)

(52) U.S. Cl.
CPC ............ *G07C 5/0808* (2013.01); *B60L 58/16* (2019.02); *B60W 50/0205* (2013.01); *G06N 5/046* (2013.01); *G07C 5/006* (2013.01); *G07C 5/008* (2013.01); *G07C 5/08* (2013.01); *G07C 5/085* (2013.01); *G07C 5/0816* (2013.01); *B60N 2/002* (2013.01); *B60W 2050/021* (2013.01);
(Continued)

(58) Field of Classification Search
CPC ........ G07C 5/0808; G07C 5/08; G07C 5/008; G07C 5/085; G07C 5/006; G07C 5/0816; B60W 50/0205; B60W 2050/021; B60L 58/16; G06N 5/046; G06M 7/00; G01S 7/417; B60N 2/002; G05B 23/0283
See application file for complete search history.

(56) References Cited

U.S. PATENT DOCUMENTS

| | | |
|---|---|---|
| 7,164,117 B2 | 1/2007 | Breed et al. |
| 9,342,933 B2 | 5/2016 | Olsen, III et al. |

(Continued)

FOREIGN PATENT DOCUMENTS

| | | |
|---|---|---|
| CN | 106965685 A | 7/2017 |
| EP | 3 038 048 A1 | 6/2016 |

(Continued)

OTHER PUBLICATIONS

U.S. Appl. No. 16/225,550, filed Dec. 19, 2018, Kyes et al.
(Continued)

*Primary Examiner* — Jess Whittington
*Assistant Examiner* — Brian E Yang
(74) *Attorney, Agent, or Firm* — Wolf, Greenfield & Sacks, P.C.

(57) ABSTRACT

Apparatus, device, methods and system relating to a vehicular telemetry environment for monitoring vehicle components and providing indications towards the condition of the vehicle components and providing optimal indications towards replacement or maintenance of vehicle components before vehicle component failure.

10 Claims, 35 Drawing Sheets

Related U.S. Application Data

(60) Provisional application No. 62/627,996, filed on Feb. 8, 2018.

(51) Int. Cl.
*G05B 23/02* (2006.01)
*G06M 7/00* (2006.01)
*B60N 2/00* (2006.01)
*G01S 7/41* (2006.01)

(52) U.S. Cl.
CPC .......... *G01S 7/417* (2013.01); *G05B 23/0283* (2013.01); *G06M 7/00* (2013.01)

(56) References Cited

U.S. PATENT DOCUMENTS

| | | | |
|---|---|---|---|
| 10,713,864 | B2 | 7/2020 | Kyes et al. |
| 10,719,997 | B1 | 7/2020 | Aiello et al. |
| 2005/0046584 | A1 | 3/2005 | Breed |
| 2005/0091642 | A1 | 4/2005 | Miller |
| 2006/0208169 | A1 | 9/2006 | Breed et al. |
| 2007/0028219 | A1 | 2/2007 | Miller et al. |
| 2007/0034009 | A1 | 2/2007 | Pado |
| 2007/0294121 | A1 | 12/2007 | Galt et al. |
| 2009/0177439 | A1 | 7/2009 | Samples et al. |
| 2009/0254240 | A1 | 10/2009 | Olsen, III et al. |
| 2010/0023307 | A1 | 1/2010 | Lee et al. |
| 2010/0269776 | A1 | 10/2010 | Mizuno |
| 2011/0082621 | A1* | 4/2011 | Berkobin ............ B60L 58/10 701/31.4 |
| 2011/0202225 | A1 | 8/2011 | Willis et al. |
| 2011/0202305 | A1 | 8/2011 | Willis et al. |
| 2013/0079964 | A1 | 3/2013 | Sukkarié et al. |
| 2015/0105968 | A1 | 4/2015 | Ho |
| 2015/0154816 | A1 | 6/2015 | Chen et al. |
| 2015/0224845 | A1 | 8/2015 | Anderson et al. |
| 2016/0104123 | A1 | 4/2016 | Viswanath et al. |
| 2016/0308257 | A1 | 10/2016 | Butzmann |
| 2017/0108552 | A1 | 4/2017 | Roumi et al. |
| 2019/0025379 | A1 | 1/2019 | Pajovic et al. |
| 2019/0241092 | A1 | 8/2019 | Kyes et al. |
| 2019/0244440 | A1 | 8/2019 | Kyes et al. |
| 2019/0244441 | A1 | 8/2019 | Kyes et al. |
| 2019/0244442 | A1 | 8/2019 | Kyes et al. |
| 2019/0244445 | A1 | 8/2019 | Kyes et al. |
| 2019/0385385 | A1 | 12/2019 | Davidson |
| 2019/0385386 | A1 | 12/2019 | Davidson |
| 2019/0385387 | A1 | 12/2019 | Davidson |
| 2020/0320804 | A1 | 10/2020 | Davidson et al. |

FOREIGN PATENT DOCUMENTS

| | | | |
|---|---|---|---|
| WO | WO-2009158225 A2 * | 12/2009 | ........... G01R 31/392 |
| WO | WO 2010/011918 A2 | 1/2010 | |
| WO | WO 2019/088830 A1 | 5/2019 | |

OTHER PUBLICATIONS

U.S. Appl. No. 16/225,582, filed Dec. 19, 2018, Kyes et al.
U.S. Appl. No. 16/225,619, filed Dec. 19, 2018, Kyes et al.
U.S. Appl. No. 16/225,675, filed Dec. 19, 2018, Kyes et al.
U.S. Appl. No. 16/854,222, filed Apr. 21, 2020, Kyes et al.
U.S. Appl. No. 17/072,226, filed Oct. 16, 2020, Davidson et al.
U.S. Appl. No. 16/551,910, filed Aug. 27, 2019, Davidson.
U.S. Appl. No. 16/551,956, filed Aug. 27, 2019, Davidson.
U.S. Appl. No. 16/551,977, filed Aug. 27, 2019, Davidson.
EP18206431.1, Jun. 12, 2019, Extended European Search Report.
EP18207004.5, May 20, 2019, Extended European Search Report.
EP18210384.6, Jun. 21, 2019, Extended European Search Report.
EP18212159.0, Jun. 24, 2019, Extended European Search Report.
EP18214003.8, Jun. 26, 2019, Extended European Search Report.
Extended European Search Report for European Application No. 18206431.1, dated Jun. 12, 2019.
Extended European Search Report for European Application No. 18207004.5, dated May 20, 2019.
Extended European Search Report for European Application No. 18210384.6, dated Jun. 21, 2019.
Extended European Search Report for European Application No. 18212159.0, dated Jun. 24, 2019.
Extended European Search Report for European Application No. 18214003.8, dated Jun. 26, 2019.
EP20186186.1, dated Dec. 18, 2020, Extended European Search Report.
EP20186190.3, dated Dec. 18, 2020, Extended European Search Report.
EP20186188.7, dated Dec. 23, 2020, Extended European Search Report.
Extended European Search Report for European Application No. 20186186.1, dated Dec. 18, 2020.
Extended European Search Report for European Application No. 20186190.3, dated Dec. 18, 2020.
Extended European Search Report for European Application No. 20186188.7, dated Dec. 23, 2020.

* cited by examiner

TELEMATICALLY MONITORING AND PREDICTING A VEHICLE BATTERY STATE

This application is a Continuation of U.S. application Ser. No. 16/225,675, filed Dec. 19, 2018, entitled "Telematically Monitoring And Predicting A Vehicle Battery State", and claims the benefit under 35 U.S.C. § 119(e) to U.S. Provisional Application Ser. No. 62/627,996, titled "Telematics Predictive Vehicle Component Monitoring System", filed on Feb. 8, 2018. The entire contents of each of these applications is incorporated herein by reference in its entirety.

TECHNICAL FIELD

The present disclosure generally relates to a system, method and apparatus for fleet management in vehicular telemetry environments. More specifically, the present disclosure relates to monitoring and predicting component maintenance before an actual component failure to maximize maintainability and operational status of a fleet of vehicles thereby avoiding a vehicle breakdown.

BACKGROUND

Maintainability and identification of component failure is an important aspect of fleet management. One past approach is to consider the Mean Time Between Failure engineering data to predict the elapsed time between inherent failures during normal operation of the vehicle. Another past approach is to apply the manufacturer's recommended vehicle maintenance schedule. These past approaches are based upon a running total of mileage or running total of operational time. Simple comparisons of numbers are limited and inconclusive. Comparing a current value with some previous value cannot accurately predict component failure.

One past application of telematics is U.S. Pat. No. 6,609,051 (Ser. No. 09/948,938) issued to Feichter et al on Aug. 19, 2003 for a method and system for condition monitoring of vehicles.

Another past application of telematics is U.S. Pat. No. 8,244,779 (Ser. No. 13/253,599) issued to Borg & Copeland on Aug. 14, 2012 for a method and system for monitoring a mobile equipment fleet. Another past application of telematics is U.S. Pat. No. 9,734,528 (Ser. No. 14/203,619) issued to Gormley on Aug. 15, 2017 for a vehicle customization and personalization activities. Another past application of telematics is U.S. Pat. No. 9,747,626 (Ser. No. 14/582,414) issued to Gormley on Aug. 29, 2017 for a vehicle customization and personalization activities.

SUMMARY

The present disclosure is directed to aspects in a vehicular telemetry environment. A new capability to process historical life cycle vehicle component operational (usage) data and derive parameters to indicate vehicle component operational status may be provided. A new capability for monitoring and predicting vehicle component replacement before actual component failure thereby maximizing maintainability and operational status for each vehicle in a fleet of vehicles may also be provided.

According to a first broad aspect, there is a method to identify real time predictive indicators of operational vehicle component status is provided. The method comprises accessing at least one record of operational component data, the operational component data includes operational values from at least one vehicle component from at least one vehicle, the operational values representative of an operational life cycle use of the at least one vehicle component, the operational values further based upon a measured component event, accessing at least one record of management event data the management event data, containing at least one vehicle component event data point for at least one vehicle, associating the at least one record of operational component data with the at least one record of management event data, filtering the operational component data, deriving from the operational component data at least one signal representative of the measured component event and comparing filtered operational component data and at least one signal prior to the vehicle component event data point with filtered operational component data and at least one signal post the vehicle component event data point thereby identifying real time predictive indicator of operational vehicle component status for real time use in fleet management.

According to a another broad aspect, there is a system to identify parameters indicative of a vehicle component status is provided. The system comprises a telematics hardware device including a processor, memory, firmware and communication capability, a remote device including a processor, memory, software and communications capability, the telematics hardware device monitoring at least one vehicle component from at least one vehicle and logging operational component data of the at least one vehicle component, the telematics hardware device communicating a log of operational component data to the remote device, the remote device accessing at least one record of operational component data, the operational component data including operational values from at least one vehicle component from at least one vehicle, the operational values representative of an operational life cycle use of the at least one vehicle component, the operational values further based upon a measured component event, the remote device further accessing at least one record of management event data, the management event data containing at least one vehicle component event data point for at least one vehicle, the remote device associating the at least one record of operational component data with the at least one record of management event data, the remote device filtering the operational component data and deriving from the operational component data at least one signal representative of the measured component event, the remote device comparing filtered operational component data and at least one signal prior to the vehicle component event data point with filtered operational component data and at least one signal post the vehicle component event data point thereby identifying real time predictive indicators of operational vehicle component status for real time use in fleet management.

In an embodiment, the operational vehicle component status includes life cycle status representative of at least one or more of a new component state, a good component state, a fair component state, a poor component state, a replace component state or a failure component state.

In an embodiment, the operational component data may include data representative of at least one category of fuel and/or air metering, emission control, ignition system control, vehicle idle speed control, transmission control, hybrid propulsion or battery information. In another embodiment, the operational component data may include data based upon at least one of on-board diagnostic fault codes, trouble codes, manufacturer codes, generic codes or vehicle specific codes.

In an embodiment, the operational values from at least one vehicle component may include one or more values representative of thermostat, or temperature sensors, oil sensors, fuel sensors, coolant sensors, transmission fluid sensors, electric motor coolant sensors battery, pressure sensors oil pressure sensors, fuel pressure sensors, crankcase sensors, hydraulic sensors, fuel volume, fuel shut off, camshaft position sensors, crankshaft position sensors, 02 sensors turbocharger sensors, waste gate sensors, air injection sensors, mass air flow sensors, throttle body sensors, air metering sensors, emission sensors throttle position sensors, fuel delivery, fuel timing, system lean, system rich, injectors, cylinder timing, engine speed conditions, charge air cooler bypass, fuel pump sensors, intake air flow control, misfire indications, accelerometer sensors, knock sensors, glow plug sensors, exhaust gas recirculation sensors, air injection sensors, catalytic convertor sensors, evaporative emission sensors, brake sensors, idle speed control sensors, throttle position, air conditioning sensors, power steering sensors, system voltages, engine control module values, starter motor voltage, starter motor current, torque converter sensors, fluid sensors, output shaft speed values, gear position, transfer box, converter status interlock torque values, hybrid batter pack values, cooling fan values and inverter and battery voltages.

In an embodiment, the operational life cycle may include operational values from a new component to a failed component.

In an embodiment, the measured component event is an event that provides a higher operational load within the limits of at least one vehicle component. In another embodiment, the measured component event is a cranking event for at least one vehicle. In another embodiment, the cranking event is detected by sensing a voltage decrease over time followed by an indication of engine RPM. In another embodiment, the cranking event is detected by sensing a voltage decrease over time followed by an indication of vehicle speed. In another embodiment, a detected cranking event creates at least one record of operational component data in the form of a series of battery voltages. In another embodiment, the series of battery voltages may include one or more values indicative of ignition on, starter motor cranking, battery charging and battery recovery.

In an embodiment, filtering determines a moving average of the operational values. In another embodiment, filtering determines a running average of the operational values.

In an embodiment, the at least one signal is determined when a single data point from the operational values is above an upper control limit or below a lower control limit. In another embodiment, the at least one signal is determined when a series of eight consecutive data points from the operational values are between a mean value and an upper control limit or between a mean value and a lower control limit. In another embodiment, the at least one signal is determined when a series of four out of five consecutive data points from the operational values is between a mean value and greater than plus one standard deviation or between the mean value and greater than minus one standard deviation. In another embodiment, the at least one signal is determined when a series of two out of three consecutive data points from the operational values is between a mean value and greater than plus two standard deviation or the mean value and greater than minus two standard deviation. In another embodiment, the cranking event produces lower voltages thereby increasing a number of signals from the measured component event.

In an embodiment, a monitoring indicator framework may be included providing a gauge for identifying the real time predictive indicators of operational vehicle component status. In another embodiment, the monitoring indicator framework may include one or more of a lower control limit, an upper control limit, plus one standard deviation, plus two standard deviation, a mean value, minus one standard deviation and minus two standard deviation derived from the operational component data. In another embodiment, the monitoring indicator framework may include a first zone, the first zone representative of a new component state where the at least one signal includes a mix of "B" signal values and "Y" signal values, the "B" signal values and the "Y" signal values are disposed between a mean value and an upper control limit value. In another embodiment, the monitoring indicator framework may include a second zone, the second zone representative of a good component state wherein the at least one signal includes a mix of "Y" signal values and "O" signal values with a smaller number of "B" signal values, and the "Y" signal values, the "O" signal values and the "B" signal values are predominately disposed between a mean value and an upper control limit value. In another embodiment, the monitoring indicator framework includes a third zone, the third zone representative of a fair component state wherein the at least one signal includes a mix of "Y" signal values, "O" signal values, "B" signal values and "R" signal values, the "Y" signal values and "O" signals values are disposed above and below a mean value, the "B" signal values are below the mean value and above a lower control limit, and the "R" signal values are below the lower control limit. In another embodiment, the monitoring indicator framework includes a fourth zone, the fourth zone representative of a poor component state wherein the at least one signal includes a mix of "Y" signal values, "O" signal values and "B" signal values and the "Y" signal values, "O" signal values and the "B" signal values are disposed between a mean value and a lower control limit. In another embodiment, the monitoring indicator framework includes a fifth zone, the fifth zone representative of a failed component state wherein the at least one signal include "R" signal values and a grouping of "R" signal values disposed below a lower control limit.

In an embodiment, a plurality of signals is above a moving average of the operation component data. In another embodiment, the plurality of signals is on either side of a moving average of the operational component data. In another embodiment, the plurality of signals is below a moving average of the operational component data. In another embodiment, the plurality of signals is initially above a moving average of the operation component data and then above and below a moving average of the operational component data.

In an embodiment, a moving average of the operational component data is between an upper control limit value and a mean value. In another embodiment, a moving average of the operational component data is between plus one standard deviation and minus one standard deviation. In another embodiment a moving average of the operational component data is between the mean value and minus two standard deviation. In another embodiment, a moving average of the operational component data is between minus two standard deviation and plus two standard deviation. In another embodiment, a moving average of the operational component data is between the mean value and plus two standard deviation.

In an embodiment, the operational vehicle component status is replace vehicle component when the real time predictive indicators are a moving average of the operational component data decreasing from a mean value to minus one standard deviation. In another embodiment, the operational vehicle component status is replace vehicle component when the real time predictive indicators are a moving average of the operational component data is decreasing from minus one standard deviation to minus two standard deviation. In another embodiment, the operational vehicle component status is replace vehicle component when the real time predictive indicators are a moving average that reaches minus two standard deviation.

In an embodiment, the real time predictive indicators further include at least one "R" signal value. In another embodiment, the at least one "R" signal value is at a lower control limit. In another embodiment, the at least one "R" signal is below a lower control limit.

In an embodiment, the operational vehicle component status is a new vehicle component when the real time predictive indicators are a moving average between plus one standard deviation and plus two standard deviation. In another embodiment the operational vehicle component status is a good vehicle component when the real time predictive indicators are a moving average between plus one standard deviation and minus two standard deviation. In another embodiment, the operational vehicle component status is a fair vehicle component when the real time predictive indicators are a moving average at or below minus two standard deviation. In another embodiment, the operational vehicle component status is a poor vehicle component when the real time predictive indicators are at least one signal at or below a lower control limit. In another embodiment, the operational vehicle component status is a replace vehicle component when the real time predictive indicators are a moving average rising from minus one standard deviation to above plus one standard deviation followed by a moving average between plus one standard deviation and plus two standard deviation. In another embodiment, the operational vehicle component status is replace vehicle component when the real time predictive indicators are a moving average decreasing from minus one standard deviation towards minus two standard deviation. In another embodiment, the operational vehicle component status is new and the real time predictive indicators are a plurality of signals above and below a moving average the plurality of signals are further above a mean value and below an upper control limit. In another embodiment, the plurality of signals include "B" signal values, "O" signal values and "Y" signal values. In another embodiment, the operational vehicle component status is good and the real time predictive indicators are a plurality of signals above a moving average and below plus one standard deviation and the plurality of signals are predominately "O" signal values and "Y" signal values. In another embodiment, the operational vehicle component status is fair and the real time predictive indicators are a plurality of signals on either side of a decreasing moving average. In another embodiment, the plurality of signals include "Y" signal values and "B" signal values. In another embodiment, the plurality of signals are between a mean value and a lower control limit. In another embodiment, the operational vehicle component status is poor and the real time predictive indicators are a plurality of signals below a lower control limit. In another embodiment, the plurality of signals are "R" signal values.

According to another broad aspect, there is a method to monitor a condition of an operational vehicle component is provided. The method comprises: accessing a sample of operational component data that includes operational data from at least one vehicle, determining operational component parameters from the operational data, the operational component parameters indicative of a current operation of the at least one vehicle component, comparing the sample of operational component parameters with predictive indicator parameters, the predictive indicator parameters predetermined from historical operational life cycle use of at least one other vehicle component, and indicating a condition of the operational vehicle component based upon a comparison of the operational component parameters and the predictive indicator parameters.

According to another broad aspect, there is a system to monitor a condition of an operational vehicle component is provided. The system comprises: a telematics hardware device including a processor, memory, firmware and communications capability, a remote device including a processor memory software and communications capability, the telematics hardware device monitoring at least one vehicle component from at least one vehicle and logging operational component data of the at least one vehicle component, the telematics hardware device communicating a log of operational component data to the remote device, the remote device accessing a sample of operational component data that includes operational data from at least one vehicle component from at least one vehicle, the remote device determining operational component parameters from the operational data, the operational component parameters indicative of a current operation of the at least one vehicle component, the remote device comparing the sample of operational component parameters with predictive indicator parameters, the predictive indicator parameters predetermined from historical operational life cycle use of at least one other vehicle component, and the remote device indicating a condition of the operational vehicle component based upon a comparison of the operational component parameters and the predictive indicator parameters.

In an embodiment, the operational data is a series of at least eight consecutive operational data points from the at least one vehicle component.

In another embodiment, the operational component parameters include a moving average representative of the current operation.

In another embodiment, the operational component parameters include signals representative of the current operation of a vehicle component. The signals may include one or more of "R" signal values, "Y" signal values, "O" signal values and/or signal values.

In another embodiment, the at least one vehicle component includes one or more values representative of thermostat or temperature sensors, oil sensors, fuel sensors, coolant sensors, transmission fluid sensors, electric motor coolant sensors, battery, pressure sensors, oil pressure sensors, fuel pressure sensors, crankcase sensors, hydraulic sensors, fuel volume, fuel shut off, camshaft position sensors, crankshaft position sensors, 02 sensors, turbocharger sensors, waste gate sensors, air injection sensors, mass air flow sensors, throttle body sensors, air metering sensors, emission sensors, throttle position sensors, fuel delivery, fuel timing, system lean, system rich, injectors, cylinder timing, engine speed conditions, charge air cooler bypass, fuel pump sensors, intake air flow control, misfire indications, accelerometer sensors, knock sensors, glow plug sensors, exhaust gas recirculation sensors, air injection sensors, catalytic converter sensors, evaporative emission sensors, brake sensors, idle speed control sensors, throttle position, air conditioning sensors, power steering sensors, system voltages, engine control module values, starter motor voltage, starter motor current, torque converter sensors, fluid sensors, output shaft speed values, gear position, transfer box, converter status, interlock, torque values, hybrid battery pack values, cooling fan values and inverter and battery voltages.

In another embodiment, the predictive indicator parameters include a moving average representative of the historical operational life cycle use of a vehicle component. The predictive indicator parameters may also include a mean representative of the historical operational life cycle use of the vehicle component. The predictive indicator may also include a lower control limit representative of the historical operational life cycle use of the vehicle component. The predictive indicator may also include an upper control limit representative of the historical operational life cycle use of the vehicle component. The predictive indicator may also include a standard deviation representative of the historical operational life cycle use of the vehicle component. In some embodiments, the standard deviation may include plus one standard deviation, plus two standard deviation, minus one standard deviation and minus two standard deviation. In some embodiments, the life cycle use of the vehicle component is from a new component to a failed component. A condition may be one of a new component, a good component, a fair component or a poor component.

In another embodiment, the operational component parameters include a moving average of the operational component data, the predictive indicator parameters include minus one standard deviation and a minus two standard deviation of the operational life cycle data and the moving average is increasing in value between the minus one standard deviation and the minus two standard deviation thereby indicating a new component for the condition of the operational vehicle component.

In another embodiment, the operational component parameters include a moving average of the operational component data, the predictive indicator parameters include a minus one standard deviation and a mean of the operational life cycle data, and the moving average is increasing in value between the minus one standard deviation and the mean thereby indicating a new component for the condition of the operational vehicle component.

In another embodiment, the operational component parameters include a moving average of the operational component data, the predictive indicator parameters include a mean and plus one standard deviation of the operational life cycle data and the moving average is increasing in value between the mean the plus one standard deviation thereby indicating a new component for the condition of the operational vehicle component.

In an embodiment, the operational component parameters further include signals of the operational component data, the predictive indicator parameters include a mean and an upper control limit of the operational life cycle data and the signals are between the mean and the upper control limit. In another embodiment, the operational component parameters further include signals of the operational component data, the predictive indicator parameters include an upper control limit of the operational life cycle data and the signals are between the mean and the upper control limit. In another embodiment, the operational component parameters further include signals of the operational component data, the predictive indicator parameters include an upper control limit of the operational life cycle data and the signals are between the mean and the upper control limit. In another embodiment, the operational component parameters include signals of the operational component data, the predictive indicator parameters include a mean and an upper control limit of the operational life cycle data and the signals are between the plus two standard deviation and the upper control limit thereby indicating anew component for the condition of the operational vehicle component. In some embodiments, the signals include "B" signal values, "Y" signal values and "O" signal values.

In another embodiment, the operational component parameters include a moving average of the operational component data, the predictive indicator parameters include a mean and plus two standard deviation of the operational life cycle data and the moving average is between the mean and the plus two standard deviation of the operational life cycle data and the moving average has a relatively constant slope thereby indicating a good component for the condition of the operational vehicle component. In an embodiment, the operational component parameters include signals of the operational component data and the signals are between the mean and the plus two standard deviation of the operational life cycle data. The signals may include "Y" signal values and "O" signal values. Alternatively, the signals may further include "B" signal values.

In another embodiment, the operational component parameters include a moving average of the operational component data, the predictive indicator parameters include a mean and minus one standard deviation of the operational life cycle data, and the moving average is decreasing in value between the mean and the minus one standard deviation thereby indicating a fair component for the condition of the operational vehicle component. In an embodiment, the operational component parameters include signals of the operational component data, the predictive indicator parameters further include a lower control limit and the signals are between the mean and the loser control limit of the operational life cycle data. The signals may include "O" signal values, "Y" signal values and "B" signal values. The signals may also further include "R" signal values below the lower control limit.

In another embodiment, the operational component parameters include a moving average of the operational component data, the predictive indicator parameters include minus one standard deviation and minus two standard deviation of the operational life cycle data and the moving average is decreasing in value between the minus one standard deviation and minus two standard deviation thereby indicating a fair component for the condition of the operational vehicle component. In an embodiment, the operational component parameters include signals of the operational component data and the predictive indicator parameters further include a mean and a lower control limit and the signals are between the mean and the lower control limit of the operational life cycle data. The signals may include "O" signal values, "Y" signal values and "B" signal values. The signals may further include "R" signal values below a lower control limit.

In another embodiment, the operational component parameters include a moving average and signals of operational component data, the predictive indicator parameters include a mean, minus one standard deviation and a lower control limit and the moving average is decreasing between the mean and the one standard deviation and the signals are below the lower control limit thereby indicating a poor component for the condition of the operational vehicle component. In and embodiment, the signals are "R" signal values.

In another embodiment, the operational component parameters include a moving average and signals of operational component data, the predictive indicator parameters include a minus one standard deviation, minus two standard deviation and a lower control limit and the moving average is decreasing between the one standard deviation and the two standard deviation and the signals are below the lower control thereby indicating a poor component for the condition of the operational vehicle component. In and embodiment, the signals are "R" signal values.

In another broad aspect, there is a method to monitor and provide replacement indications for an operational vehicle component is provided and comprises accessing a sample of operational component data that includes an operational data from at least one vehicle component from at least one vehicle, determining operational component parameters from the operational data, the operational component parameters indicative of a current operation of the at least one vehicle component, comparing the sample of operational component parameters with predictive indicator parameters, the predictive indicator parameters predetermined from historical operational life cycle use of at least one other vehicle component, and indicating a maintenance condition of the operational vehicle component based upon a comparison of said operational component parameters and the predictive indicator parameters.

In another broad aspect, there is a system to monitor and provide replacement indications for an operational vehicle component is provided and comprises a telematics hardware device including a processor, memory, firmware and communications capability, a remote device including a processor memory software and communications capability, the telematics hardware device monitoring at least one vehicle component from at least one vehicle and logging operational component data of the at least one vehicle component, the telematics hardware device communicating a log of operational component data to the remote device, the remote device accessing a sample of operational component data that include an operational data from at least one vehicle component from at least one vehicle, the remote device determining operational component parameters from the operational data, the operational component parameters indicative of a current operation of the at least one vehicle component, the remote device comparing the sample of operational component parameters with predictive indicator parameters, the predictive indicator parameters predetermined from historical operational life cycle use of at least one other vehicle component, and the remote device indicating a maintenance condition of the operational vehicle component based upon a comparison for the operational component parameters and the predictive indicator parameters.

In an embodiment, the operational component parameters include a moving average and signals of the operational component data, the predictive indicator parameters include a mean, minus one standard deviation and a lower control limit, the moving average decreasing from the mean to the minus one standard deviation, the signals including first signals, the first signals between the mean and the lower control limit, the signal including second signals, the second signals below the lower control limit thereby indicating a maintenance condition of replacement warning. The first signals may be above and below a moving average. The first signals may include "O" signal values, "B" signal values and "Y" signal values. The second signals may include "R" signal values.

In an embodiment, the operational component parameters include a moving average and signals of the operational component data, the predictive indicator parameters include a mean, minus one standard deviation, minus two standard deviation and a lower control limit, the moving average decreasing from the minus one standard deviation to the minus two standard deviation, the signals including first signals, the first signals between the mean and the lower control limit, the signal including second signals, the second signals below the lower control limit thereby indicating a maintenance condition of replacement. The first signals may be above and below the moving average. The first signals may include "O" signal values, "B" signal values and "Y" signal values. The second signals may include "R" signal values.

According to another broad aspect, there is a method to assess historical vehicle component maintenance and identify predictive indicators or maintenance events is provided and comprises: accessing a record of operational component data, the operational component data including operational values from a vehicle component from a vehicle, the operational values representative of an operational life cycle use of the vehicle component, the operational values further based upon a measured component event, accessing a record of management event data, the management event data containing a vehicle component event data point for the vehicle, the vehicle component event data point including a date and a maintenance event indication, associating the record of operational component data with the record of management event data, filtering the operational component data, the filtering including a moving average of the operational component data, an upper control limit of the operational component data, plus two standard deviation of the operational component data, plus one standard deviation of the operational component data, a mean of the operational component data, minus one standard deviation of the operational component data, minus two standard deviation of the operational component data and a lower control limit of the operational component data, deriving from the operational component data at least one signal representative of operational use of the vehicle component for the measured component event, comparing filtered operational component data with the at least one signal prior to the vehicle component event data point thereby identifying indicators associated with the maintenance event.

According to another broad aspect, there is a system to assess historical vehicle component maintenance and identify predictive indicators or maintenance events is provided and comprises: a telematics hardware device including a processor, memory, firmware and communications capability, a remote device including a processor memory software and communications capability, the telematics hardware device monitoring at least one vehicle component from at least one vehicle and logging operational component data of the at least one vehicle component, the telematics hardware device communicating a log of operational component data to the remote device, the remote device accessing a record of operational component data, the operational component data including operational values from a vehicle component from a vehicle, the operational values representative of an operational life cycle use of the vehicle component, the operational values further based upon a measured component event, the remote device accessing a record of management event data, the management event data containing a vehicle component event data point for the vehicle, the vehicle component event data point including a date and a maintenance event indication, the remote device associating the record of operational component data with the record of management event data, the remote device filtering the operational component data, the filtering including a moving average of the operational component data, an upper control limit of the operational component data, plus two standard deviation of the operational component data, plus one standard deviation of the operational component data, a mean of the operational component data, minus one standard deviation of the operational component data, minus two standard deviation of the operational component data and a lower control limit of the operational component data, the remote device deriving from the operational component data at least one signal representative of operational use of the vehicle component for the measured component event, the remote device comparing filtered operational component data with the at least one signal prior to the vehicle component event data point thereby identifying indicators associated with the maintenance event indication.

In an embodiment, the maintenance event indication is a component failure and the comparing identifies failure indicators, the failure indicators include at least one of the following indicators: a first failure indicator, the first failure indicator having a decreasing moving average from the mean of the operational component data to the minus one standard deviation of the operational component data, a second failure indicator, the second failure indicator having first signals above and below the decreasing moving average, a third failure indicator, the third failure indicator having second signals below the lower control limit of the operational component data. In one embodiment the first signals include "O" signal values, in another embodiment the first signals include "Y" signal values and in another embodiment the first signals include "B" signal values. In another embodiment the second signals include "R" signal values. In another embodiment the second signals are a plurality of second signals decreasing in value away from the lower control limit of the operational component data.

In another embodiment, the comparing filtered operational component data with the at least one signal includes post the vehicle component event data point and the maintenance event indication is a component replacement and the component replacement was premature, the comparing identifies premature component replacement indicators, the premature component replacement indicators include at least one of the following indicators: a first indicator, the first indicator having a moving average relatively constant between the mean and the plus one standard deviation prior to the vehicle component data point, the first indicator having a moving average increasing in value from the mean to the plus one standard deviation followed by a relatively constant moving average at the plus one standard deviation, a second indicator, the second indicator having signals above the lower control limit, and a third indicator the third indicator having signals above the mean.

In an embodiment, the comparing filtered operational component data with the at least one signal includes post the vehicle component event data point and the maintenance event indication is component maintenance and the comparing identifies component maintenance indicators, the component maintenance indicators include at least one of the following indicators: a first indicator, the first indicator having a moving average relatively constant and above minus two standard deviation prior to the vehicle component data point and a moving average increasing in value post the vehicle component data point and a second indicator, the second indicator having signals above the lower control limit.

In an embodiment, the comparing filtered operational component data with the maintenance event indication is component failure and the comparing identifies indicators for an incorrect data for the maintenance event indication, the indicators include at least one of the following indicators: a first failure indicator, the first failure indicator where the moving average is not decreasing from the mean of the operational component data to the minus one standard deviation of the operational component data, a second failure indicator, the second failure indicator where the first signals are not above and below a decreasing moving average, and a third failure indicator, the third failure indicator where second signals are not below the lower control limit of the operational component data.

In another broad aspect, there is a method of monitoring a battery of a vehicle. The method comprises receiving a plurality of voltage signals indicating a change in voltage of the battery at times associated with a plurality of crankings of a starter motor of the vehicle; determining for each of the plurality of voltage signals, a maximum voltage and a minimum voltage of the voltage signal, to generate a plurality of maximum voltages and a plurality of minimum voltages for a time period, determining a variance in the plurality of minimum voltages for the time period, and generating a prediction of a state of the battery based at least in part on the plurality of maximum voltages, the plurality of minimum voltages and the variance of the plurality of minimum voltages.

In another broad aspect, there is a system of monitoring a battery of a vehicle. The system comprises a telematics hardware device including a processor, memory, firmware and communications capability, a remote device including a processor, memory, software and communications capability, the telematics hardware device monitoring a battery of a vehicle and logging a plurality of voltage signals, the telematics hardware device communicating a log including a plurality of voltage signals, the remote device receiving a plurality of voltage signals indicating a change in voltage of the battery at times associated with a plurality of crankings of a starter motor of the vehicle; the remote device determining, for each of the plurality of voltage signals, a maximum voltage and a minimum voltage of the voltage signal, to generate a plurality of maximum voltages and a plurality of minimum voltages for a time period; the remote device determining a variance in the plurality of minimum voltages for the time period; the remote device generating a prediction of a state of the battery based at least in part on the plurality of maximum voltages, the plurality of minimum voltages, and the variance of the plurality of minimum voltages.

In an embodiment, wherein receiving the plurality of voltage signals comprises receiving the plurality of voltage signals via a vehicle telematics system of the vehicle. In another embodiment, wherein generating the prediction of the state of the battery comprises generating a prediction of whether and/or when the battery is likely to fail. IN another embodiment, wherein generating the prediction of the state of the battery comprises generating a prediction of whether and/or when the battery is likely to fail based at least in part on an environmental condition. In another embodiment, wherein the environmental condition is temperature.

These and other aspects and features of non-limiting embodiments are apparent to those skilled in the art upon review of the following detailed description of the non-limiting embodiments and the accompanying drawings. Further, it should be appreciated that the foregoing concepts, and additional concepts discussed below, may be arranged in any suitable combination, as the present disclosure is not limited in this respect.

BRIEF DESCRIPTION OF THE DRAWINGS

Exemplary non-limiting embodiments are described with reference to the accompanying drawings in which.

Figure 1:
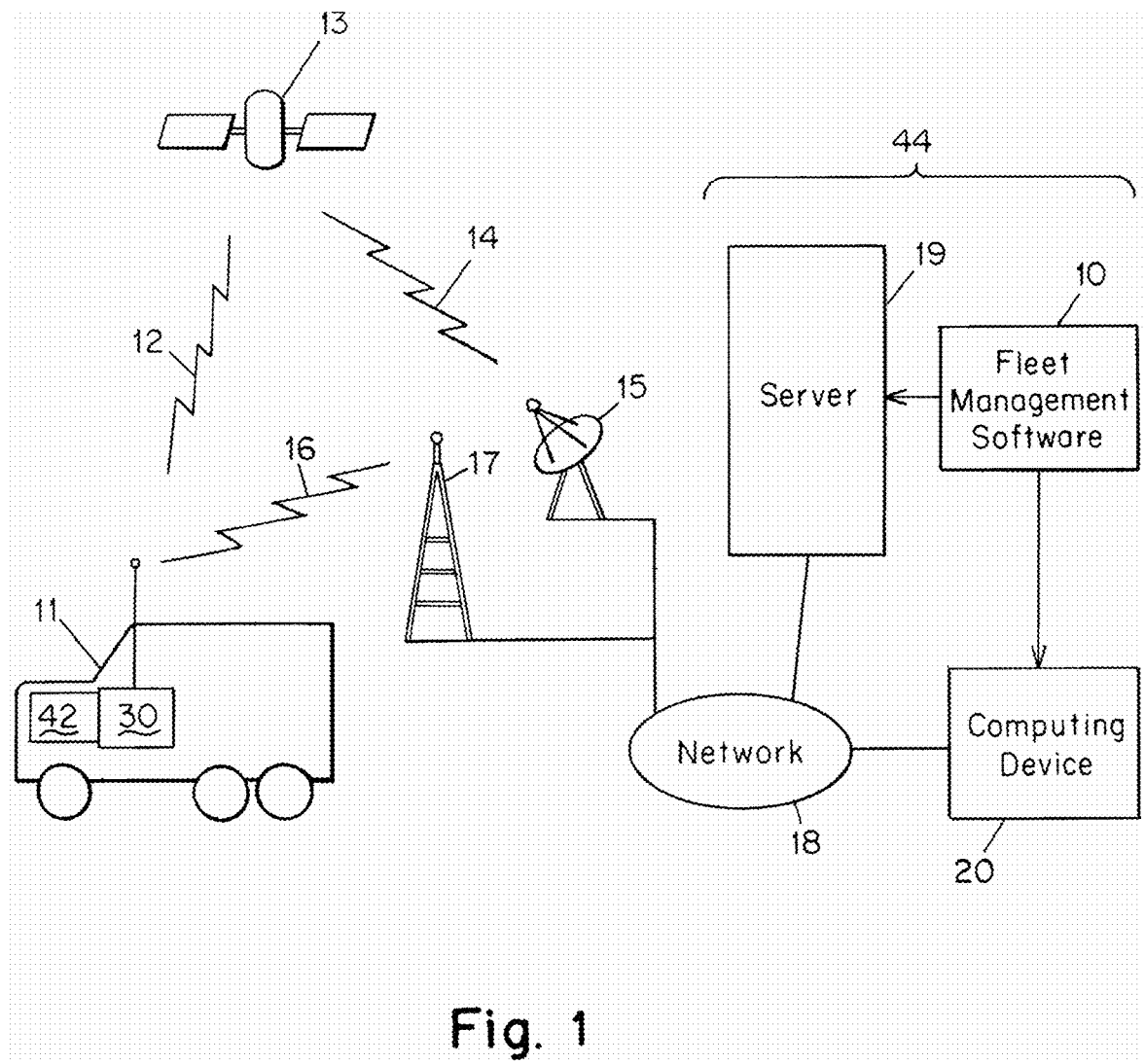
FIG. 1 is a high level diagrammatic view of a vehicular telemetry data environment and infrastructure.

The drawings are not necessarily to scale and are diagrammatic representations of the exemplary non-limiting embodiments of the present invention.

DETAILED DESCRIPTION

Described herein are techniques for monitoring operational components of vehicle, including electrical components and other components of a vehicle, to generate information on a state of an operational component over time and to generate a prediction of whether and/or when an operational component is likely to fail. In some embodiments, for each operational component that is monitored in this manner, one or more signals, generated by the operational component during an event that corresponds to a particular operation of the operational component, are monitored and characteristic values of the operational parameter(s) generated by the component during the event are determined (e.g., through statistical analysis of the signals) and used in generating the prediction of whether and/or when the operational component is likely to fail. The prediction generated in this manner may be reliably used to determine whether and when to perform maintenance on a vehicle, to repair or replace the operational component before failure.

Such techniques for generating predictions of whether and/or when an operational component is likely to fail may be advantageous in some environments. Conventionally, there was no reliable way to predict when an operational component would fail. Manufacturers often publish information on their products, including "mean time between failure" (MTBF) information, that may indicate when the manufacturer expects a failure might occur. Unfortunately, this product information is wholly unreliable. Manufacturers tend to be very cautious in setting these product life estimates. This not only mitigates the risk of a product unexpectedly failing earlier than predicted, which may lead to a product owner suffering inconvenience from a product failure, but also encourages purchase of replacement products early, which may benefit the manufacturer as over time more products are purchased than otherwise would be. However, while early replacement benefits the manufacturer, early replacement is an unnecessary expense to a product owner. When a product owner owns hundreds or thousands of vehicles, over time, early and unnecessary replacement of parts can add up to a substantial cost, potentially millions of dollars, as compared to timely replacement.

Additionally, past approaches generated such product lifespan estimates using assumptions related to normal operation of a vehicle based upon a pre-established set of operating conditions, which may include operational criteria for a vehicle. In reality, vehicles are typically operated outside of such pre-established operating conditions such as, for example, a range of altitudes from sea-level to several thousand feet above sea-level, extreme cold temperatures, extreme hot temperatures, on highly rough roads causing significant vibration, and in mountainous terrains or flat terrains as well as other operational criteria. Vehicles may also be operated through four seasons that create four distinct operational environments. Operating a vehicle outside of normal operating conditions impacts the frequency and time between failure. Of course, few vehicles may have been operated perfectly within the assumptions that underlay the product lifespan estimates, undermining the reliability of the estimates for (or even making the estimates useless for, in some cases) real-world purposes.

Given the unreliability of manufacturer estimates, owners of such fleets of vehicles have therefore, conventionally, attempted to generate their own approximate predictions of failures of operational components, based primarily on time since an operational component was installed. Fleet owners are well aware, however, that this is also notoriously unreliable. Particularly when a fleet is used over a wide geographic area (e.g., a whole country), different vehicles in a fleet may encounter vastly different operating conditions, such as different environmental factors, road conditions, different operating styles that may yield different characteristics of vehicle operation (e.g., greater acceleration, greater speed, harder braking, etc.), different distances traveled, different loads carried, or other factors that influence operation of the vehicle. When there is significant variation in operating conditions, there may be significant variation in life span of operational components of a vehicle, including the operating conditions discussed in the preceding paragraph. Accordingly, while fleet owners may create a maintenance schedule for their vehicles to repair or replace operational components, such a schedule may not reliably predict failures in individual vehicles. Vehicles may therefore experience failures prior to a planned maintenance, which can significantly increase costs for fleet owners that may need to tow a vehicle to be repaired, repair the vehicle, make arrangements for transporting people and/or cargo that had been being transported by the failed vehicle, and accommodate schedule delays from the change in transportation of the people/cargo. These may be significant costs. As a result, as with manufacturer estimates, some fleet owners may replace operational components earlier than may be needed, which has its own substantial costs, as discussed above.

This lack of reliable prediction systems for failure or deterioration of vehicle operational components has presented difficulties to vehicle fleet operators for decades, and costs such fleet owners millions of dollars. The inventors have recognized and appreciated that there would be significant advantages for fleet owners if a reliable form of prediction could be offered.

The inventors recognized and appreciated the advantages that would be offered by a reliable prediction system that would monitor a vehicle and operational components of a vehicle in real time, during use of the vehicle, to generate a prediction specific to that vehicle and specific to that time. Such a system that generates a prediction unique to each vehicle would have advantages over systems that generate information on average lifespans of products, given the significant inter-vehicle variation mentioned above, resulting from differences in operating conditions, including differences in operating environments.

The inventors have further recognized and appreciated that such an analysis may be conducted using data generated by vehicular telemetry systems of vehicles. Vehicular telemetry systems may include a hardware device to monitor and log a range of vehicle parameters, component parameters, system parameters and sub-system parameters in real time. An example of such a device is a Geotab® GO™ device available from Geotab, Inc. of Oakville, Ontario Canada (www.geotab.com). The Geotab® GO™ device interfaces to the vehicle through an on-board diagnostics (OBD) port to gain access to the vehicle network and engine control unit. Once interfaced and operational, the Geotab® GO™ device monitors the vehicle bus and creates of log of raw vehicle data. The Geotab® GO™ device may be further enhanced through an I/O expander (also available from Geotab, Inc.) to access and monitor other variables, sensors, devices, components, systems and subsystems resulting in a more complex and larger log of raw data. Additionally, the Geotab® GO™ device may further include a GPS capability for tracking and logging raw GPS data. The Geotab® GO™ device may also include an accelerometer for monitoring and logging raw accelerometer data. The Geotab® GO™ o device may also include a capability to monitor atmospheric conductions such as temperature and altitude. The inventors thus recognized and appreciated that vehicle telemetry systems may collect types of data that, if combined with analysis techniques that analyze the data in a particular manner, could be used to generate a reliable prediction of whether and/or when an operational component will fail.

However, the inventors additionally recognized and appreciated that, when monitoring an operational component of a vehicle, that operational component may demonstrate significant variability in the signals generated by the operational component and that would be monitored. Such variability presents an impediment to establishing clear analyses that could be used to determine whether a component is deteriorating or failing. For example, while an operational component under ideal operating conditions may, while failing, generate an operational parameter having a particular value, under non-ideal operating conditions that same component might produce an operational parameter that appears similar to that value associated with a failure, even when the operational component is not failing. Even for operational components that do not typically experience such a wide swing in values between conditions, the impact of variation in operating conditions introduces noise into a signal that substantially complicates analysis and prediction.

Generation of a reliable real-time prediction is further complicated by effects of other operational components of the vehicle on a monitored operational component. In some events in which an operational component may be used, the operational component may interact with one or more other operational components of the vehicle. The failure or deterioration of these other operational components may affect operational parameters generated by the operational component being monitored. This impact could cause signals to be generated by the monitored operational component that appear as if the operational component is deteriorating or failing, even in the case that the operational component is not deteriorating or failing. Similarly, deterioration or failure of an operational component could be masked by its interaction with other operational components, or it may be difficult to determine which operational component is deteriorating or failing.

The inventors have thus recognized and appreciated that, in some embodiments, monitoring operating conditions of an operational component may aid in generating a reliable prediction of whether and/or when an operational component will fail, or aid in increasing reliability of such a prediction. Such operating conditions may include environmental conditions, such as conditions in which a vehicle is being operated, including climate or weather conditions (temperature, humidity, altitude, etc.), characteristics of vehicle operation (e.g., characteristics of acceleration, speed, braking, etc.), distance traveled, loads carried, road conditions, or other factors that influence operation of the vehicle. Operating conditions of an operational component may additionally or alternatively include information on other operational components of the vehicle, or of maintenance performed on operational components. Signals generated by an operational component may be contextualized by that operating condition information. The contextualization may aid in generating reliable predictions of deterioration or failure, such as by eliminating potential noise or environment-triggered variation in operational parameters.

Variation in operation signals may additionally be accounted for, or mitigated, in some embodiments by monitoring operational components through generation of statistical values that characterize operational parameters generated by an operational component over time. Such statistical values may characterize an operational parameter in various ways, including describing a maximum value of a signal over a time period, a minimum value of a signal over a time period, an average value of a signal over a time period, a change in a signal over a time period, a variance of a signal over a time period, or other value that may be calculated from a statistical analysis of an operational parameter over time. Different time periods may be used for calculating different statistical values. For example, some statistical values may be calculated from an analysis of values of an operational parameter generated during a time period corresponding to one or more events in which the operational component performed an action, or interacted with other operational components of the vehicle to collectively perform an action.

The inventors have further recognized and appreciated that additional complexity may be introduced into monitoring of an operation component by the number of different operational parameters that may be generated by an operational component, and the number of statistical analyses that can be performed on these different operational parameters over time. As mentioned in the preceding paragraph, in some embodiments, operational parameters generated by an operational component specific to an event may be monitored and used to generate statistical values. Such an event may correspond to an action performed by one or more operational components of the vehicle. Over time, some operational components may perform multiple different actions, and thus there may be a large number of events that could be monitored. An operational component may engage in each action in a different way, or each action may have a different impact on an operational component. As a result, different operational parameters may be generated. Moreover, when different operational parameters are generated, there may be different characteristics of the operational parameter that would be associated with proper operation, deterioration, or failure of the operational component. These different characteristics may be reflected in different statistical analyses. Accordingly, identifying, even for one operational component, a manner in which to analyze operational parameters to predict whether and/or when the operational component may fail is complex.

The inventors have recognized and appreciated that by monitoring a large group of vehicles, with the same or similar operation components, over time, in different operating conditions, and collecting different operation signals over time, may enable selection of one or more particular events to monitor for an operational component, and particular statistical analyses to perform of operational parameters generated during the event(s). Operational parameters collected for operation components of the large group of vehicles may be analyzed, together with information on events that occurred at times the operation signals were generated, to determine events and changes in operational parameters that are correlated with deterioration or failure of an operational component. For example, events and changes in operational parameters that are correlated to different states of an operational component may be determined from the analysis. Based on identified correlations, one or more events to monitor and one or more statistical analysis to perform on operational parameters generated during the event(s) may be determined. By identifying the event(s) and statistical analysis(es), a prediction process may be created based on the event(s) and the statistical analysis(es) that leverages the correlation and can generate a prediction of a state of an operation component when operational parameters from such an event are detected. More particularly, for example, when a statistical analysis of operational parameters from an event satisfy one or more conditions that, based on the analysis of the operational parameters for the large group of vehicles, is correlated with a deterioration of an operational component, the prediction process may determine that the operational component is deteriorating. As another example, when a statistical analysis of operational parameters from an event satisfy one or more conditions that, based on the analysis of the operational parameters for the large group of vehicles, is correlated with a failure of an operational component, the prediction process may determine that the operational component is failing.

Accordingly, described herein are techniques for collecting and analyzing one or more operational parameters generated by one or more operational components during an event, and based on an analysis of the one or more operational parameters, generating a prediction of whether and/or when a particular operational component will deteriorate or fail. Some techniques described herein may be used to determine, from an analysis of the operational parameters, a current state of an operational component, which may characterize how current operation of the operational component compares to operation of the operational component when new (e.g., whether the operational component has become "broken in," or has begun deteriorating, or has significantly deteriorated, or other suitable states that characterize a status of an operational component).

In some such embodiments, operational parameters generated by a first operational component for which a prediction is generated may be contextualized in the analysis with other information. Such other information may include operational parameters generated by one or more other operational components at a time (e.g., during an event) that the operational parameters of the first operational component were generated. Such other information may additionally or alternatively include information on operating conditions of the vehicle. Such other information may additionally or alternatively include information on a maintenance schedule of a vehicle and/or an operational component, such as past completed maintenance (including repair or replacement) and planned future maintenance.

In some embodiments, the vehicle may be a truck and the operational component may be a battery. Clearly, a battery is used over a long period of time and in connection with a large number of events. Operational parameters may be generated by the battery throughout this time, and corresponding to any of the large number of events. Additionally, a large number of different statistical analyses could be performed on these operational parameters. The inventors recognized and appreciated, however, that operational parameters generated during a particular type of event may be useful in generating a prediction of whether the battery is deteriorating or failing, or when the battery will fail. Moreover, the inventors recognized and appreciated that analyzing such operational parameters in the context of particular statistical analyses, rather than analyzing the operational parameters directly, would yield reliable information on a state of the battery that may be useful in predicting whether and/or when the battery will deteriorate or fail.

In particular, the inventors recognized and appreciated that a starter motor event generates operational parameters that may be advantageously used in determining a status of a battery, and that evaluating a minimum and maximum voltage during a starter motor event and a variance of such minimum voltages during starter motor events over time, may be advantageous in generating a reliable prediction of whether and/or when the battery will fail. The inventors also recognized and appreciated that other components and parameters in association with the starter motor event may be beneficial to determining the status of a battery such as air temperature, oil temperature, coolant temperature, road conditions (vibrations detected by an accelerometer) and altitudes.

During a starter motor event, the starter motor will draw energy from the battery. An operational parameter may be generated by the battery, or by a sensor that operates with the battery, that indicates a voltage of the battery over a time corresponding to the event. The event may last from a time that energy starts being drawn from the battery for the starter motor through a time that the engine of the vehicle has been successfully started and an alternator is supplying electrical energy to the battery. Over this time, the voltage of the battery may drop before rising again once the battery is being charged by the alternator. The operational parameters for this event may indicate a voltage of the battery over time, demonstrating the drop and then rise in voltage. A statistical analysis may be performed for a starter motor event to identify a maximum and minimum value of the voltage during the starter motor event. In addition, a statistical analysis may be performed for multiple starter motor events to calculate, over a period of time (e.g., a number of starter motor events), a variance on the maximum and/or minimum voltage from individual starter motor events. An analysis of these maximum and minimum voltages and variances may be used to identify a state of the battery at a particular time, which describes how operation of the battery at the time compares to operation of the battery when new. The state of the battery may be useful in generating a prediction of whether and/or when the battery may fail, such as by identifying lifespans of batteries in each of the states.

It should be appreciated that embodiment described herein may be used in connection with any of a variety of vehicles and operational components of a vehicle. Embodiments are not limited to operating in connection with any particular operational component, any particular type of operational component, or any particular type of vehicle. Accordingly, while an example was given above of how the system may be used in connection with an operational component that is a battery of a truck, and that example is used occasionally below to illustrate how a particular technique may be implemented in some embodiments, it should be appreciated that the example is merely illustrative and that other embodiments may operate with other operational components or other vehicles. Accordingly, while specific examples of embodiments are described below in connection with FIGS. 1-36, it should be appreciated that embodiments are not limited to operating in accordance with the examples and that other embodiments are possible.

Vehicular Telemetry Environment & Raw Data Logging

Referring to FIG. 1 of the drawings, there is illustrated one embodiment of a high level overview of a vehicular telemetry environment and infrastructure. There is at least one vehicle generally indicated at 11. The vehicle 11 includes a vehicular telemetry hardware system 30 and a resident vehicular portion 42. Optionally connected to the telemetry hardware system 30 is at least one intelligent I/O expander 50 (not shown in FIG. 1). In addition, there may be at least one wireless communication module such as Bluetooth® wireless communication module 45 (not shown in FIG. 1) for communication with at least one of the vehicular telemetry hardware system 30 or the intelligent I/O expander 50.

The vehicular telemetry hardware system 30 monitors and logs a first category of raw telematics data known as vehicle data. The vehicular telemetry hardware system 30 may also log a second category of raw telematics data known as GPS coordinate data and may also log a third category of raw telematics data known as accelerometer data.

The intelligent I/O expander 50 may also monitor a fourth category of raw expander data. A fourth category of raw data may also be provided to the vehicular telemetry hardware system 30 for logging as raw telematics data.

The Bluetooth® wireless communication module 45 may also be in periodic communication with at least one beacon such as Bluetooth® wireless communication beacon 21 (not shown in FIG. 1). The at least one Bluetooth® wireless communication beacon may be attached or affixed or associated with at least one object associated with the vehicle 11 to provide a range of indications concerning the objects. These objects include, but are not limited to packages, equipment, drivers and support personnel. The Bluetooth® wireless communication module 45 provides this fifth category of raw object data to the vehicular telemetry hardware system 30 either directly or indirectly through an intelligent I/O expander 50 for subsequent logging as raw telematics data.

Persons skilled in the art appreciate the five categories of data are illustrative and only one or a suitable combination of categories of data or additional categories of data may be provided. In this context, a category of raw telematics data is a grouping or classification of a type of similar data. A category may be a complete set of raw telematics data or a subset of the raw telematics data. For example, GPS coordinate data is a group or type of similar data. Accelerometer data is another group or type of similar data. A log may include both GPS coordinate data and accelerometer data or a log may be separate data. Persons skilled in the art also appreciate the makeup, format and variety of each log of raw telematics data in each of the categories is complex and significantly different. The amount of data in each of the categories is also significantly different and the frequency and timing for communicating the data may vary greatly. Persons skilled in the art further appreciate the monitoring, logging and the communication of multiple logs or raw telematics data results in the creation of raw telematics big data.

The vehicular telemetry environment and infrastructure also provides communication and exchange of raw telematics data, information, commands, and messages between the at least one server 19, at least one computing device 20 (remote devices such as desktop computers, hand held device computers, smart phone computers, tablet computers, notebook computers, wearable devices and other computing devices), and vehicles 11. In one example, the communication 12 is to/from a satellite 13. The satellite 13 in turn communicates with a ground-based system 15 connected to a computer network 18. In another example, the communication 16 is to/from a cellular network connected to the computer network 18. Further examples of communication devices include Wi-Fi® wireless communication devices and Bluetooth® wireless communication devices connected to the computer network 18.

Computing device 20 and server 19 with corresponding application software communicate over the computer network 18 may be provided. In an embodiment, the myGeotab™ fleet management application software runs on a server 19. The application software may also be based upon Cloud computing. Clients operating a computing device 20 communicate with the myGeotab™ fleet management application software running on the server 19. Data, information, messages and commands may be sent and received over the communication environment and infrastructure between the vehicular telemetry hardware system 30 and the server 19.

Data and information may be sent from the vehicular telemetry hardware system 30 to the cellular network 17, to the computer network 18, and to the at least one server 19. Computing devices 20 may access the data and information on the servers 19. Alternatively, data, information, and commands may be sent from the at least one server 19, to the network 18, to the cellular network 17, and to the vehicular telemetry hardware system 30.

Data and information may also be sent from vehicular telemetry hardware system to an intelligent I/O expander 50, to a satellite communication device such as an Iridium® satellite communication device available from Iridium Communications Inc. of McLean, Va., USA, the satellite 13, the ground based station 15, the computer network 18, and to the at least one server 19. Computing devices 20 may access data and information on the servers 19. Data, information, and commands may also be sent from the at least one server 19, to the computer network 18, the ground based station 15, the satellite 13, the satellite communication device, to an intelligent I/O expander 50, and to a vehicular telemetry hardware system.

The methods or processes described herein may be executed by the vehicular telemetry hardware system 30, the server 19 or any of the computing devices 20. The methods or processes may also be executed in part by different combinations of the vehicular telemetry hardware system 30, the server 19 or any of the computing devices 20.

Vehicular Telemetry Hardware System Overview

Figure 2A:
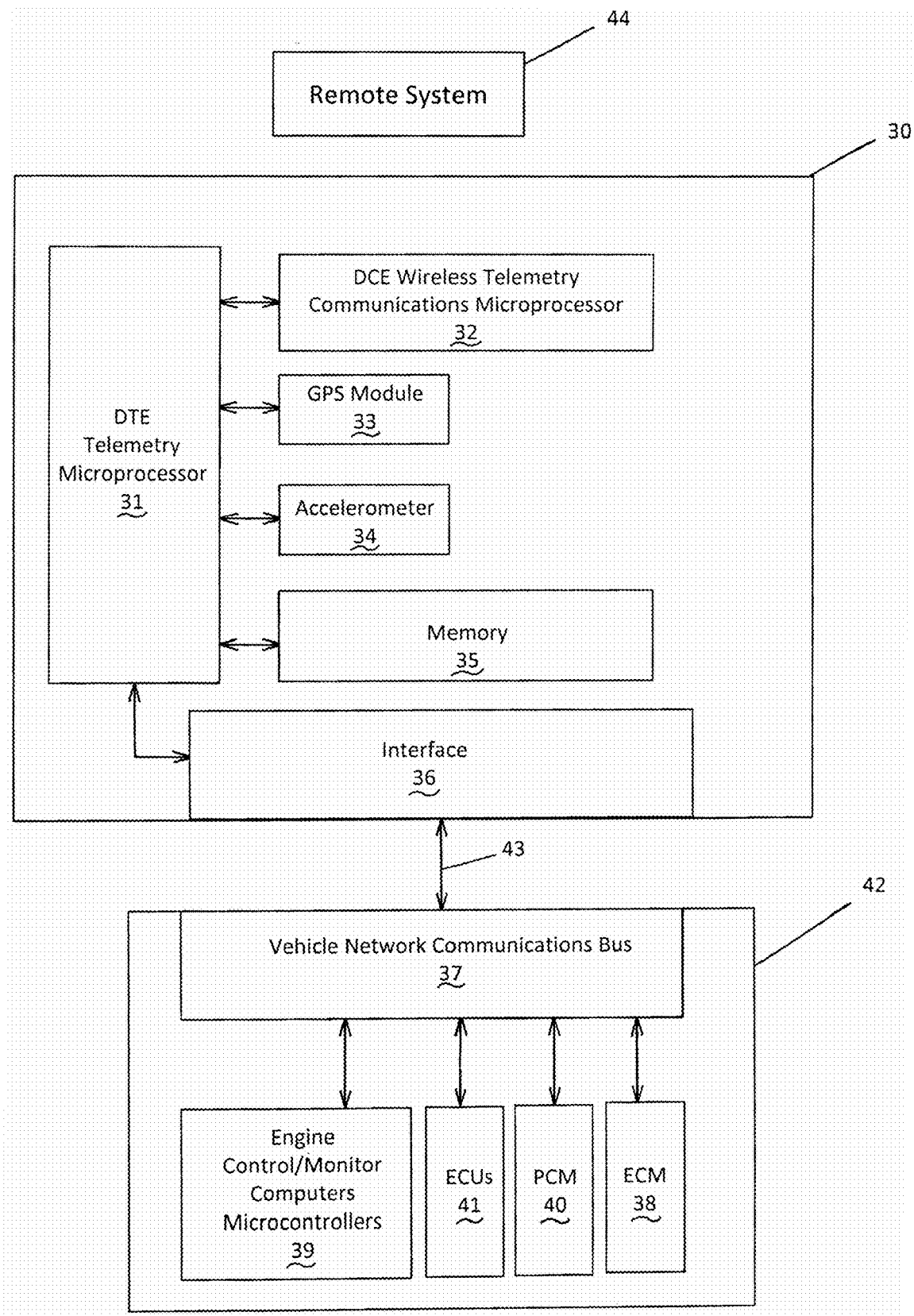
FIG. 2a is a diagrammatic view of a vehicular telemetry hardware system including an on-board portion and a resident vehicular portion.

Referring now to FIG. 2a of the drawings, there is illustrated a vehicular telemetry hardware system generally indicated at 30. The on-board portion generally includes: a DTE (data terminal equipment) telemetry microprocessor 31; a DCE (data communications equipment) wireless telemetry communications microprocessor 32; a GPS (global positioning system) module 33; an accelerometer 34; a non-volatile memory 35; and provision for an OBD (on board diagnostics) interface 36 for communication 43 with a vehicle network communications bus 37.

The resident vehicular portion 42 generally includes: the vehicle network communications bus 37; the ECM (electronic control module) 38; the PCM (power train control module) 40; the ECUs (electronic control units) 41; and other engine control/monitor computers and microcontrollers 39.

While the system is described as having an on-board portion 30 and a resident vehicular portion 42, it is also understood that this could be either a complete resident vehicular system or a complete on-board system.

The DTE telemetry microprocessor 31 is interconnected with the OBD interface 36 for communication with the vehicle network communications bus 37. The vehicle network communications bus 37 in turn connects for communication with the ECM 38, the engine control/monitor computers and microcontrollers 39, the PCM 40, and the ECU 41.

The DTE telemetry microprocessor 31 has the ability through the OBD interface 36 when connected to the vehicle network communications bus 37 to monitor and receive vehicle data and information from the resident vehicular system components for further processing.

As a brief non-limiting example of a first category of raw telematics vehicle data and information, the list may include one or more of but is not limited to: a VIN (vehicle identification number), current odometer reading, current speed, engine RPM, battery voltage, cranking event data, engine coolant temperature, engine coolant level, accelerator pedal position, brake pedal position, various manufacturer specific vehicle DTCs (diagnostic trouble codes), tire pressure, oil level, airbag status, seatbelt indication, emission control data, engine temperature, intake manifold pressure, transmission data, braking information, mass air flow indications and fuel level. It is further understood that the amount and type of raw vehicle data and information will change from manufacturer to manufacturer and evolve with the introduction of additional vehicular technology.

Continuing now with the DTE telemetry microprocessor 31, it is further interconnected for communication with the DCE wireless telemetry communications microprocessor 32. In an embodiment, an example of the DCE wireless telemetry communications microprocessor is a Leon 100™, which is commercially available from u-blox Corporation of Thalwil, Switzerland (www.u-blox.com). The Leon 100™ wireless telemetry communications microprocessor provides mobile communications capability and functionality to the vehicular telemetry hardware system 30 for sending and receiving data to/from a remote site 44. A remote site 44 could be another vehicle or a ground based station. The ground-based station may include one or more servers 19 connected through a computer network 18 (see FIG. 1). In addition, the ground-based station may include computer application software for data acquisition, analysis, and sending/receiving commands to/from the vehicular telemetry hardware system 30.

The DTE telemetry microprocessor 31 is also interconnected for communication to the GPS module 33. In an embodiment, an example of the GPS module 33 is a Neo-5™ also commercially available from u-blox Corporation. The Neo-5™ provides GPS receiver capability and functionality to the vehicular telemetry hardware system 30. The GPS module 33 provides the latitude and longitude coordinates as a second category of raw telematics data and information.

The DTE telemetry microprocessor 31 is further interconnected with an external non-volatile memory 35. In an embodiment, an example of the memory 35 is a 32 MB non-volatile memory store commercially available from Atmel Corporation of San Jose, Calif., USA. The memory 35 is used for logging raw data.

The DTE telemetry microprocessor 31 is further interconnected for communication with an accelerometer 34. An accelerometer (34) is a device that measures the physical acceleration experienced by an object. Single and multi-axis models of accelerometers are available to detect the magnitude and direction of the acceleration, or g-force, and the device may also be used to sense orientation, coordinate acceleration, vibration, shock, and falling. The accelerometer 34 provides this data and information as a third category of raw telematics data.

In an embodiment, an example of a multi-axis accelerometer (34) is the LIS302DLTN MEMS Motion Sensor commercially available from STMicroelectronics of Geneva, Switzerland. The LIS302DL™ integrated circuit is an ultra compact low-power three axes linear accelerometer that includes a sensing element and an IC interface able to take the information from the sensing element and to provide the measured acceleration data to other devices, such as a DTE Telemetry Microprocessor (31), through an I2C/SPI (Inter-Integrated Circuit) (Serial Peripheral Interface) serial interface. The LIS302DLTN integrated circuit has a user-selectable full-scale range of +-2 g and +-8 g, programmable thresholds, and is capable of measuring accelerations with an output data rate of 100 Hz or 400 Hz.

In an embodiment, the DTE telemetry microprocessor 31 also includes an amount of internal memory for storing firmware that executes in part, methods to operate and control the overall vehicular telemetry hardware system 30. In addition, the microprocessor 31 and firmware log data, format messages, receive messages, and convert or reformat messages. In an embodiment, an example of a DTE telemetry microprocessor 31 is a PIC24H™ microcontroller commercially available from Microchip Technology Inc. of Westborough, Mass., USA.

Figure 2B:
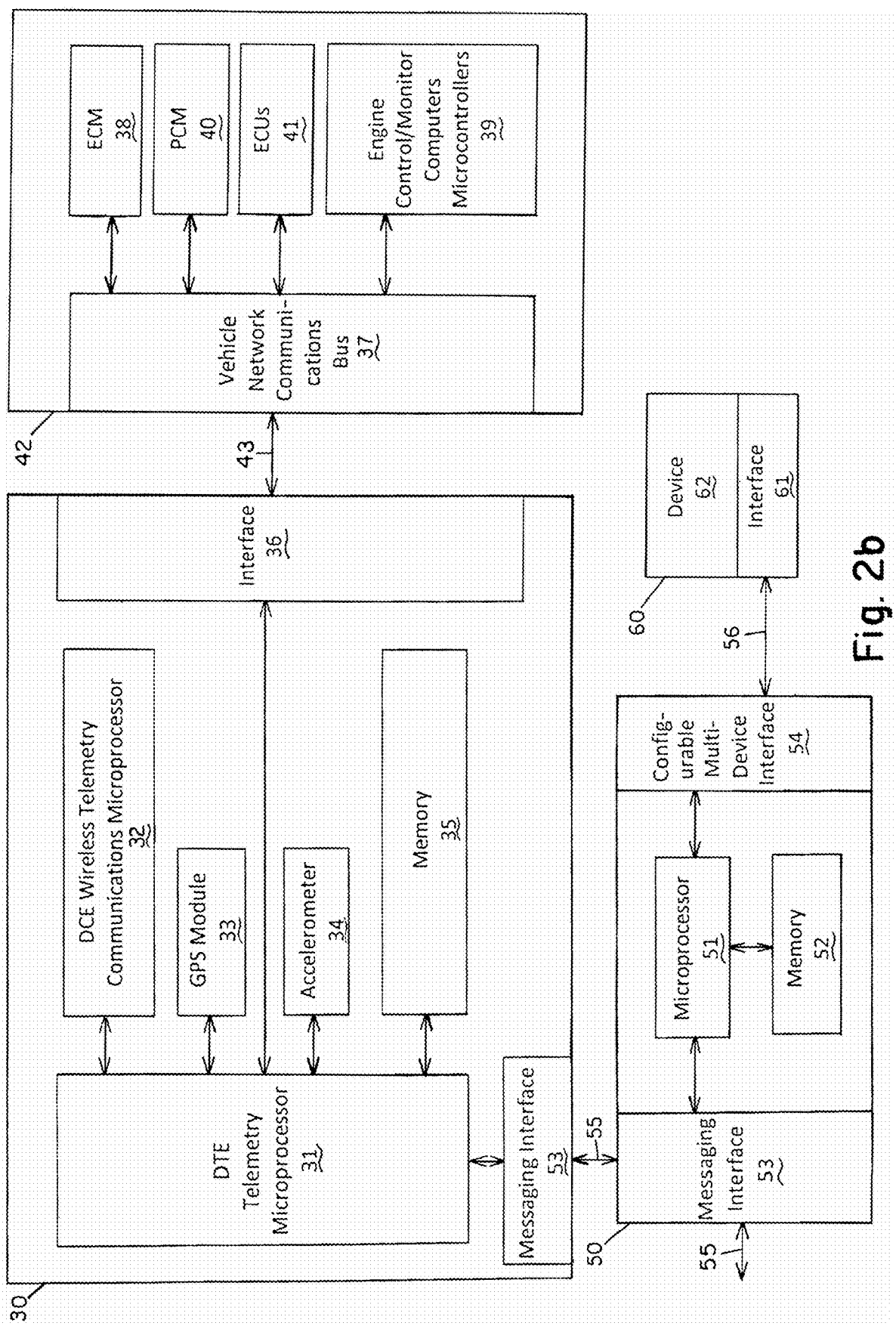
FIG. 2b is a diagrammatic view of a vehicular telemetry hardware system communicating with at least one intelligent I/O expander.

Referring now to FIG. 2b of the drawings, there is illustrated a vehicular telemetry hardware system generally indicated at 30 further communicating with at least one intelligent I/O expander 50. In this embodiment, the vehicular telemetry hardware system 30 includes a messaging interface 53. The messaging interface 53 is connected to the DTE telemetry microprocessor 31. In addition, a messaging interface 53 in an intelligent I/O expander may be connected by the private bus 55. The private bus 55 permits messages to be sent and received between the vehicular telemetry hardware system 30 and the intelligent I/O expander, or a plurality of I/O expanders (not shown). The intelligent I/O expander hardware system 50 also includes a microprocessor 51 and memory 52. Alternatively, the intelligent I/O expander hardware system 50 includes a microcontroller 51. A microcontroller includes a CPU, RAM, ROM and peripherals. Persons skilled in the art appreciate the term processor contemplates either a microprocessor and memory or a microcontroller in all embodiments of the disclosed hardware (vehicle telemetry hardware system 30, intelligent I/O expander hardware system 50, wireless communication module 45 (FIG. 2c) and wireless communication beacon 21 (FIG. 2c)). The microprocessor 51 is also connected to the messaging interface 53 and the configurable multi-device interface 54. In an embodiment, a microcontroller 51 is an LPC1756™ 32 bit ARM Cortec-M3 device with up to 512 KB of program memory and 64 KB SRAM, available from NXP Semiconductors Netherlands B.V., Eindhoven, The Netherlands. The LPC1756™ also includes four UARTs, two CAN 2.0B channels, a 12-bit analog to digital converter, and a 10 bit digital to analog converter. In an alternative embodiment, the intelligent I/O expander hardware system 50 may include text to speech hardware and associated firmware (not illustrated) for audio output of a message to an operator of a vehicle 11.

The microprocessor 51 and memory 52 cooperate to monitor at least one device 60 (a device 62 and interface 61) communicating with the intelligent I/O expander 50 over the configurable multi device interface 54 through bus 56. Data and information from the device 60 may be provided over the messaging interface 53 to the vehicular telemetry hardware system 30 where the data and information is retained in the log of raw telemetry data. Data and information from a device 60 associated with an intelligent I/O expander provides the 4$^{th}$ category of raw expander data and may include, but not limited to, traffic data, hours of service data, near field communication data such as driver identification, vehicle sensor data (distance, time), amount and/or type of material (solid, liquid), truck scale weight data, driver distraction data, remote worker data, school bus warning lights, and doors open/closed.

Figure 2C:
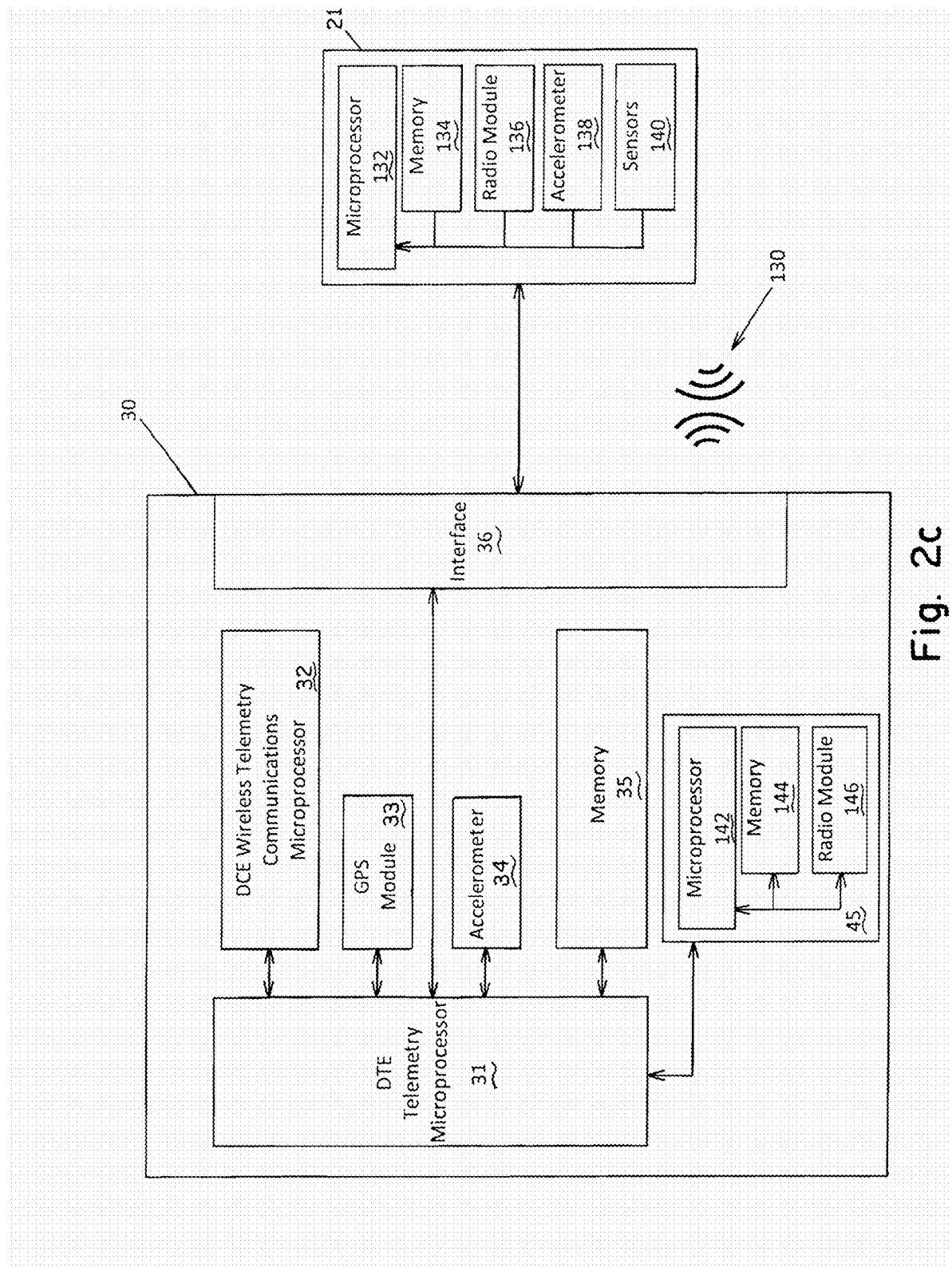
FIG. 2c is a diagrammatic view of a vehicular telemetry hardware system with an integral wireless communication module capable of communication with at least one beacon module.
Figure 2D:
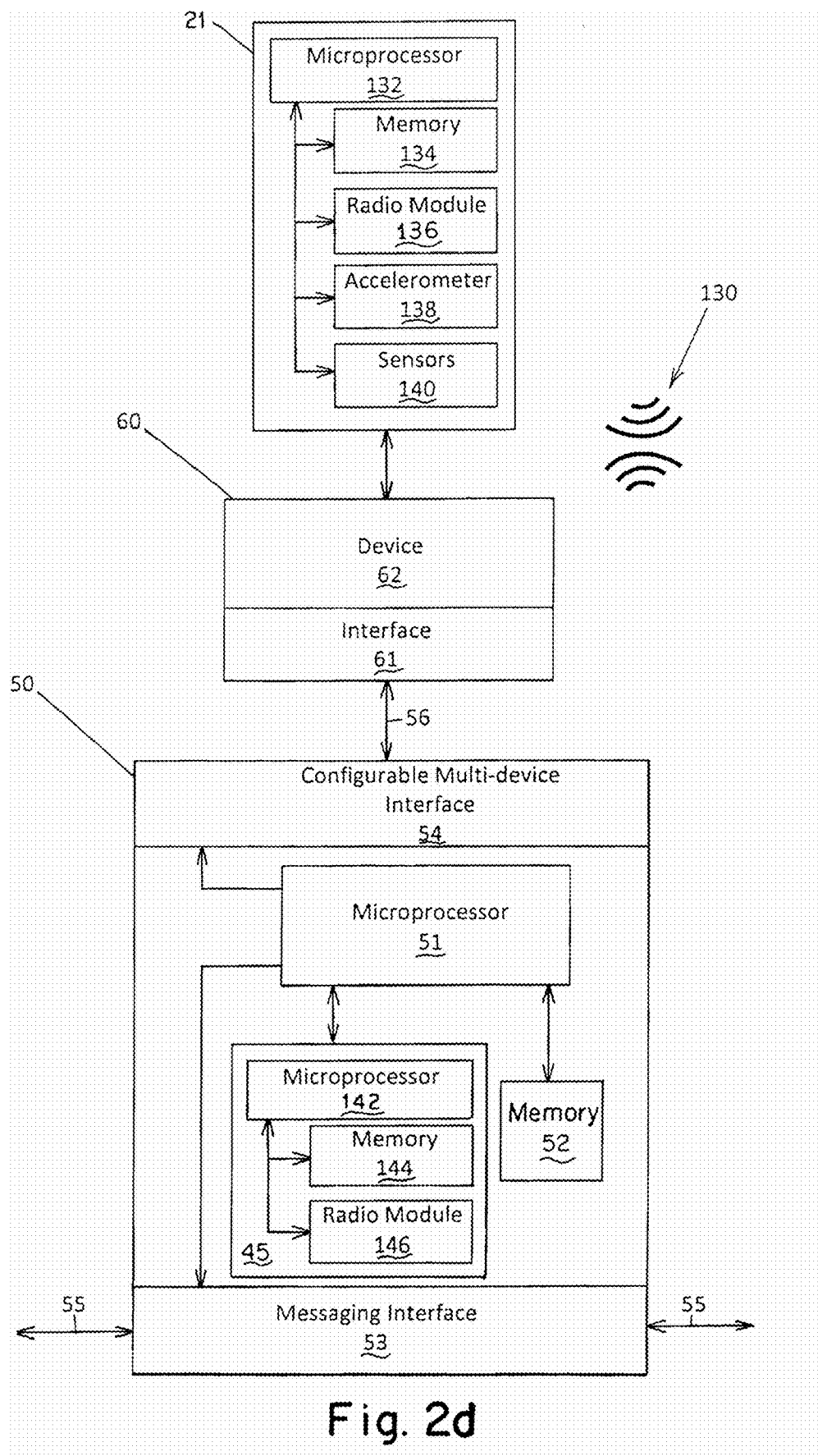
FIG. 2d is a diagrammatic view of at least on intelligent I/O expander with an integral wireless communication module capable of communication with at least one beacon module.
Figure 2E:
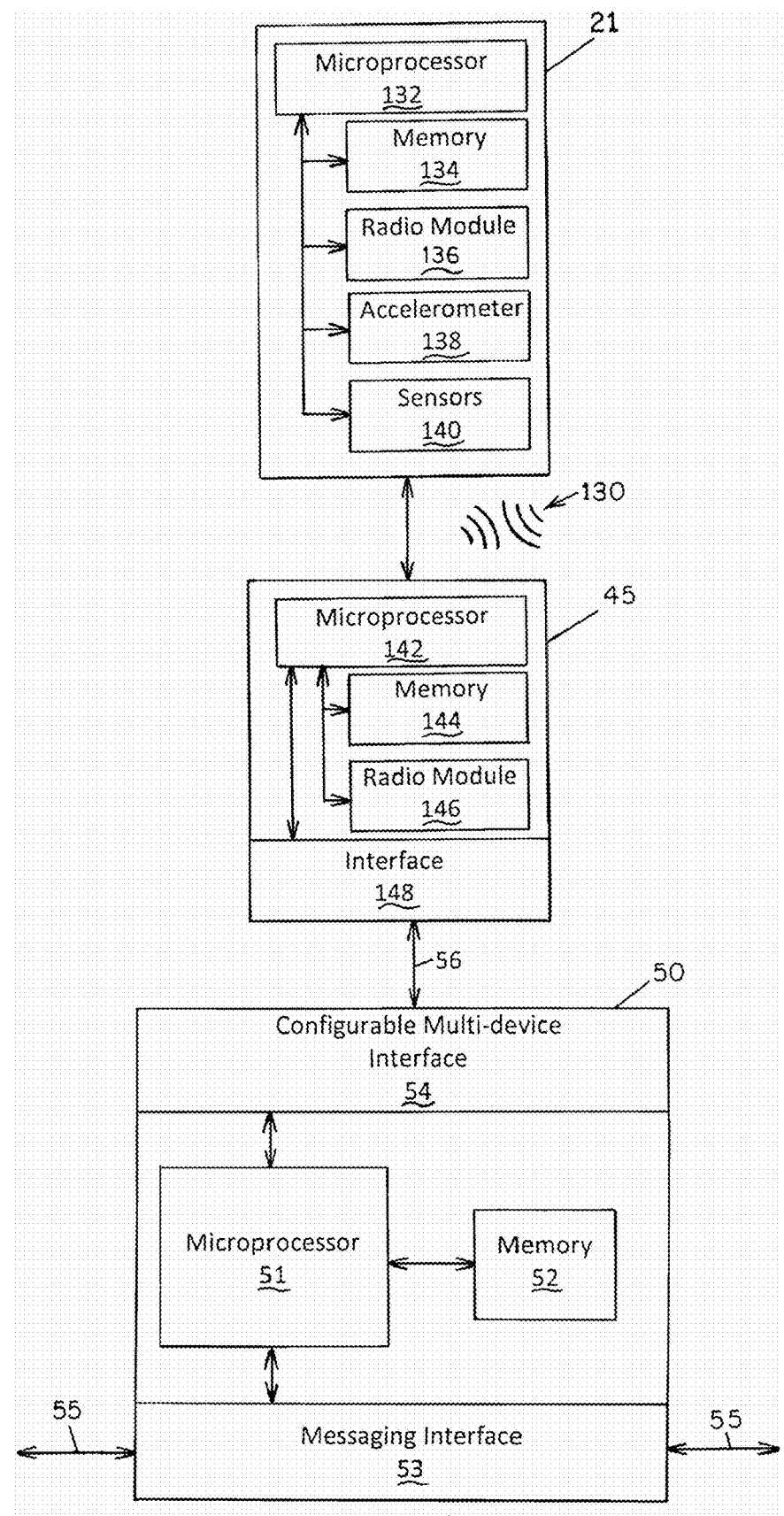
FIG. 2e is a diagrammatic view of an intelligent I/O expander and device capable of communication with at least one beacon module.

Referring now to FIGS. 2c, 2d and 2e, there are three alternative embodiments relating to the Bluetooth® wireless communication module 45 and Bluetooth® wireless communication beacon 21 for monitoring and receiving the 5th category of raw beacon data. The module 45 includes a microprocessor 142, memory 144 and radio module 146. The microprocessor 142, memory 144 and associated firmware provide monitoring of beacon data and information and subsequent communication of the beacon data, either directly or indirectly through an intelligent I/O expander 50, to a vehicular telemetry hardware system 30.

In an embodiment, the module 45 is integral with the vehicular telemetry hardware system 30. Data and information is communicated 130 directly from the beacon 21 to the vehicular telemetry hardware system 30. In an alternate embodiment, the module 45 is integral with the intelligent I/O expander. Data and information is communicated 130 directly to the intelligent I/O expander 50 and then through the messaging interface 53 to the vehicular telemetry hardware system 30. In another alternate embodiment, the module 45 includes an interface 148 for communication 56 to the configurable multi-device interface 54 of the intelligent I/O expander 50. Data and information is communicated 130 directly to the module 45, then communicated 56 to the intelligent I/O expander and finally communicated 55 to the vehicular telemetry hardware system 30.

Data and information from a beacon 21, such as the Bluetooth® wireless communication beacon provides the 5th category of raw telemetry data and may include data and information concerning an object associated with the beacon 21. In one embodiment, the beacon 21 is attached to the object. This data and information includes, but is not limited to, object acceleration data, object temperature data, battery level data, object pressure data, object luminance data and user defined object sensor data. This 5th category of data may be used to indicate, among others, damage to an article or a hazardous condition to an article.

Telematics Predictive Component Failure

Aspects disclosed herein relate to monitoring and optimally predicting replacement or maintenance of a vehicle component before failure of the component. Aspects disclosed herein also relate to monitoring and optimally predicting replacement of an electrical or electronic vehicle component before failure of the electrical component. By way of an example only, the vehicle component may be a vehicle battery.

Figure 3:
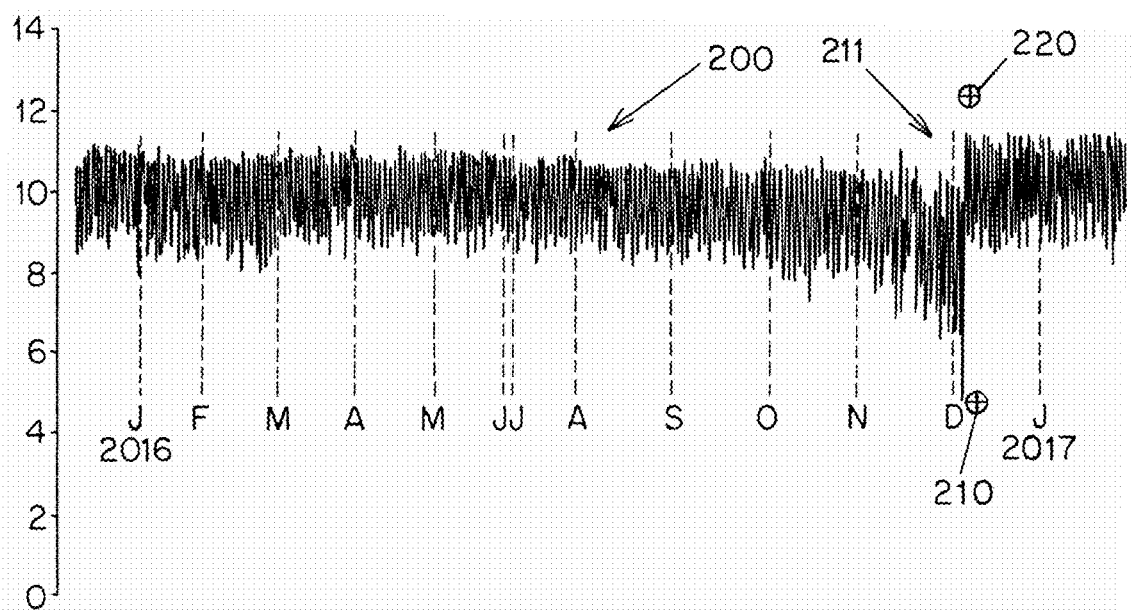
FIG. 3 is a diagrammatic view of raw vehicle component data over a period of time illustrating raw data representative of the vehicle component useful life correlated with an event such as vehicle component failure or vehicle component maintenance.

FIG. 3 illustrates a historical sample of raw big telematics data 200 over a 14-month period of time. The sample is based upon a collection of multiple logs of data from the vehicular telemetry hardware system 30. The sample pertains to the use of a vehicle component over the useful life of the vehicle component from a new installation, normal use, failure and replacement. The sample of raw big telematics data 200 included 552 vehicle breakdowns based upon failure of a vehicle component. The raw big telematics data 200 reveals operational parameters around the process of vehicle component use and failure over several months of useful life. The raw big telematics data, or historical records of data, is obtained from at least one telematics hardware systems in the form of a log of data that is communicated to a remote site.

The y-axis is values of operational parameters for a vehicle component based upon a type of vehicle component event 211. For example, the y-axis may be operational parameters for a vehicle battery during a starter motor cranking event where electrical energy is supplied by the vehicle battery to start an engine and then electrical energy is provided back to the vehicle battery to replenish the energy used by the starter motor cranking event (see FIG. 33 and FIG. 34). The x-axis is values relating to time over the life cycle of the vehicle component, for example days, months and years. In an embodiment, the raw big telematics data 200 illustrates the maximum and minimum values for vehicle component battery voltages for numerous starter motor cranking events. The raw big telematics data 200 has two distinct patterns or trends on either side of a vehicle component event 211 where this event may be either one of a failure event 210 or a maintenance event 220 with respect to the vehicle component. The pattern prior to a vehicle component event 211 includes a large or wide and increasing variation of values on the y-axis (see FIG. 4 and FIG. 5). The pattern post a vehicle component event 211 is a small or more narrow variation of values on the y-axis.

Figure 4:
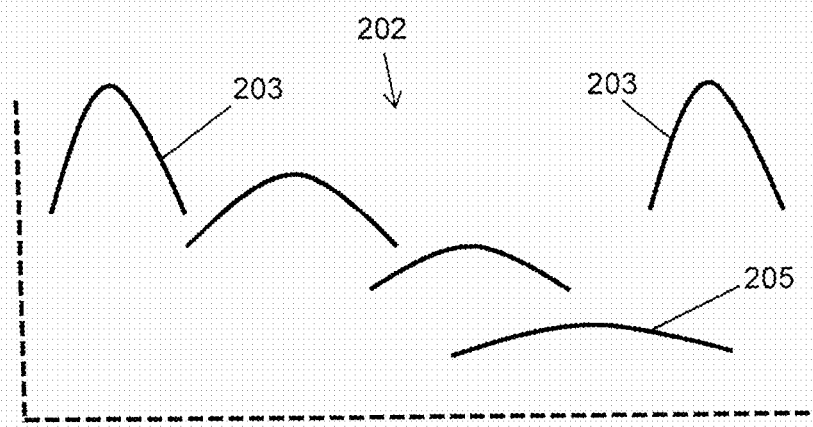
FIG. 4 is a diagrammatic view of a series of normal distributions of raw vehicle component data varying over the useful life of the vehicle component illustrating the distributions of a new vehicle component, a depreciating vehicle component and a failed vehicle component.
Figure 5:
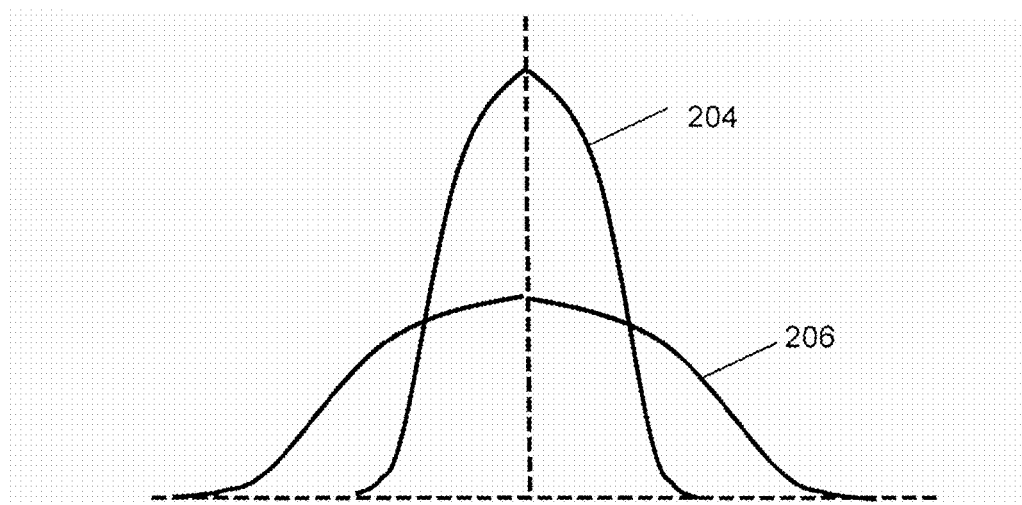
FIG. 5 is a diagrammatic view of a normal distribution for a new vehicle component compared to a normal distribution for a failed vehicle component.

Referring now to FIG. 4, a number of average values and variances over the useful life of a vehicle component are generally indicated at 202. The average values and variances derived from the historical record of raw big telematics data 200 reveals distinct operational patterns during the useful life of a vehicle component. A new vehicle component has operational parameters 203 that tend to have properties that are notably different to the operational parameters of a failed vehicle component 205. In the extreme, the magnitude of the new vehicle component operational parameters 203 is substantially higher than the magnitude of a failed vehicle component operational parameters 205 and the variance of new vehicle component operational parameters 203 is substantially more narrow than the variance of failed vehicle component operational parameters 203.

Figure 33:
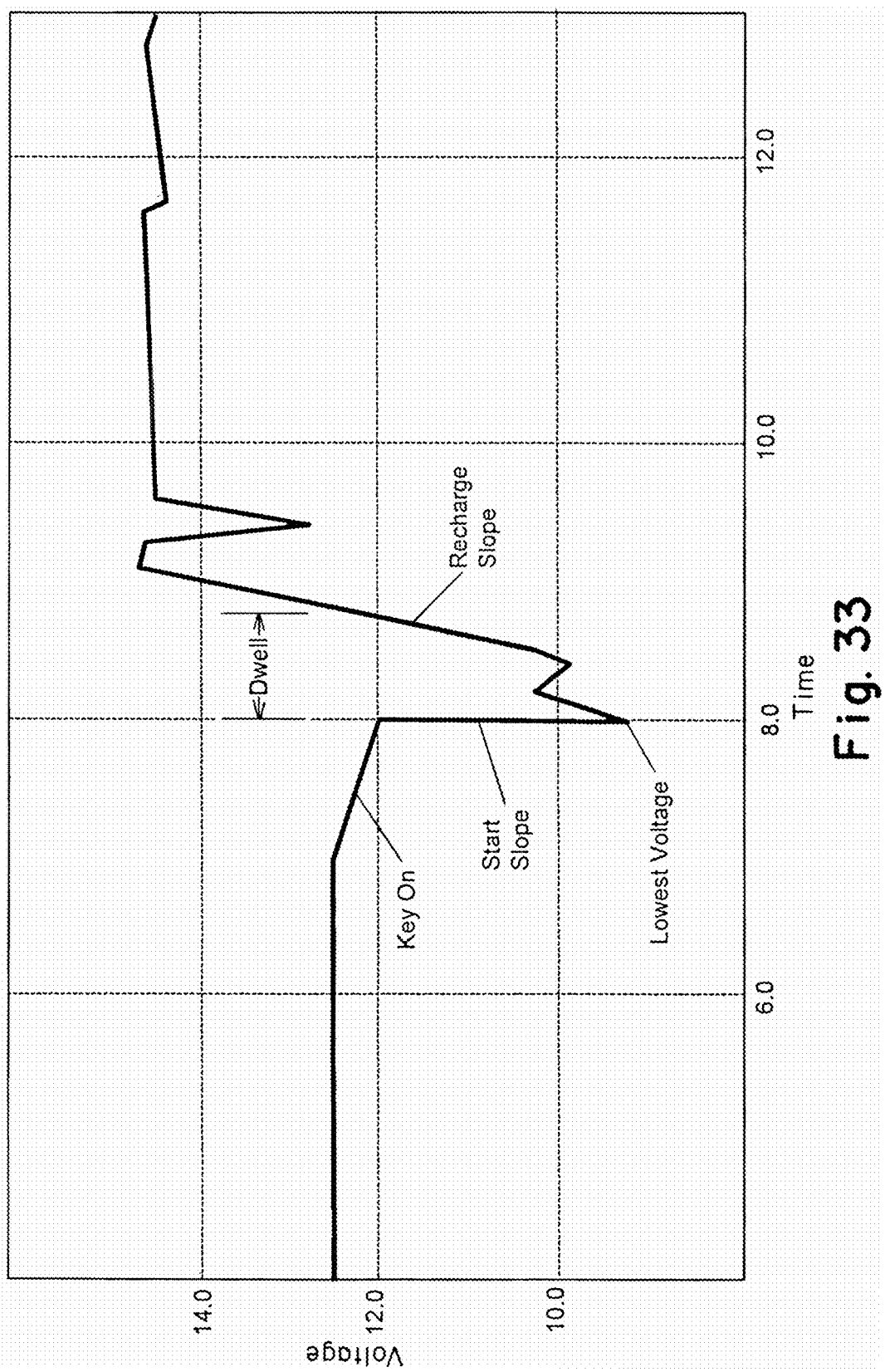
FIG. 33 is a diagrammatic view of a voltage curve from a good battery based upon a vehicle cranking event illustrating the battery voltage drop, dwell time and recovery slope to recharge the battery.
Figure 34:
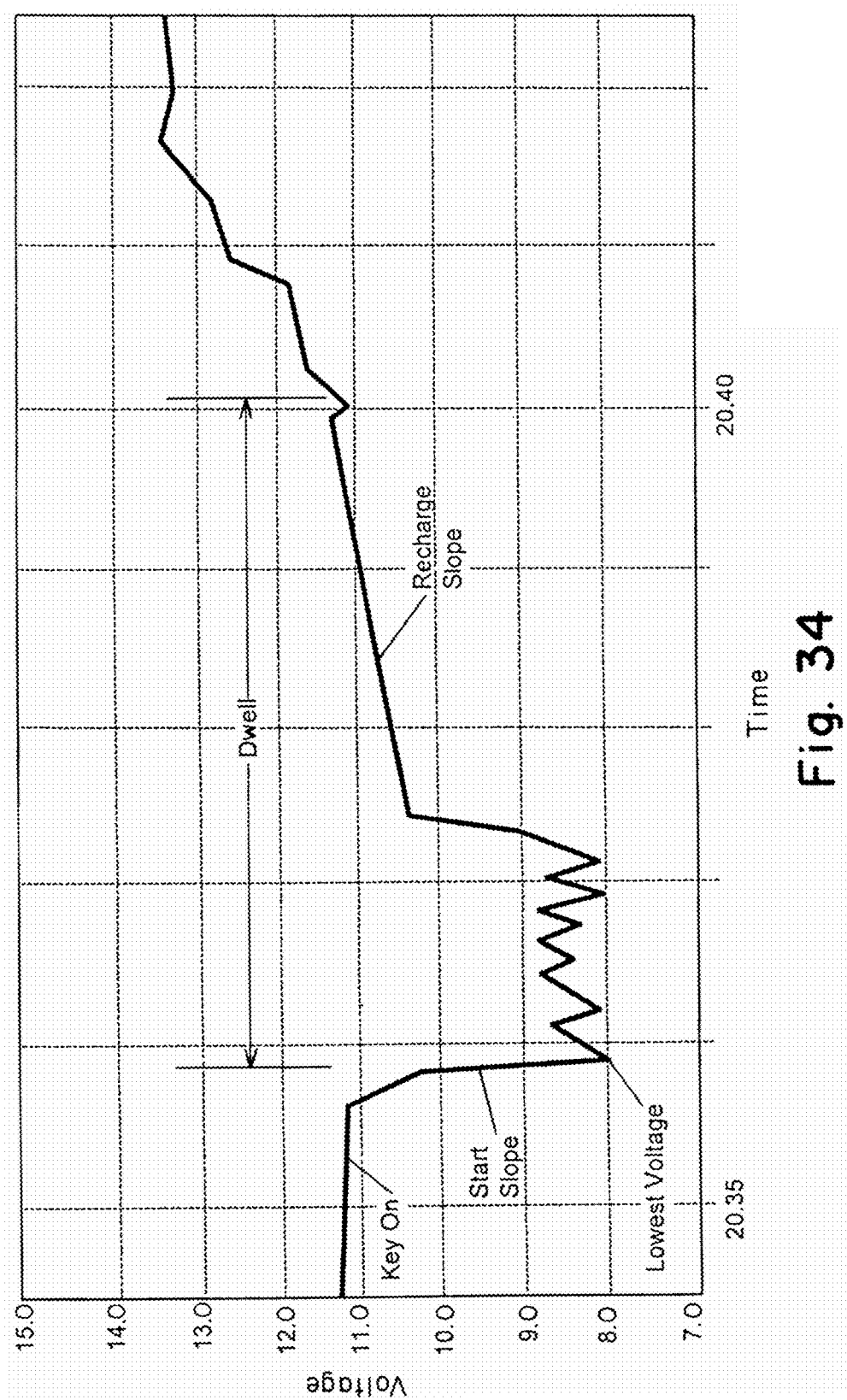
FIG. 34 is a diagrammatic view of a voltage curve from a poor battery based upon a vehicle cranking event illustrating the battery voltage drop, dwell time and recovery slop to recharge the battery.
Figure 35:
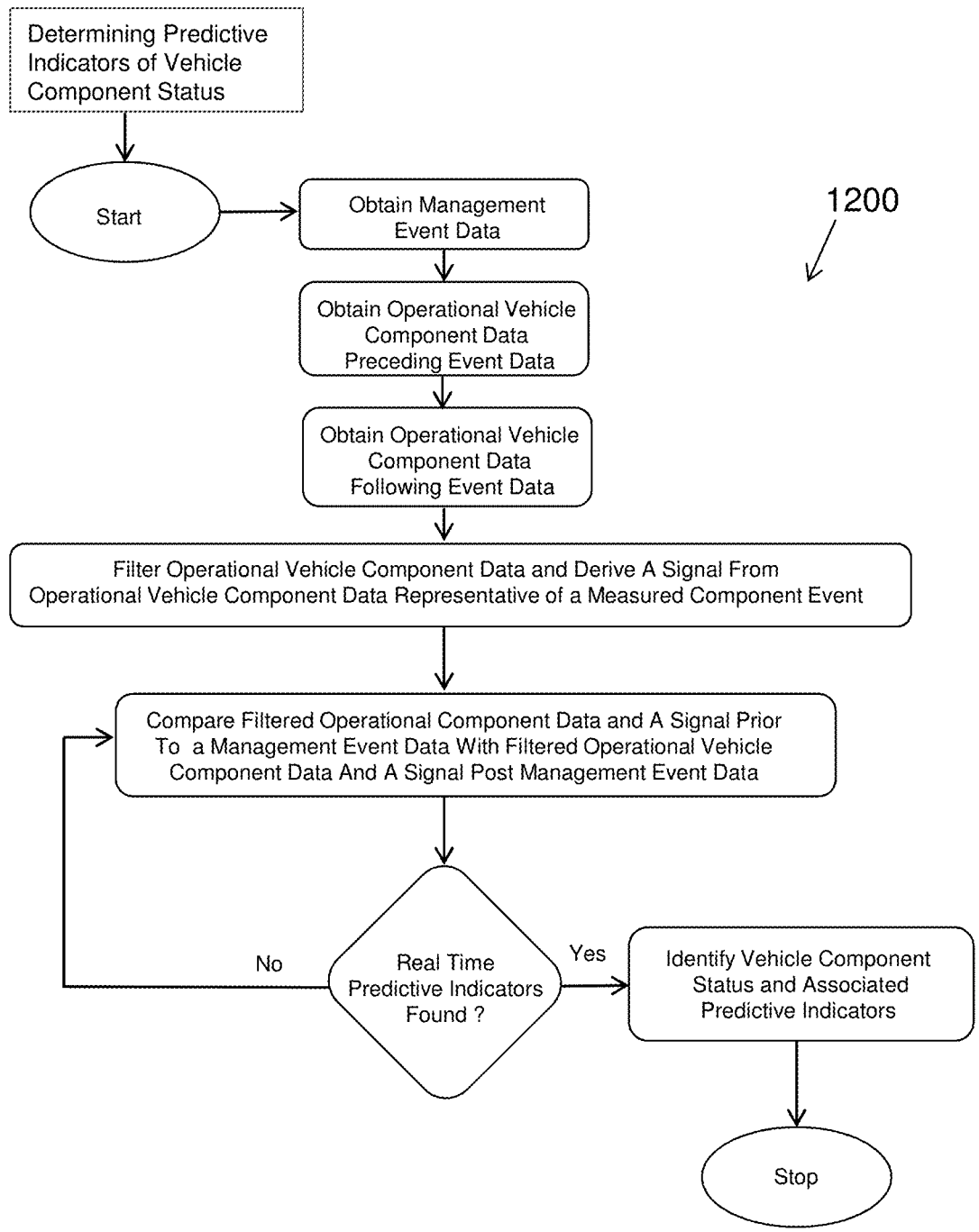
FIG. 35 is a diagrammatic view of a process for determining predictive indicators of vehicle component status.
Figure 36:
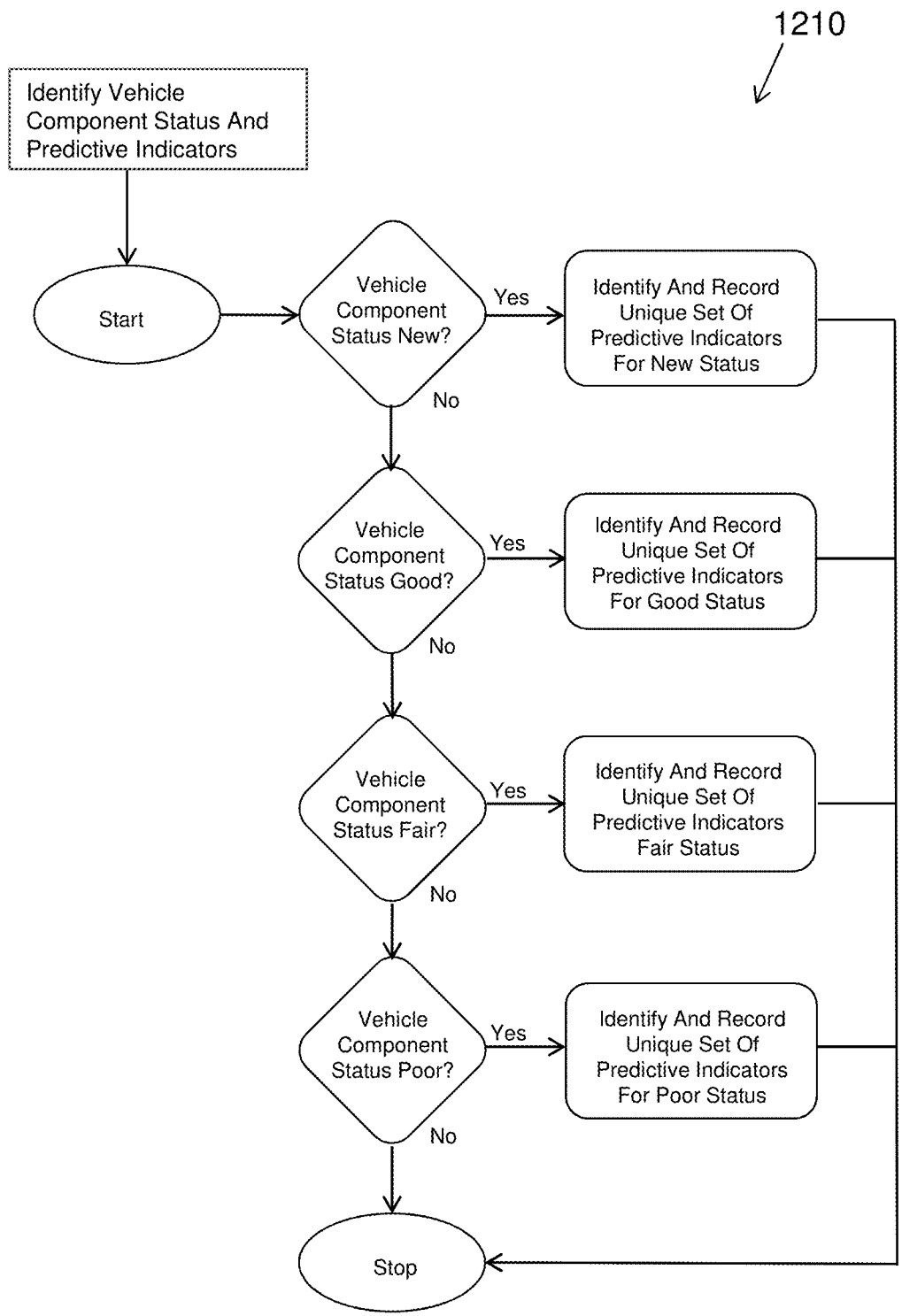
FIG. 36 is a diagrammatic view of a process for identifying a vehicle component status and the associated predictive indicators.

The operational parameters evolve over time from a new vehicle component state to a failed vehicle component state wherein the magnitude of the operational parameters decreases over time and the variance increases over time until failure and installation of a new vehicle component. This is further illustrated in FIG. 5 as a superposition of the states (for example, new and failure). A new vehicle operational component will have raw big telematics data 200 with operational parameters illustrated by 204. A few representative examples of operational components are vehicle batteries, starter motors, 02 sensors, temperature sensors and fluid sensors. Over continued use of the vehicle component, the operational parameters will change or evolve where the raw big telematics data 200 will decrease in magnitude and increase in variance as illustrated at 206. Essentially, the distribution of the operational parameters flatten and widen over the operational useful life of the vehicle component. For an embodiment, the magnitude is a minimum voltage level based upon a vehicle component cranking event and the average minimal cranking voltage decreases over time and operational useful life and the variance between minimal cranking voltage readings are increasing. The vehicle component cranking event is an example of a maximum or significant operational load on the vehicle component in contrast to a minimal or lighter operational load on the vehicle component. Referring now to FIG. 33 and FIG. 34, the voltage versus time is illustrated for a good battery and a poor battery. FIG. 33 illustrates the good battery cranking event voltage curve. When the vehicle ignition key is activated, the voltage starts to decrease slightly followed by a very steep drop in the voltage. Then, after the cranking event has been completed, the voltage rises on a recharge slope within a dwell time where the voltage reaches a steady state for recharging the battery. FIG. 34 illustrates the poor battery cranking event voltage curve. The initial voltage is lower for the poor battery. When the vehicle ignition key is activated, the voltage starts to decrease slightly followed by a very steep drop in the in the voltage. Then, after the cranking event has been completed, the voltage rises on a more shallow recharge slope within a longer dwell time where again the voltage reaches a steady state for recharging the battery.

Figure 6:
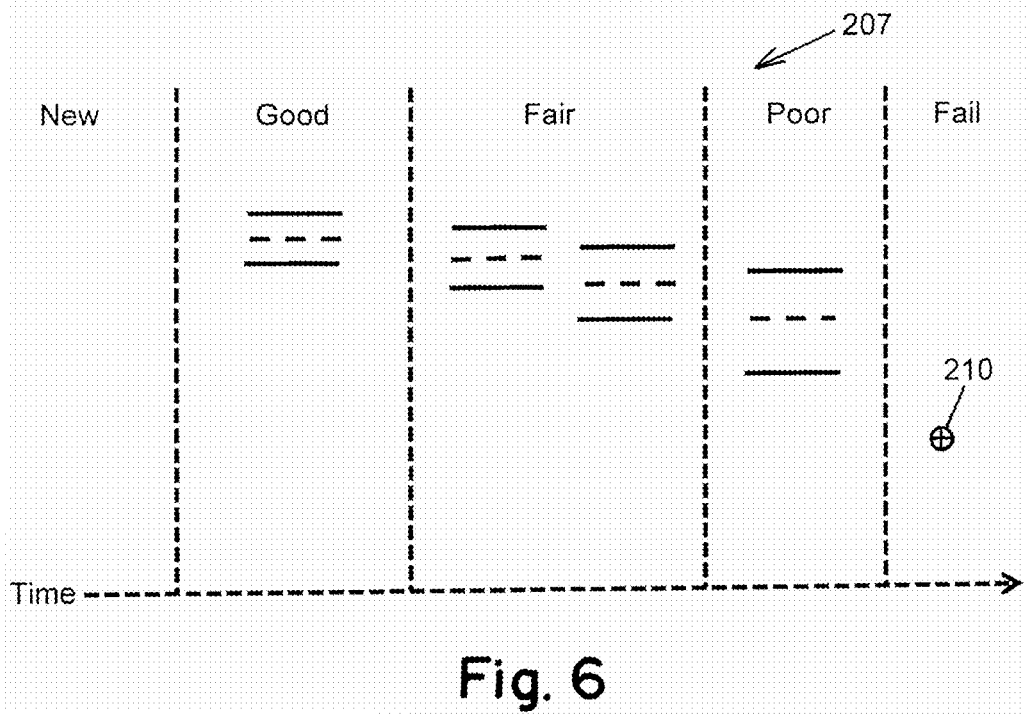
FIG. 6 is a diagrammatic view illustrating the degradation of vehicle component parameters and increasing variances over the life cycle of a vehicle component from a new vehicle component to a failed vehicle component.

FIG. 6 further illustrates at 207 the degradation of vehicle component operational parameters over the useful life cycle of a vehicle component from a new vehicle component to a failed vehicle. There are five states that represent the life cycle being a new component state, a good component state, a fair component state, a poor component state and a failed component state indicated by a failure event 210. The average operational parameter of the vehicle component decreases over the life cycle time and the variation increases over the life cycle time of the vehicle component. Since the raw big telematics data 200 represents a similar or same vehicle component installed in many vehicles with different or similar operational environments (altitudes, temperatures, vibration and frequency of use), operational parameters, variations monitoring indicators and signal monitoring indicators may be derived from the sample of raw big telematics data 200 and associated with the different states from a new vehicle component to a failed vehicle component. The operational parameters, variations, monitoring indicators and signal monitoring indicators and different states may also be associated with a known event 210, for example failure of the vehicle component.

Figure 7:
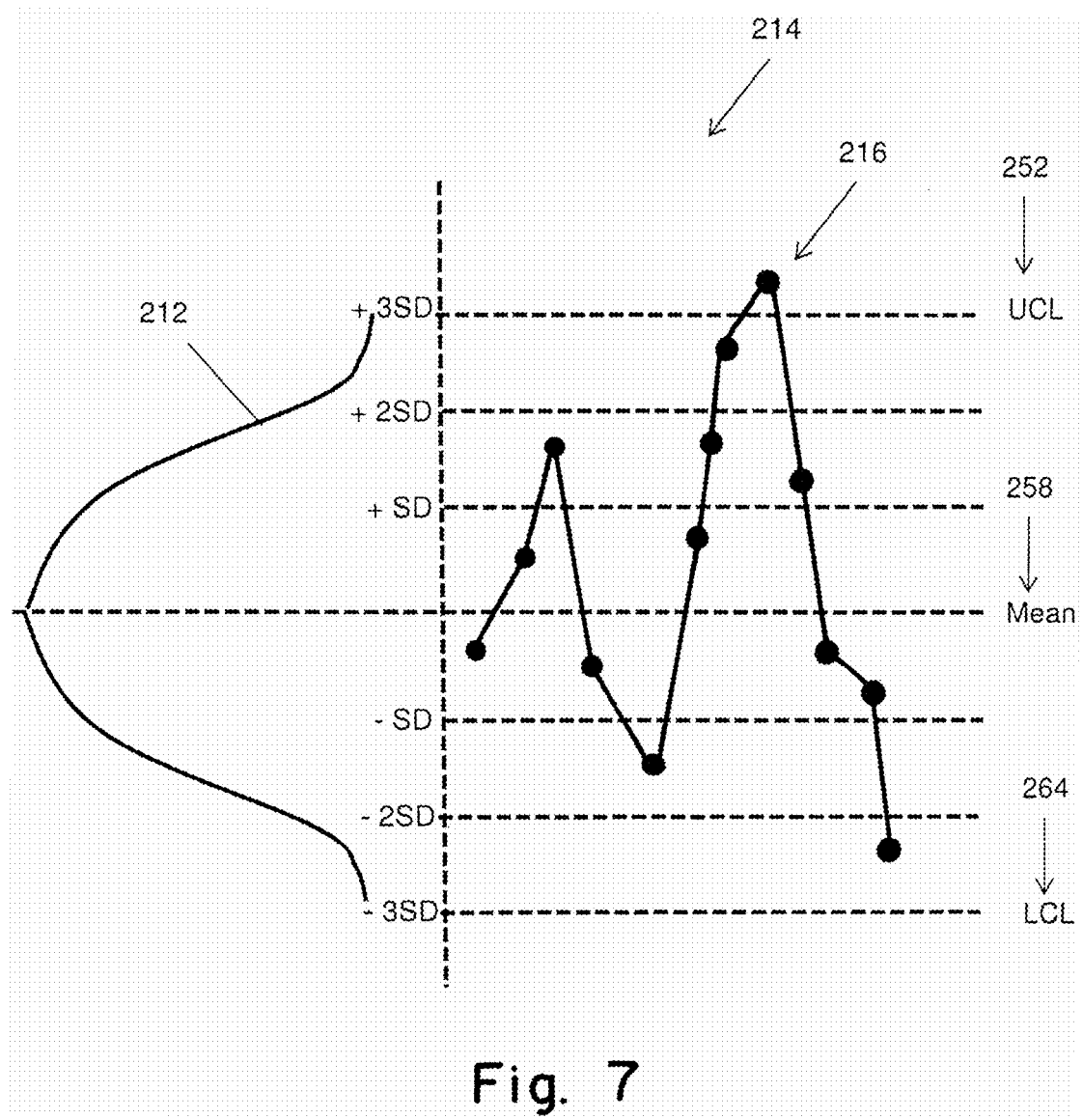
FIG. 7 is a diagrammatic view illustrating a framework that monitors vehicle component process change over time for identifying the state of the vehicle component.

FIG. 7 is a first framework with derived failure process control limits 214 to filter the raw big telematics data 200 and extract patterns of data that are indicative and representative of vehicle component operational states (new, good, fair, poor and fail). The framework establishes a monitor to view the filtered raw big telematics data and identify an operational process change indicative and representative of each vehicle component operational state over time. A sample or portion of the raw big telematics data 200 may be transformed into representative signals 216. The representative signals 216 may be associated with a normal distribution 212 viewed at right angles to the signals 216. The normal distribution 212 provides an indication of a steady process or a changing process with respect to the signals 216. The outer boundaries or limits for the signals 216 are the upper control limit (UCL) 252 and the lower control limit (LCL) 264 on either side of the mean 258. In addition, there are a series of intermediate limits between the boundaries. The intermediate limits relate to different factors of a standard deviation (SD) (plus/minus 1SD, 2SD, 3SD). The signals 216 and location of the signals 216 within the framework with respect to the mean, outer limits and intermediate limits provide an indication to the vehicle component where the operational state may be changing, decreasing as the vehicle component approaches failure or increasing if the vehicle component has received maintenance or replacement.

Figure 8:
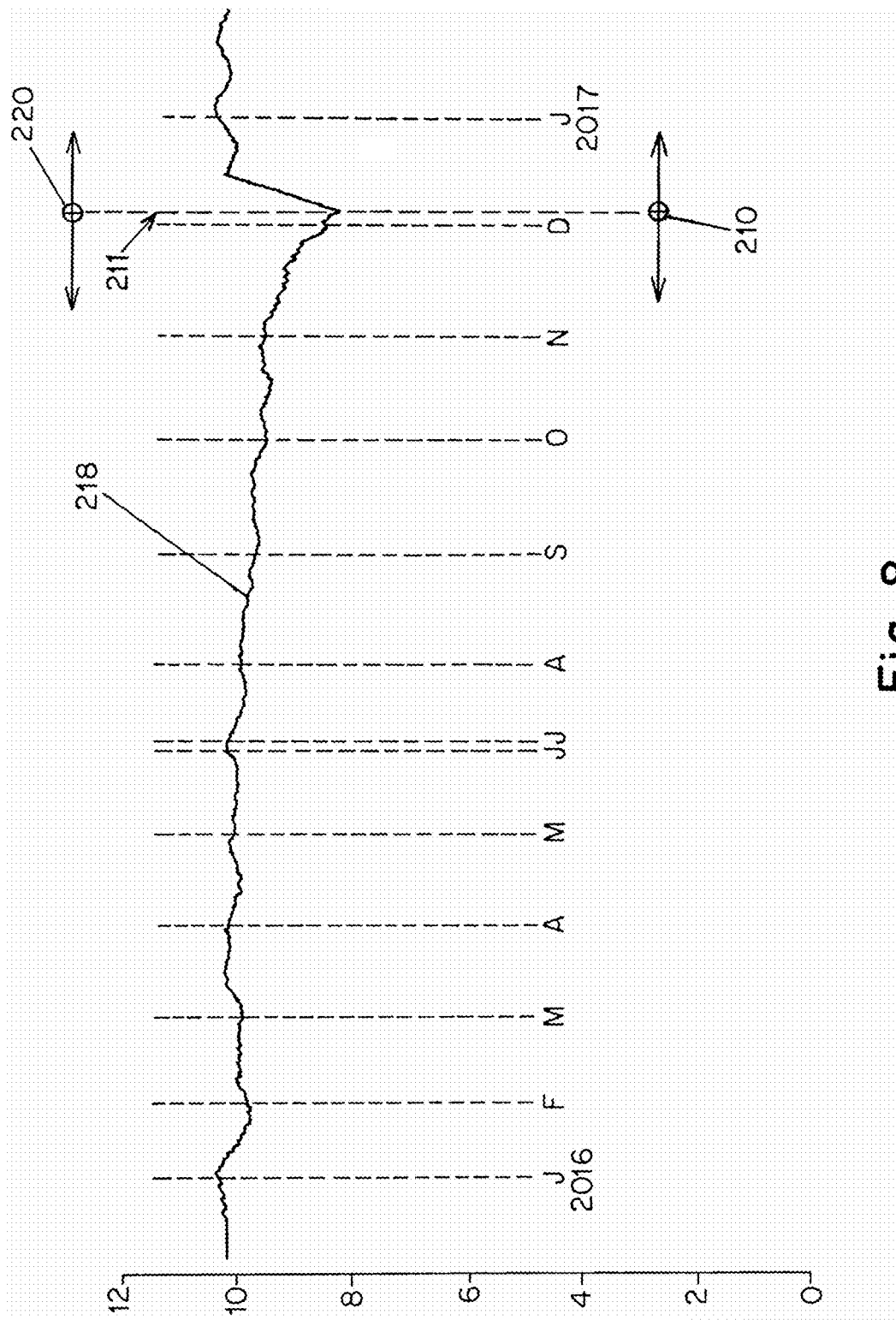
FIG. 8 is a diagrammatic view illustrating a moving average of raw vehicle component data over the life cycle of a vehicle component with an event such as a failed vehicle component or maintenance of a vehicle component.

The raw big telematics data 200 representative of the vehicle component operational life cycle of FIG. 3 may be filtered to smooth out short-term fluctuations and highlight longer-term trends in the life cycle data. This is illustrated in FIG. 8. The raw big telematics data 200 is filtered to provide a moving average 218 derived from the raw big telematics data 200. Alternatively the moving average could be ranges of the data, averages of the data or the result of a low pass or impulse filter. In addition to the raw big telematics data 200 that is monitored, log and stored, additional vehicle component event 211 data is also provided. Vehicle component event 211 data is typically sourced differently and separately from the raw big telematics data 200 but may also be sourced with the raw big telematics data 200. When sourced differently and separately, the vehicle component event 211 data is obtained from maintenance records or a vehicle maintenance database. The vehicle component event 211 data may include the type of event, the date of the event and time of the event. Vehicle component event 211 data includes at least one of either a failure event 210 or a maintenance event 220 concerning the vehicle component. The vehicle component event 211 data defines a known event with respect to the vehicle component and is associated with the moving average 218 representative of the raw big telematics data 200. Individual values or data points of the moving average 218 data are steadily decreasing over time up to the point of the vehicle component event 211. Immediately after the vehicle component event 211, the individual values or data points of the moving average 218 data sharply increase over a shorter period of time and then maintain a relatively consistent moving average 218 going forward in time. The different patterns of the moving average 218 data are indications of a process change between a vehicle component good state, a poor state, a failed state, a new state and/or a refurbished state.

Figure 9:
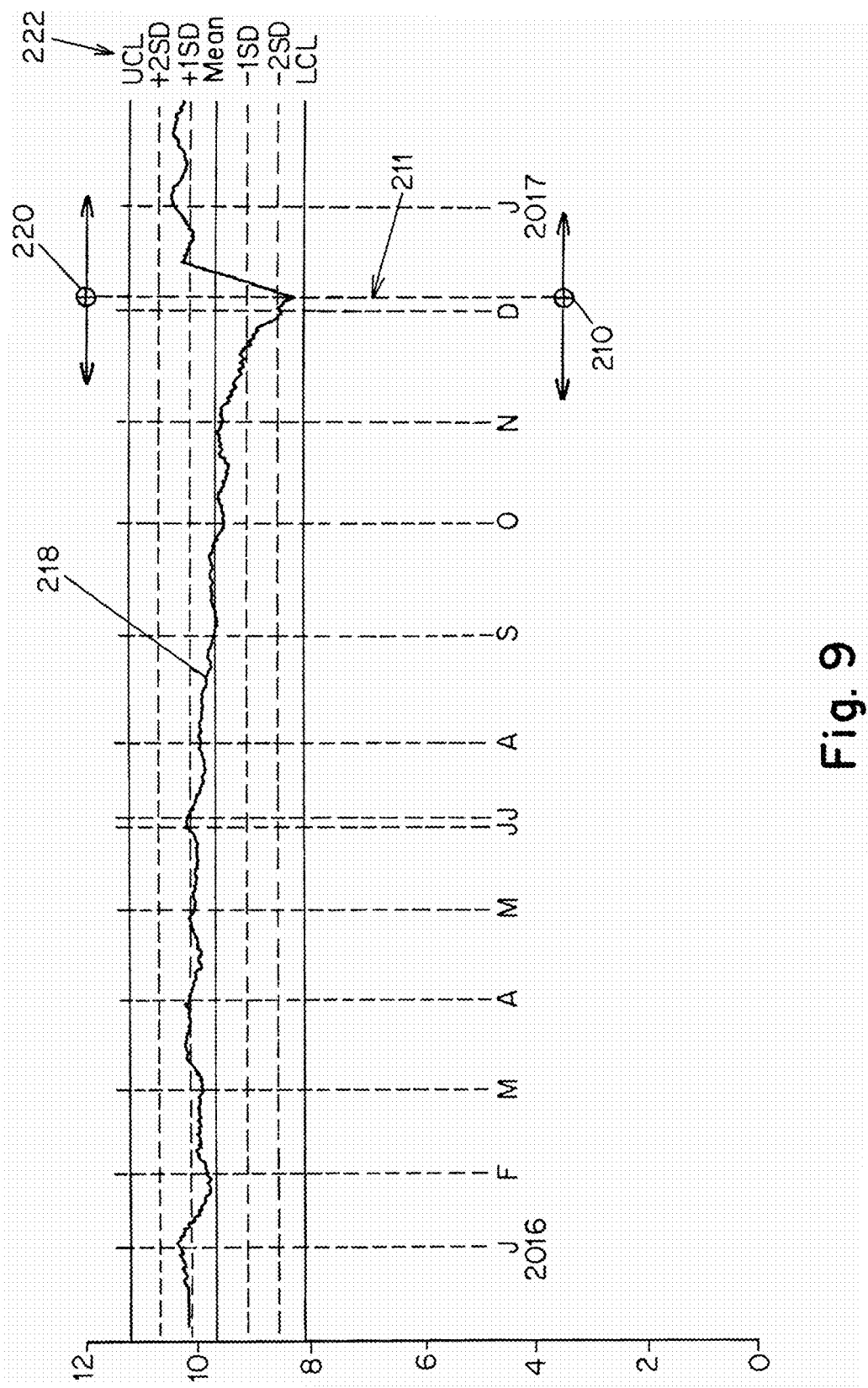
FIG. 9 is a diagrammatic view illustrating a moving average of vehicle component data over the life cycle of a vehicle component with an event such as a failed vehicle component or maintenance of a vehicle component superimposed with a monitoring framework.

Referring now to FIG. 9, the graph of FIG. 8 may be further supplemented with a number of first component or monitoring indicators 222 or monitoring indicators. The first component indicators 222 are derived from the raw big telematics data 200 and include a mean indication, a pair of $1^{st}$ standard deviation indications (plus/minus 1SD), a pair of $2^{nd}$ standard deviation indications (plus/minus 2SD), the upper control limit (UCL) indication and the lower control limit (LCL) indication. The first component indicators 222 are in relationship to the derived moving average 218.

Figure 10:
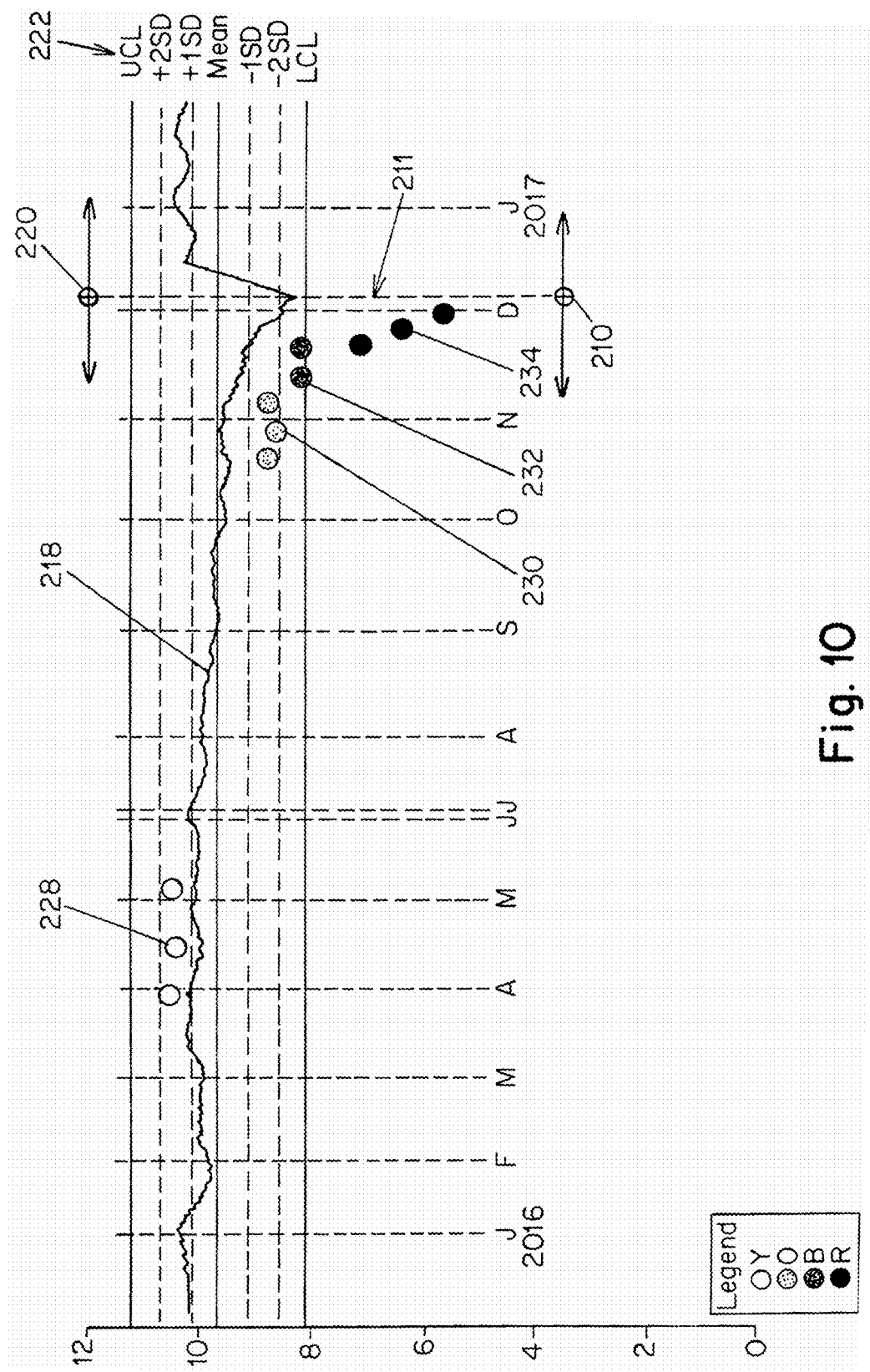
FIG. 10 is a diagrammatic view illustrating a moving average of vehicle component data over the life cycle of a vehicle component with an event such as a failed vehicle component or maintenance of a vehicle component including a set of signal monitoring indicators.
Figure 18:
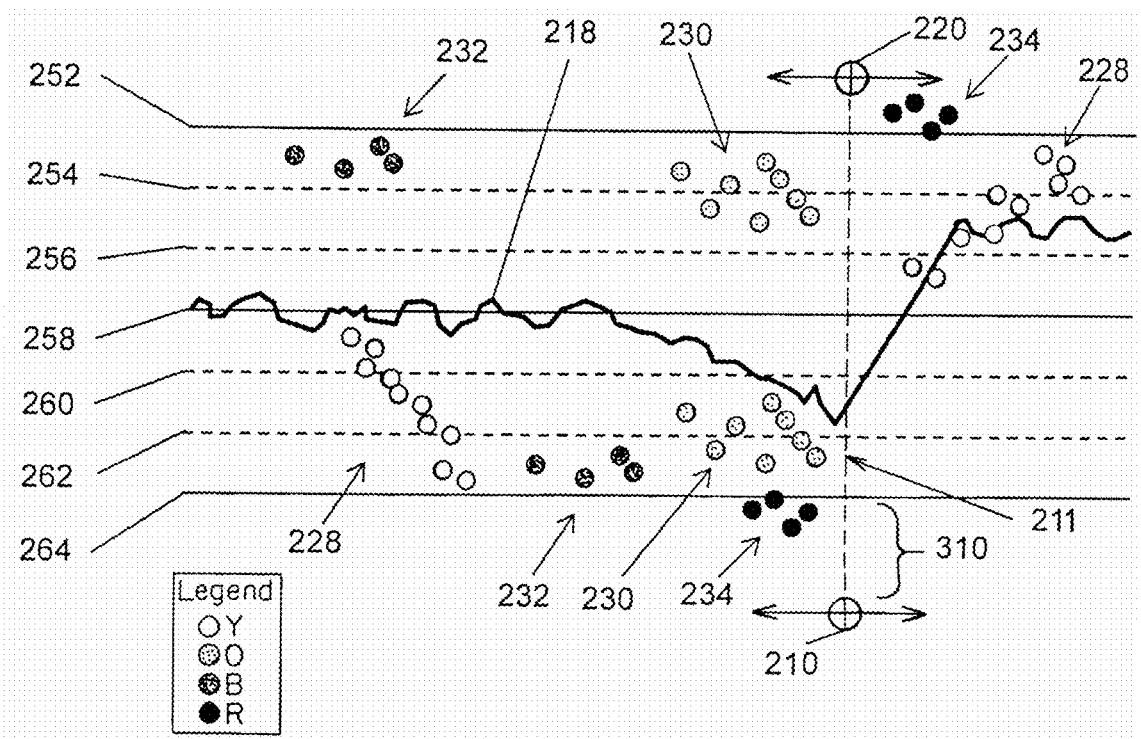
FIG. 18 is a diagrammatic view illustrating a moving average of vehicle component data and signals before and after a vehicle component event.

Referring now to FIG. 10, the graph of FIG. 9 may be further supplemented with a number of different signals applied as signal monitoring indicators. The different signals are also derived from the raw vehicle component life cycle data 200. FIG. 18 is also an enlarged view of the signal monitoring indicators 222 and includes a plurality of like and different signals. A first "R" signal 234 is derived and exists when a single data point is above the upper control limit (UCL) 252 or below the lower control limit (LCL) 264. This "R" signal, or when more than one of these "R" signals occur in a time based sequence, is indicative a change in state of a vehicle component. A second "Y" signal 228 is also derived from the raw vehicle component data 200 and exists when a series of 8 consecutive data points are on the same side of the mean either between the mean and the upper control limit (UCL) 252 or between the mean 258 and the lower control limit (LCL) 264. The "Y" signals are also indicative of a change in state of a vehicle component. The third "O" signal 230 is also derived from the raw vehicle component data 200 and exists when a series of 4 out of 5 consecutive data points are either between the mean 258 and greater than one sigma (1SD) 256 or between the mean 258 and greater than minus one sigma (1SD) 260. Again, the "O" signals are also indicative of a change in state of the vehicle component. Finally, a fourth "B" signal 232 is derived from the raw vehicle component data 200 and exists when a series of 2 out of 3 consecutive data points are either between the mean 258 and greater than two sigma (2SD) 254 or the mean 258 and greater than minus two sigma (2SD) 262. The "B" signals are also indicative of a change in state of the vehicle component.

Figure 11:
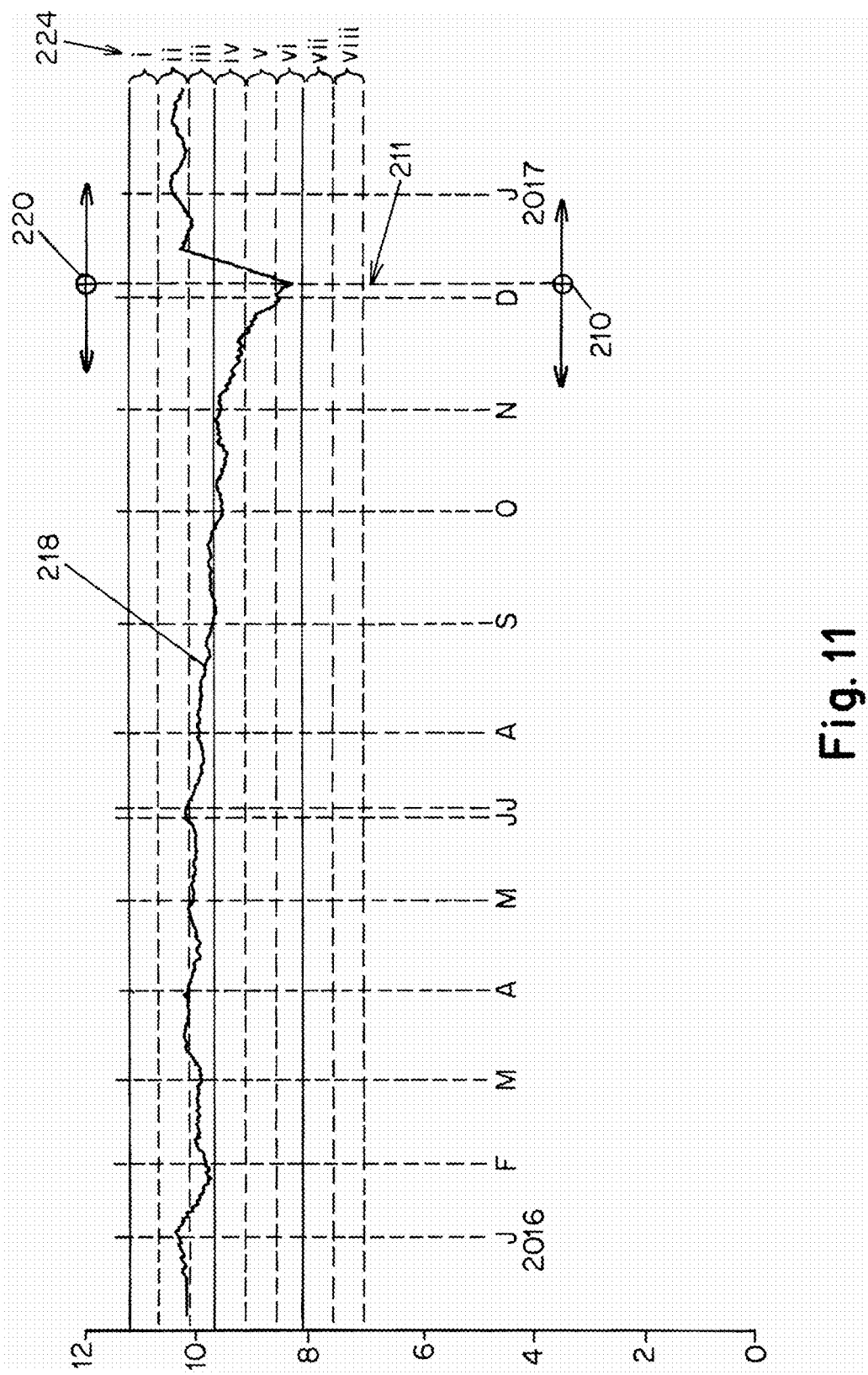
FIG. 11 is a diagrammatic view illustrating a moving average of vehicle component data over the life cycle of a vehicle component with an event such as a failed vehicle component or maintenance of a vehicle component including a set of category monitoring indicators.

FIG. 11 is an alternative embodiment to FIG. 9. The graph of FIG. 11 is supplemented with a number of second component indicators 224. The second component indicators 224 are derived from the raw vehicle component life cycle data 200 and include the six ranges between the upper control limit (UCL) 252 and the lower control limit (LCL) 264 and two ranges below the lower control limit (LCL) 264. The second component indicators 224 are different from the signal monitoring indicators 222. Signal monitoring indicators 222 are statistical limits for measuring or gauging the different signals associated with a component over the useful operational life of the vehicle component. Second component indicators 224 are based upon statistical limits but may be alone or in combination to provide a real time status indication (new, good, poor, fair) concerning the vehicle component.

Figure 12:
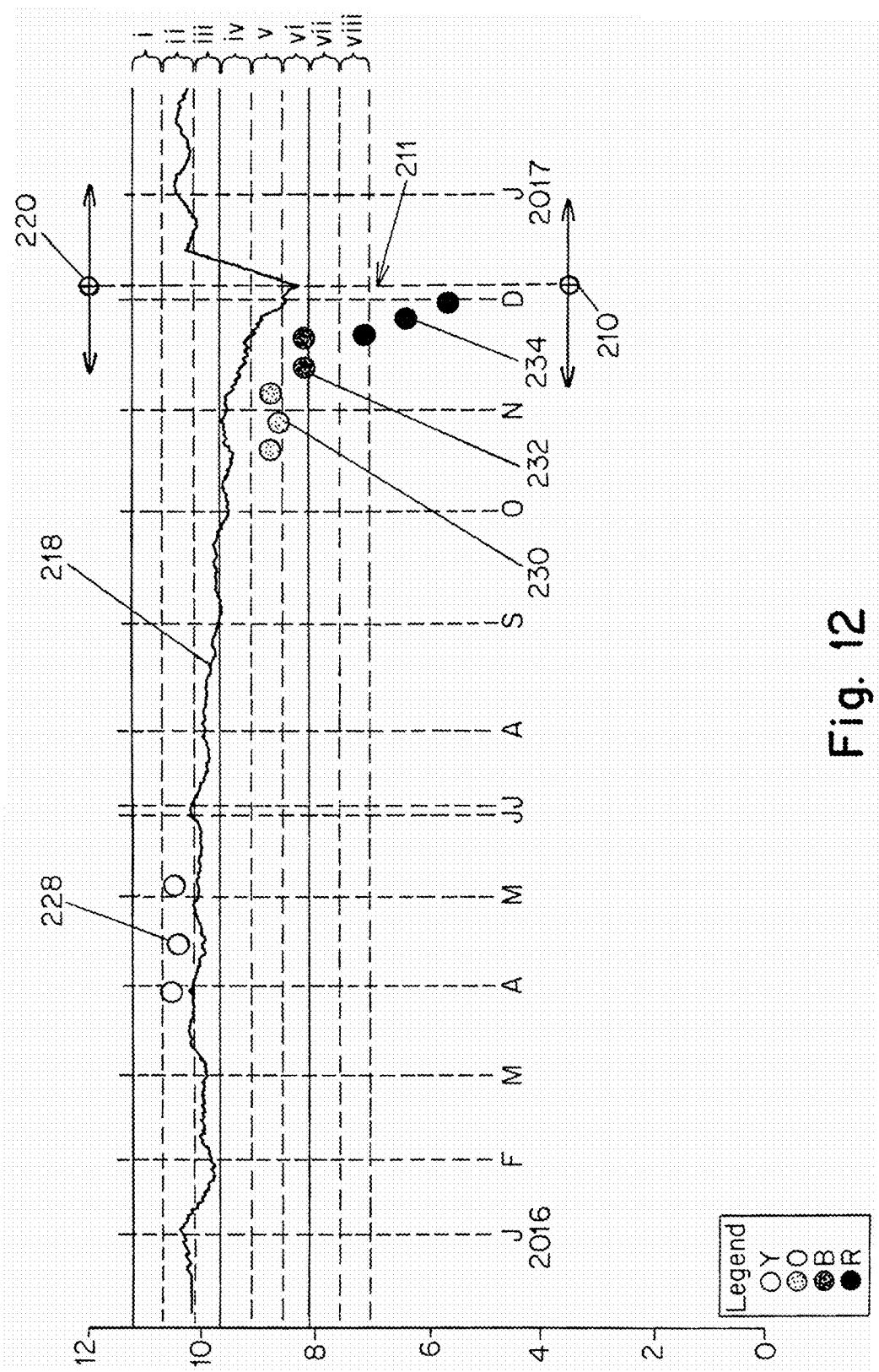
FIG. 12 is a diagrammatic view illustrating a moving average of vehicle component data over the life cycle of a vehicle component with an event such as a failed vehicle component or maintenance of a vehicle component including both a set of signal monitoring indicators and a set of category monitoring indicators.

FIG. 12 is an alternative embodiment to FIG. 10. The graph of FIG. 12 includes the different types of signal monitoring indicators in combination with the second component indicators 224.

Figure 13:
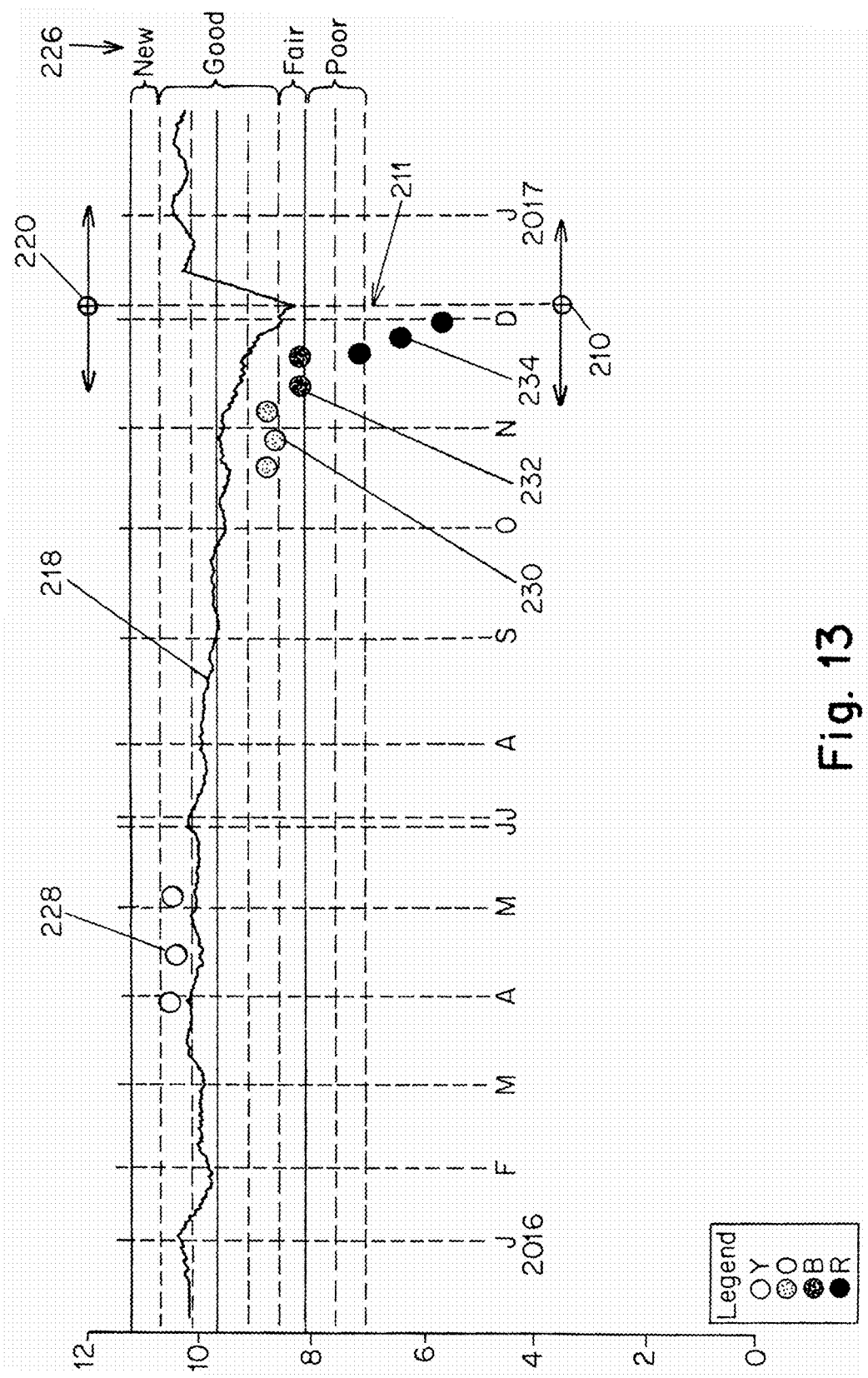
FIG. 13 is a diagrammatic view illustrating a moving average of vehicle component data over the life cycle of a vehicle component with an event such as a failed vehicle component or maintenance of a vehicle component including a set of signal monitoring indicators and an alternative set of category monitoring indicators.

FIG. 13 is an alternative embodiment and includes the different types of signal monitoring indicators in combination with a third set of component monitoring indicators 226. The third set of component monitoring indicators 226 includes 4 categories. The first category is "New". New relates to derived signals 216 between a value for the upper control limit (UCL) 252 and 2SD 254. The second category is "Good". Good relates to derived signals 216 between a value of positive 2SD 254 and minus 2SD 262. "Fair" is a third category and relates to derived signals 216 between a value of minus 2SD 262 and the lower control limit (LCL) 264. Finally, a fourth category is "Poor" and this fourth category relates to derived signals 216 below the lower control limit (LCL) 264.

Telematics Predictive Component Failure Signals, Limits and Data

Figure 14:
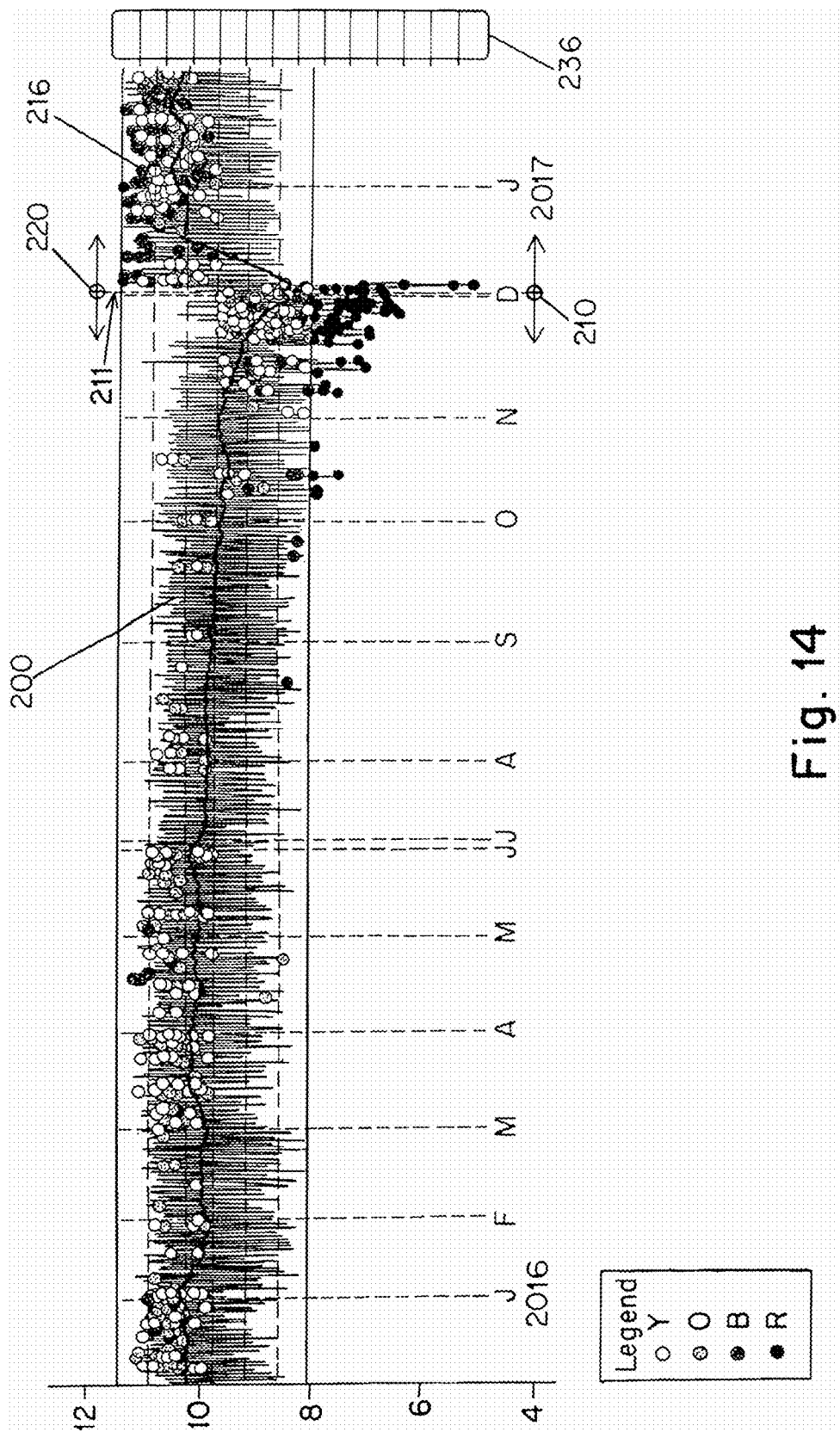
FIG. 14 is a diagrammatic view of raw vehicle component data, moving average vehicle component data, a plurality of signals, an event and a vehicle component monitoring framework.

FIG. 14 illustrates a framework for predictive vehicle component failure including a real sample of raw vehicle component life cycle data 200, a plurality of different derived signals 216, a monitoring indicator 236 and a vehicle component event 211. The monitoring indicator 236 may be one of or a combination of the first component monitoring indicators 222, second component monitoring indicators 224 or the third component monitoring indicators 226. The framework also includes the upper control limit (UCL) 252, the lower control limit (LCL) 262 and the mean 258. The plurality of derived signals 216 may include one or more of an "R" signal, a "B" signal, an "O" signal or a "Y" signal (see FIG. 17).

Figure 15:
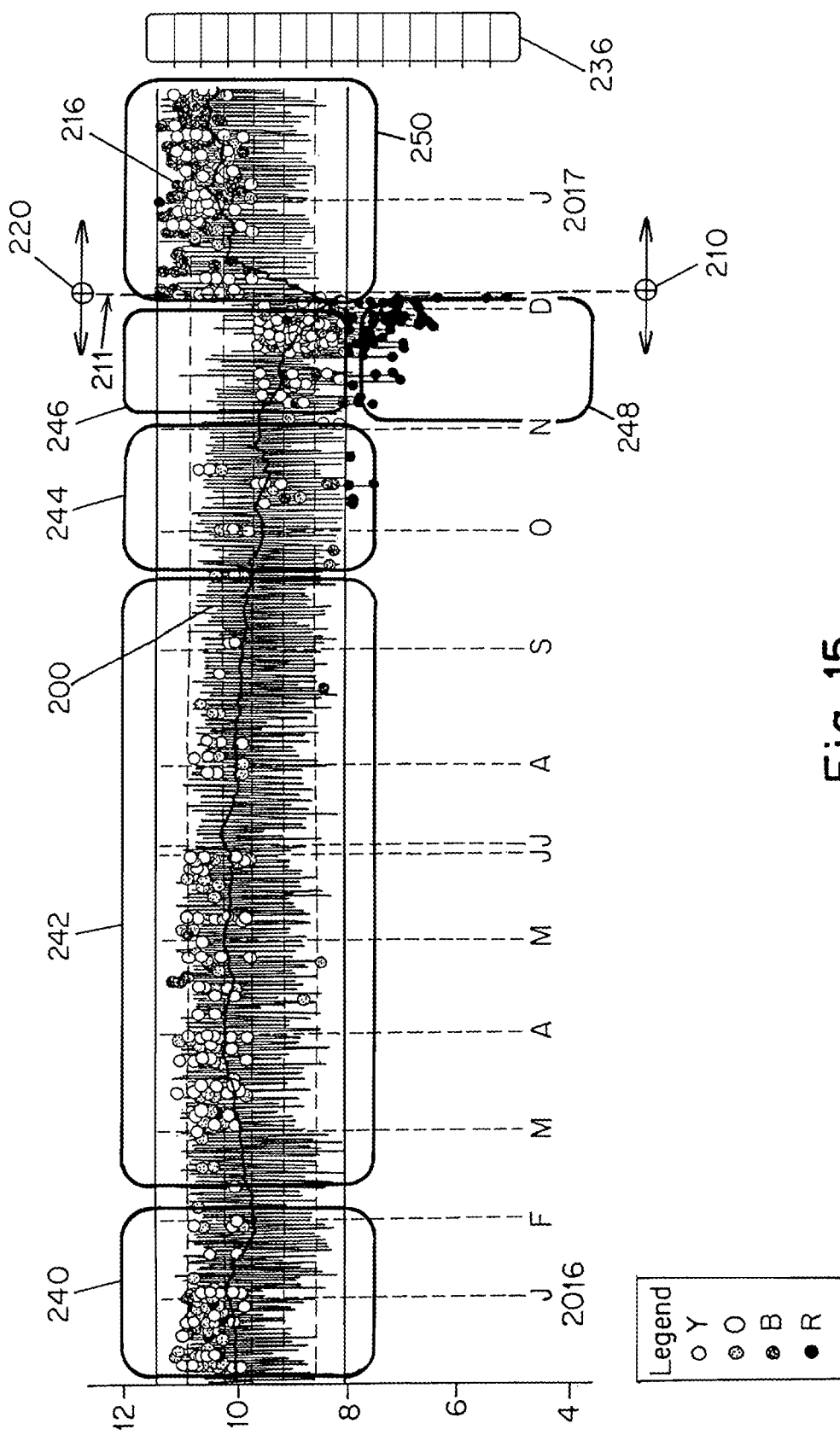
FIG. 15 is a diagrammatic view of raw vehicle component data, moving average vehicle component data, a plurality of signals, an event and a vehicle monitoring framework based upon grouping of like signals.

Referring now to FIG. 15, the framework for predictive vehicle component failure of FIG. 14 further includes a number of identified zones or areas when the derived signals 216 exhibit similar patterns. A first zone 240 exists where the mix of derived signals 216 include "B" signals, "O" signals and "Y" signals. All of the derived signals 216 in the zone 240 exist between the mean 258 and an upper control limit (UCL) 252. The first zone 240 is indicative of a particular vehicle component state, for example relatively new vehicle component with relatively new operating parameters.

A second zone 242 also exists. The mix and grouping of the derived signals 216 generally include "Y" signals and "O" signals with a smaller number of "B" signals. The derived signals 216 are predominately between the mean 258 and the upper control limit (UCL) 252 with a few or small number of derived signals 216 existing below the mean 258 and the lower control limit (LCL) 264. The second zone 242 generally spans six to eight months of vehicle component use. The second zone 242 is indicative of a particular vehicle component state, for an example good vehicle component with good operational parameters.

A third zone 244 exists. The mix and grouping of the derived signals 216 include "Y" signals, "O" signals, "B" signals and "R" signals. There is a mix of "Y" signals and "O" signals both above and below the mean. The "B" signals are below the mean 258 and above the lower control limit (LCL) 264. There is an introduction of "R" signals. The third zone 244 is approximately 1.5 months in duration of vehicle component use. The third zone 244 is indicative of a particular vehicle component state, for example a fair vehicle component with fair operating parameters.

A fourth zone 246 exists where the mix and grouping of the derived signals 216 include "Y" signals, "O" signals and "B" signals. The mix of derived signals 216 are between the mean 258 and the lower control limit (UCL) 264. The fourth zone 246 is approximately 1 month in duration of vehicle component use. The fourth zone 246 is indicative of a particular vehicle component state, for example a poor vehicle component with poor operating parameters.

Directly below the fourth zone for approximately the same duration (1 month of vehicle component use) is a fifth zone 248. The fifth zone is a grouping of "R" signals. The "R" signals are below the lower control limit (LCL) 264. The "R" signals have a less dense grouping at the beginning of the fifth zone 248 and a more dense grouping at the end of the fifth zone 248. The individual value of each "R" signal is also diminishing with a significant increase in variation just before the failure event 210. Alternatively, the fourth zone and the fifth zone may be combined into one zone indicative of a poor vehicle component leading to a failed vehicle component.

After the vehicle component event 211, in this example, the maintenance event 220 where a new vehicle component has been installed, there is a sixth zone 250. The sixth zone 250 is a mix and grouping of "Y" signals, "O" signals, "B" signals and "R" signals. The "R" signals are at or above the upper control limit (UCL) 252. The "Y" signals, "O" signals and "B" signals are between the mean 258 and upper control limit (UCL) 252. The number of "B" signals are much more prevalent in the sixth zone 250 when compared to the other zones. This is indicative of a new vehicle component with new operating parameters.

Figure 16:
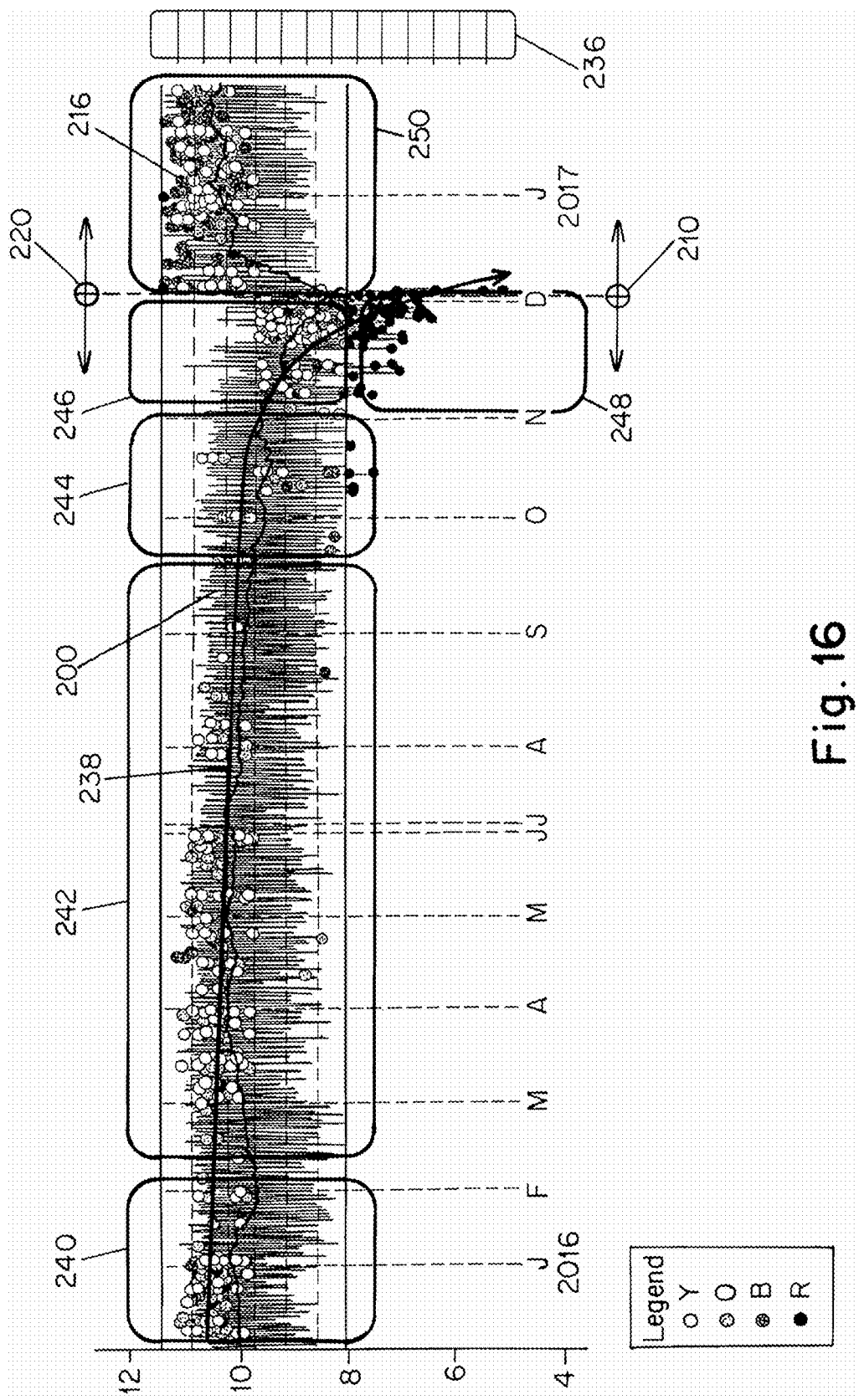
FIG. 16 is an alternative view of FIG. 15 illustrating the vehicle monitoring framework for a vehicle component from good condition, poor condition, failed condition and replacement condition.

Referring now to FIG. 16, a failure curve 238 is provided with the framework for predictive vehicle component failure. The slope of the failure curve 238 is relatively flat, or a slightly negative value throughout the second zone 242. The slope of the failure curve 238 towards the end of the third zone 244 starts to increase in the negative direction as it enters the fourth zone. The slope of the failure curve 238 in the fourth zone 246 and fifth zone 248 significantly increases in the negative direction until the vehicle component event 211. Immediately after the vehicle component event 211, the slope of the failure curve 238 rapidly increases in the positive direction.

Figure 17:
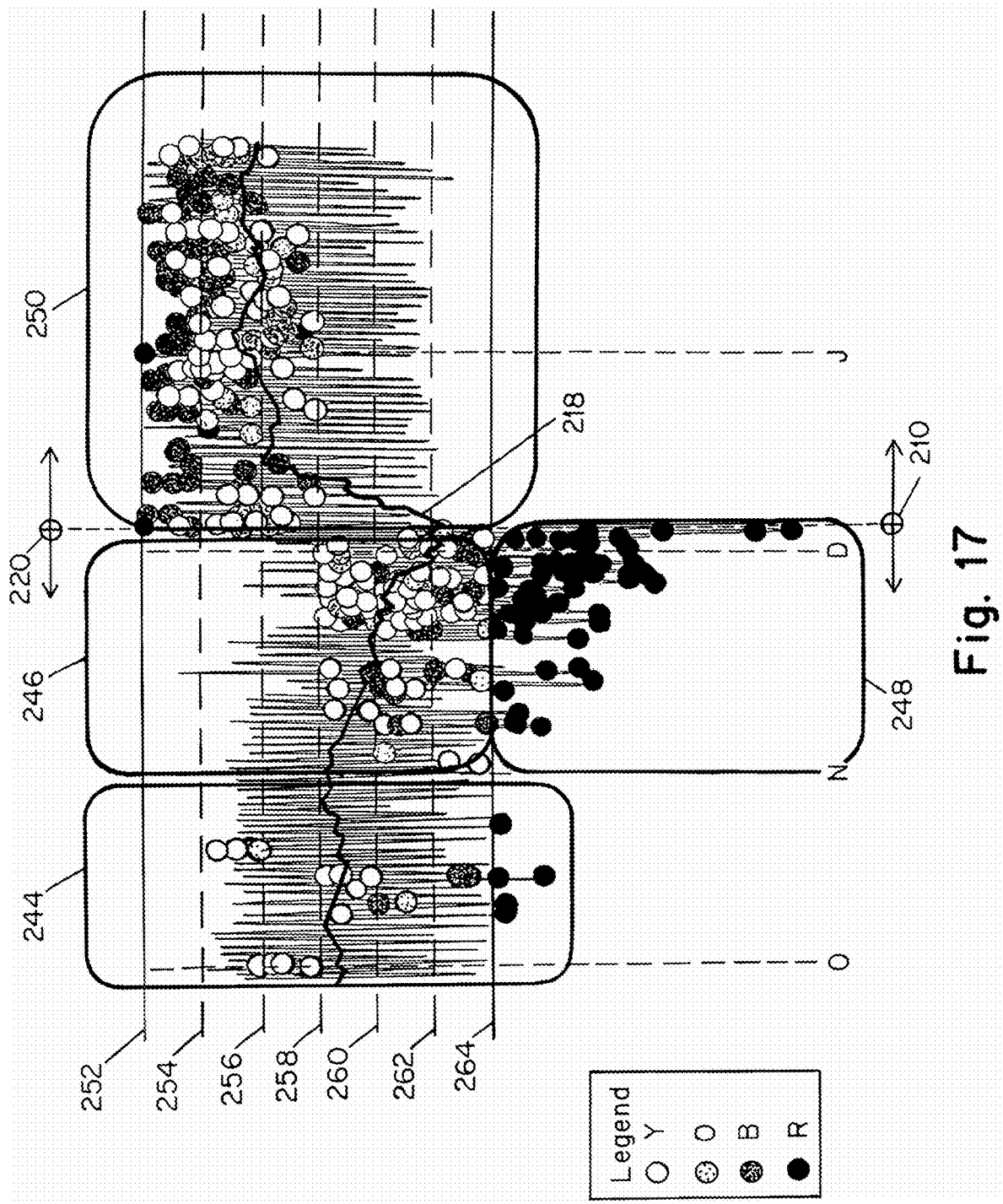
FIG. 17 is an enlarged view of a section of FIG. 15 surrounding the vehicle component event illustrating the vehicle component data, moving average of vehicle component data and a plurality of different signals.

FIG. 17 is an enlarged representation of the third zone 244, fourth zone 246, fifth zone 248 and sixth zone 250 of the framework for predictive vehicle component failure. In the third zone 244, the moving average 218 is relatively constant. The moving average 218 is between the mean 258 and minus one SD 260. There are a number of derived signals 216 above and below the moving average 218. The derived signals 216 above and below the moving average 218 include "Y" signals and "O" signals. There are more "Y" signals 228 than "O" signals. There are a few "B" signals below the moving average and a few "R" signals below the lower control limit (LCL) 264. The variance in the third zone is larger than the variance in the first zone 240 and second zone 242. For clarity, the different signals may be coded as different colors to represent the different signals on a computer or display screen. For example, though the various signals are represented as varying stipple density ranging from none to solid, on a computer screen, the "Y" signal may be represented in yellow, the "O" signal may be represented in orange, the "B" signal may be represented in blue and the "R" signal may be represented in red.

In the fourth zone 246, the moving average 218 is decreasing through the zone. It should be appreciated that as used herein, the phrase "increasing in the negative direction", "negatively increasing", "decreasing", "declining" and "move downward" may be used interchangeably. The moving average begins close to the mean 258 and moves downwardly towards minus 2SD 264 at the end of the fourth zone 246. There are a number of "Y" signals above and below the moving average 218. The number of "Y" signals and the number of "B" signals are higher in number when compared to the third zone 244. The number of "O" signals are relatively the same number when compared to the third zone 244.

In the fifth zone 248, there is a significant number of "R" signals when compared to the third zone 244. When examining the derived signals 216 in the fourth zone 246 and fifth zone 248, the variance is the largest when compared to the other zones.

In the sixth zone 250, the moving average 218 starts with a steep and significant positive slope at the beginning of the zone. The moving average 218 then becomes relatively consistent around plus 1S 256. There are a few "R" signals at or above the upper control limit 252. There are a number of "B" signals, "Y" signal and "O" signals predominantly above the moving average. There are a large number of "B" signals and "Y" signals with less "O" signals. All of the derived signals 216 are above the moving average 218 at the portion of the moving average 218 that has the steep and significant positive slope at the beginning of the zone. The variation becomes small and significantly less when compared to the variation of the fourth zone 246 and fifth zone 248. This change of state and the associated data and signals occurs within a time frame of approximately one month.

Telematics Predictive Component Failure Categories

The telematics predictive component failure categories are introduced with respect to FIG. 18. This figure illustrates a small portion of the operational data over the useful life of a measured vehicle component. The data is also associated with 552 vehicle component events 211, for example a breakdown, a failure, maintenance or replacement of the vehicle component. The data includes different signals derived from the data as generated by a component operational event. An example of a component operational event is as a starter motor cranking event where a vehicular telemetry hardware system 30 has logged the minimum cranking voltage over the useful life of a vehicle component, for example a battery. The vehicular telemetry hardware system 30 has also logged the battery voltages over the useful life of the battery. The data prior to the vehicle component event 211 and post the vehicle component event 211 includes many different signals derived from the data. These signals have been previously described. In order to predict a vehicle component event 211, it may be helpful to have consistent signals and patterns. Patterns of signals are indicative of a change in the vehicle component operational state. For example, consistent patterns of signals reveal a process voltage change when a battery has failed, or has been replaced. In this example embodiment, a moving average 218 (voltage) may be decreasing rapidly prior to the vehicle component event 211 coupled with a very low minimum cranking voltage set of signals just prior to the vehicle component event 211 indicating a vehicle component state. The moving average 218 may be significantly increasing after the vehicle component event 211 indicating another vehicle component state. The moving average voltage 211 may be relatively constant, not decreasing prior to the vehicle component event 211 and not increasing post the vehicle component event 211 indicating yet another vehicle component state or a particular type of vehicle component event 211.

In an embodiment, the vehicle component event is a vehicle starter motor cranking event. The cranking event is determined when the vehicular telemetry hardware system 30 detects a 0.7 voltage decrease over a 100 ms period of time. This then triggers the vehicular telemetry hardware system 30 to request the engine RPM over the vehicle bus. If the RPM is greater than 200 RPM, a cranking event is logged. Alternatively, the voltage decrease triggers the vehicular telemetry hardware system 30 to request the speed either through the vehicle bus, or through a GPS module 33. A positive indication of speed indicates a cranking event that is logged. Optionally, there may be a delay in requesting the speed for the situation where the vehicle is momentarily in a reverse direction (zero speed on the vehicle bus). Alternatively, the voltage decrease triggers the vehicular telemetry hardware system 30 to sense acceleration through an accelerometer 34 and a positive indication of acceleration in either the forward or reverse direction provides an indication to a cranking event that is logged.

Figure 19:
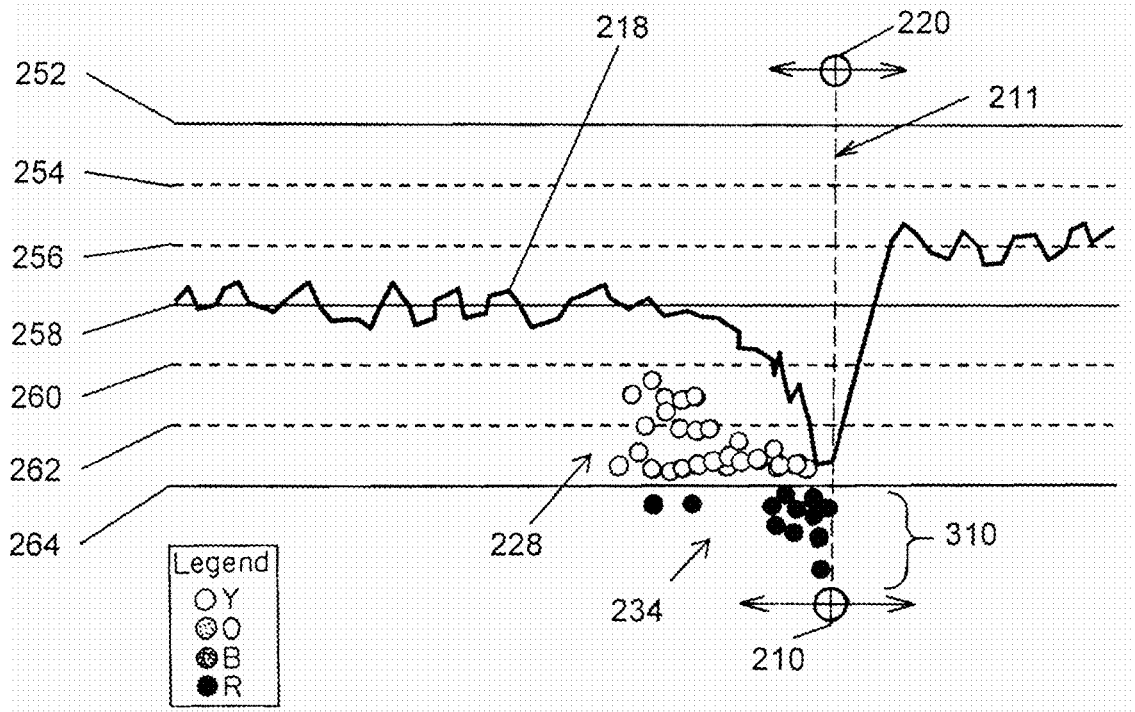
FIG. 19 is a diagrammatic view illustrating a moving average of vehicle component data and signals near a vehicle component event representative of a component failure event.

Referring now to FIG. 19, a first vehicle component breakdown or maintenance event is described with respect to a vehicle component failure that resulted in a vehicle breaking down, for example with a dead battery. For the sake of clarity, the complete set of signals from FIG. 18 is reduced to focus on a moving average 218 (voltage) and signals (voltages) indicative of a vehicle component event 211 with a vehicle component state of failure. The moving average 218 (voltage) and signals make it possible to predict failure and provide a recommendation to replace a vehicle component prior to actual failure of the component. Initially, the moving average 218 (voltage) remains relatively constant around, or above and below the mean 258. Before the vehicle component event 211, the moving average 218 (voltage) decreases over time as the vehicle component becomes increasingly weaker. In addition to the moving average 211 characteristics, the lower cranking voltage values from a vehicle cranking event are producing an increasing number of derived signals just prior to the vehicle component event 211. The "Y" signals 228 (voltage) provide a pattern below the moving average 218 (voltage). In addition, there is an increasing appearance, or clustering or grouping of "R" signals 234 (voltage). The "R" signals 234 (voltage) are below the lower control limit 264 and over time move further away from the lower control limit 264. The "R" signals 234 (voltage) may be further assessed based on a distance 310 of each signal from the lower control limit 264 to further reveal and predict a component failure prior to the actual component failure event 210. Another monitoring indicator (not shown) may be applied to the "R" signals 234 and the respective signal distance 310 from the lower control limit 264 for each signal to further define the accuracy and prediction of an imminent vehicle component failure. In an embodiment, this monitoring indicator includes two areas with two different shades of red (not shown) wherein vehicle component replacement is recommended when the "R" signals 234 enter the lower section (e.g., the darker shade of red section). Immediately after the vehicle component event 211, the moving average 218 (voltage) sharply increases over time indicating the vehicle component has been replaced and the vehicle component is operating in a new vehicle component state. A further indication of a vehicle component event 211 is that the moving average 218 (voltage) is at a higher value (above the mean 258) post the vehicle component event 211 when compared to the moving average 218 (voltage) operating a lower value prior to the vehicle component event 211.

Figure 20:
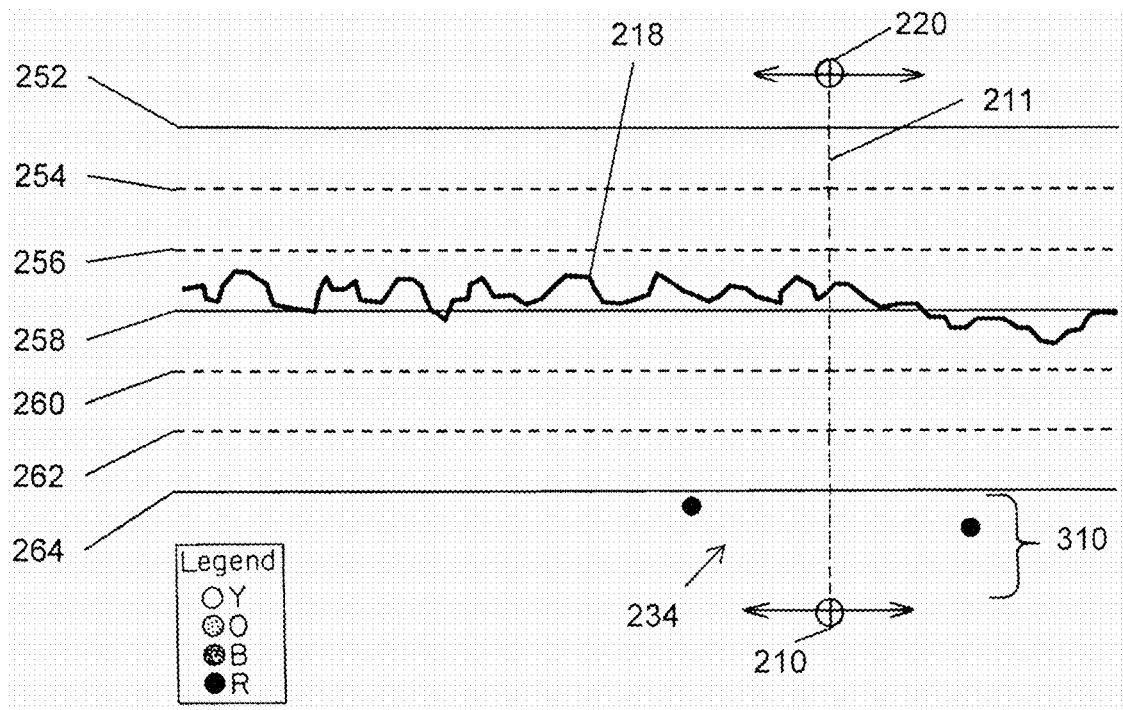
FIG. 20 is a diagrammatic view illustrating a moving average of vehicle component data and signals near a vehicle component event representative of an unrelated event.

Referring now to FIG. 20, a second vehicle component event is described with respect to a vehicle component event 211 that was not related to the particular vehicle component being monitored. Again, the complete set of signals from FIG. 18 are reduced for clarity purposes to focus on either side of the vehicle component event 211. The moving average 218 (voltage) is relative constant around the mean 258 on both sides of the vehicle component event 211 (prior and post). There is no significant increase or decrease in the moving average 211 post the vehicle component event 211. In addition to the moving average 211 characteristics, there are very few "R" signals 234. The "R" signals 234 are not grouped or clustered on either side of the vehicle component event 211. There is no significant change in the voltage values at the time of the vehicle component event 211.

Figure 21:
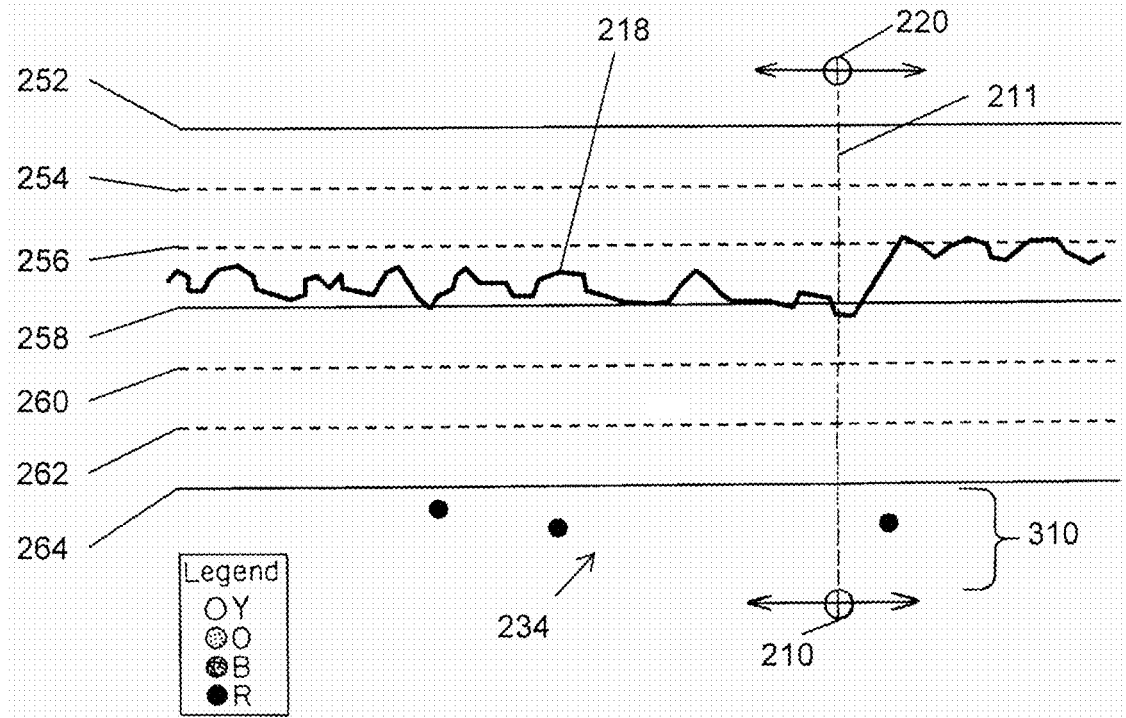
FIG. 21 is a diagrammatic view illustrating a moving average of vehicle component data and signals near a vehicle component event representative of a premature component replacement.

Referring now to FIG. 21, a third vehicle component event is described that resulted in a premature replacement of the vehicle component. This form of vehicle component event analysis is useful in identifying premature replacement of vehicle components from a vehicle maintenance perspective. Prior to the vehicle component event 211, the moving average 218 (voltage) is relative constant around the mean 258. There is no significant decrease in the moving average 211 (voltage) prior to the vehicle component event 211. Post the vehicle component event 211, the moving average 218 (voltage) has an increase to a level above the mean 258, in this example approximately at 1SD 256. There are few "R" signals 234 and certainly no grouping or clustering of "R" signals 234. These characteristics indicate that a vehicle component was replaced well before any failure where the vehicle component still had a useful life and use before failure.

Figure 22:
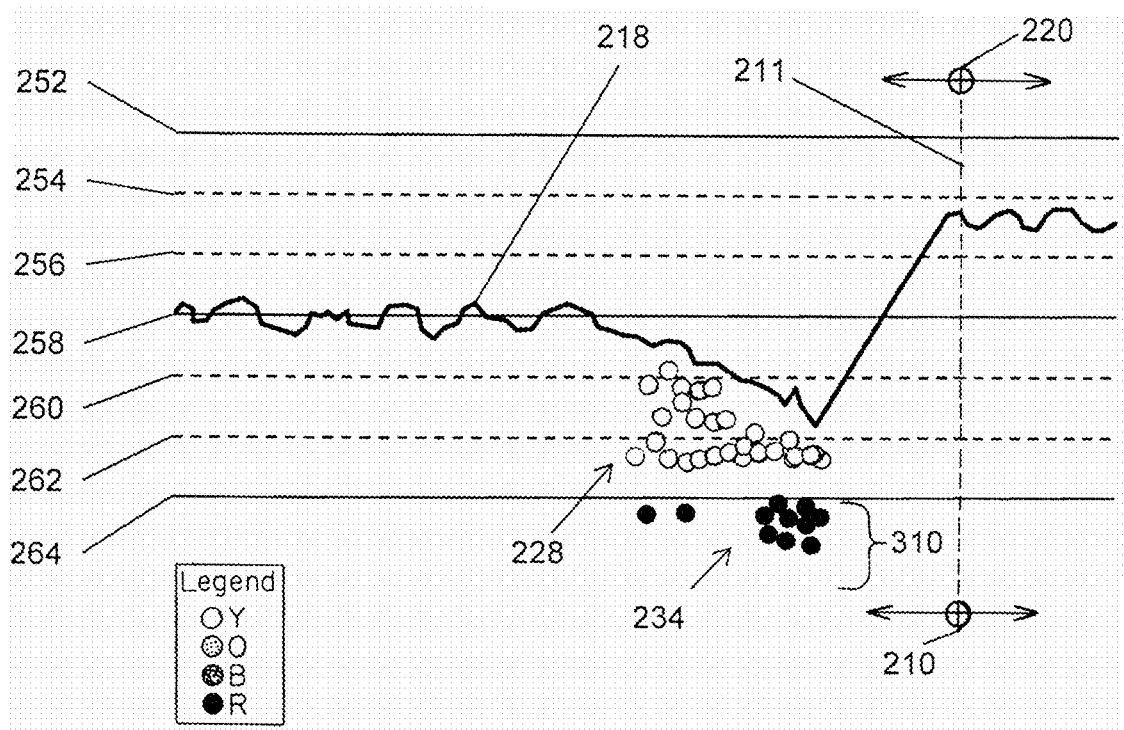
FIG. 22 is a diagrammatic view illustrating a moving average of vehicle component data and signals near a vehicle component event representative of an incorrect event data for a vehicle component failure.

Referring now to FIG. 22, a fourth vehicle component event is described that resulted in an incorrect recording of the vehicle component event 211. FIG. 22 is the same as FIG. 19 with respect to the moving average 218 (voltage), the "Y" signals 228 and the "R" signals 234. However, the vehicle component event 211 does not line up with either the "R" signals 234, the decreasing value of the moving average 218 (voltage) prior to the vehicle component event 211, or the increasing value of the moving average 218 (voltage) post the vehicle component event. The moving average 218 (voltage) is significantly increasing just before the vehicle component event 211 and the moving average 218 (voltage) is relatively constant post the vehicle component event 211. The vehicle component event 211 does not coincide with a change in the moving average 218 (voltage) and "R" signals 234. These characteristics indicate that a vehicle component event 211 was not properly or accurately recorded with respect to the date and time of the event.

Figure 23:
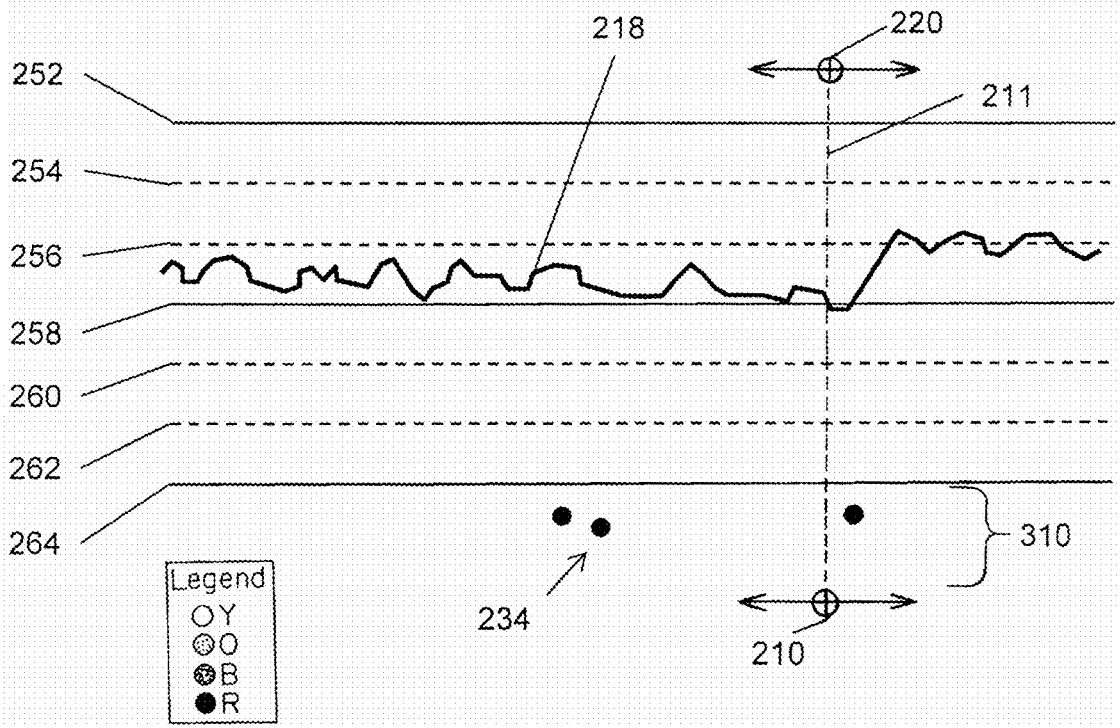
FIG. 23 is a diagrammatic view illustrating a moving average of vehicle component data and a plurality of signals representative of vehicle component status for a corrective action.

Referring now to FIG. 23, a fifth vehicle component breakdown or maintenance event is described with respect to a maintenance event concerning the vehicle component. For this example, the vehicle 11 has been in a stationary inactive state or event for an extended period of time as reflected in the log (several days or several months for example). There is no significant decrease in the moving average 211 (voltage) prior to the vehicle component event 211. Prior to the vehicle component event 211, the moving average 218 (voltage) has an increase to a level above the mean 258. After the vehicle component event 211 and the corrective action of maintenance, the moving average 218 is approximately the same in value prior to the vehicle component event 211. There are few "R" signals 234 and certainly no grouping or clustering of "R" signals 234 around the vehicle event 211. These characteristics indicate that a vehicle component was repaired, or in the example where the vehicle component is a battery, the battery was boosted.

Figure 24:
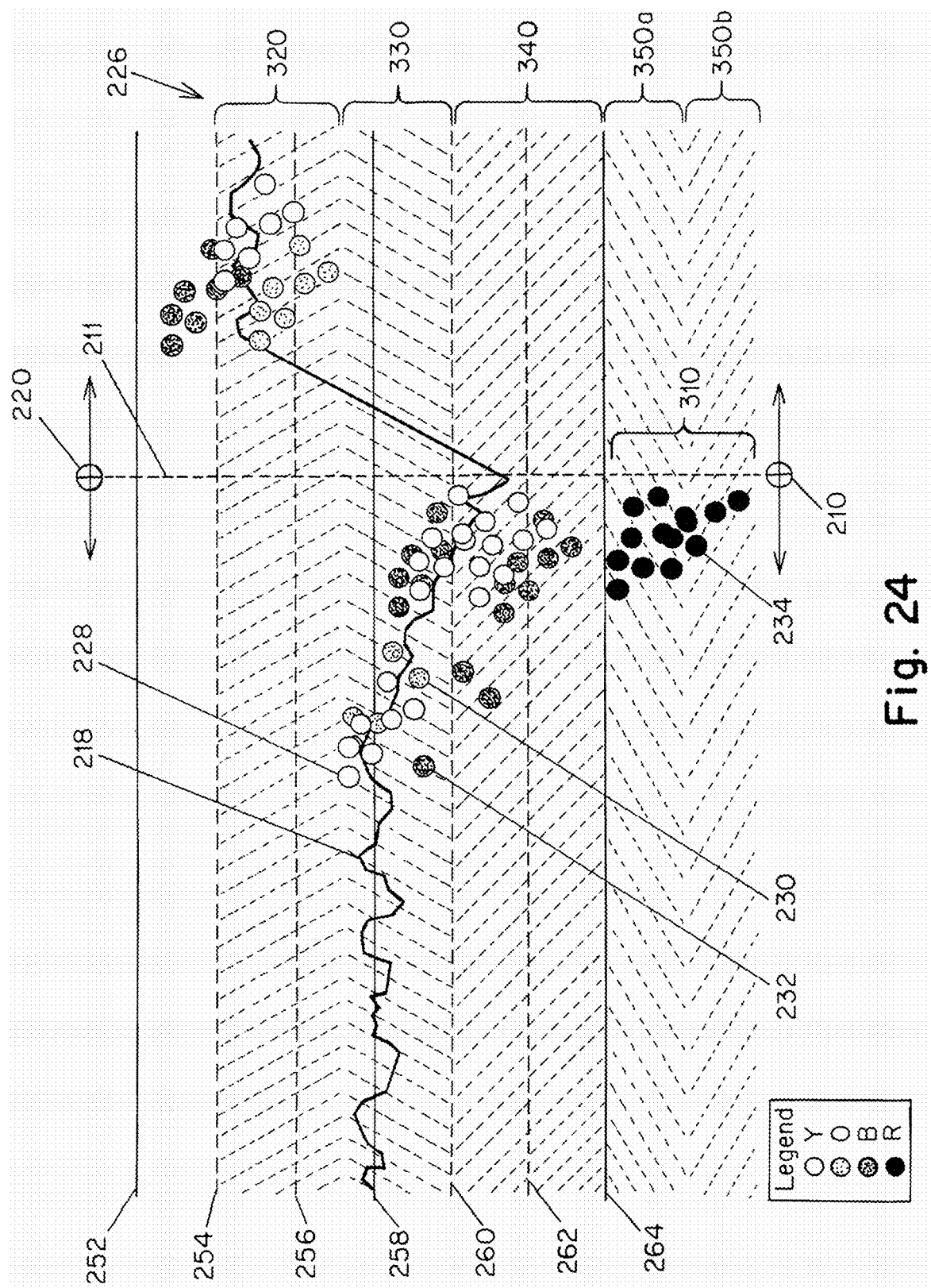
FIG. 24 is a diagrammatic view illustrating a moving average of vehicle component data and a plurality of signals representative of vehicle component status over the life cycle of the vehicle component with a component monitoring indicator in the form of a component rating.

Referring now to FIG. 24, a vehicle component rating framework is described that provides an indication of the operational state of the vehicle component. In an embodiment, the framework includes the upper control limit 252, plus 2SD 254, plus 1SD 256, the mean 258, minus 1SD 260, minus 2SD 262 and the lower control limit 264. The moving average 218 is located within the framework as well as a number of "R" signals 234. Alternatively, other signals could be included within the framework. The vehicle component event 211 is also included within the framework with a failure event 210 and a maintenance event 220. A component monitoring indicator 226 is also included with the framework. The component monitoring indicator 226 is divided up into zones or regions representative of component states. A first region of the component monitoring indicator 226 is a new state 320. The new state 320 could be represented by downwardly sloping cross-hatched lines or a dark green color if on video display screen. This occurs for component values between plus 0.5 SD and plus 2SD 254. A second region of the component monitoring indicator 226 is a good state 330. The good state 330 could be represented by upwardly sloping cross-hatched lines or a light green color if on video display screen. The second region is for component values between 0.5 SD and minus 1SD 260. A third region of the component monitoring indicator 226 is a fair state 340. The fair state 340 could be represented by downwardly sloping cross-hatched lines or a yellow color if on video display screen. The third region is for component values between the minus 1SD 260 and the lower control state 264. Below the lower control state 264 is a fourth region of the component monitoring indicator 226. The fourth region includes two sub-sections. The first sub-section indicates a poor state 350a and the second sub-section indicates a failed state 350b. The poor state 350a could be represented by upwardly sloping cross-hatched lines or a light red color if on video display screen and the failure state 350b could be represented by upwardly sloping cross-hatched lines or a dark red color if on video display screen.

The first region, second region and third region relate to the moving average 218 to provide an indication of component rating. When the moving average 218 is disposed within the first region, the component state is identified as new. When the moving average 218 is disposed within the second region, the component state is identified as good. When the moving average 218 is disposed within the third region, the component state is identified as fair. When the moving average 218 is decreasing over time from the second region to the third region, the component state is changing from a good state to a fair state. When the moving average 218 is increasing over time from the third region, or alternatively the second region to the first region, the component state is changing to a new state. Alternatively, the grouping and pattern of signals (see FIGS. 15, 16, and 17) and the trends of the signals higher or lower in the framework also provide an indication to the component state. In and embodiment, the moving average 218 provides the indication to component state (new, good, fair). In another embodiment, the signals provide an indication to the component state (new, good, fair).

Signals below the lower control limit 264 provide an indication between a component state of poor and eventually failure. In an embodiment, when the grouping of the "R" signals 234 is close to the lower control limit 264, they provide an indication of a poor component state. As the signals or a grouping of the "R" signals 234 move further away from the lower control limit 264, they provide an indication of a failure component state up to the point of component failure 210. In an alternative embodiment, the "R" signals 234 and the moving average 218 provide an indication of either a poor or failure component state. In this embodiment, the moving average 218 is between minus 1 SD 260 and minus 2SD 262 with "R" signals disposed beneath this section of the moving average 218.

In summary, telematics predictive component failure frameworks and categories of component states are enabled through distinct patterns and values revealed in the derived data from the raw telematics data 200 captured over the life cycle of a vehicle components useful life. For the example of a vehicle battery, voltages, the moving average 218 and derived signals show distinct patters prior to and after a component event 211. Voltage readings are decreasing with less recovery and individual voltage events are creating signals prior to the component event 211 of a failure event 210. After the component event 211, assuming a maintenance event 220, higher voltage levels are indicated when a battery has been replaced with a new battery.

Telematics Predictive Component Failure Data

Figure 25:
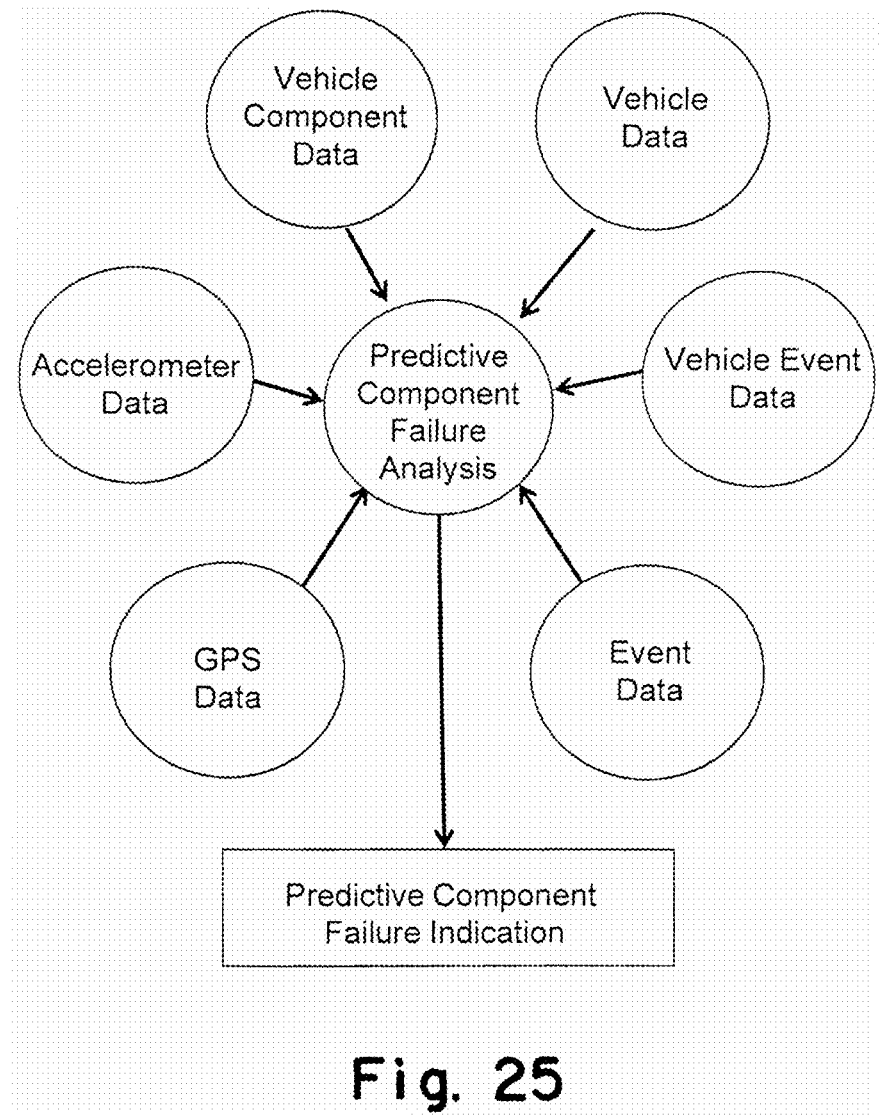
FIG. 25 is a diagrammatic view illustrating different sources of raw data for vehicle component failure analysis and prediction.

Referring now to FIG. 25, the different types of raw telematics data useful alone or in combination for predictive component failure and maintenance validation are described. The vehicular telemetry hardware system 30 has the capability to monitor and log many different types of telematics data to include GPS data, accelerometer data, vehicle component data (data specific to the component being assessed for predictive failure or maintenance validation), vehicle data and vehicle event data. In addition, event data may be supplemented to the log of raw telematics data provided by the vehicular telemetry hardware system 30. The predictive component failure analysis process uses the raw telematics data and event data to provide a predictive component failure indication, a recommendation for maintenance and validation or indication of a maintenance activity.

The GPS module 33 provides GPS data in the form of latitude and longitude data, time data and speed data that may be applied to indicate motion of a vehicle. The accelerometer 34 provides accelerometer data that may be applied to indicate forward motion or reverse motion of the vehicle.

Vehicle data includes the first category of raw telematics vehicle data and information such as a vehicle component type or identification, vehicle speed, engine RPM and two subsets of data. The first subset of data is the vehicle component data. Vehicle component data is specific parameters monitored over the life cycle and logged for a particular vehicle component being assessed for predictive component failure. For example, if the vehicle component if a vehicle battery, then raw battery voltages and minimum cranking voltages are monitored and logged. The second subset of data is vehicle event data. This may be a combination of vehicle data applied or associated with a vehicle event or a vehicle component event. For example, if the vehicle component is a vehicle battery and the event is a cranking event, then the vehicle data event may include one or more of ignition on data, engine RPM data, degrease in battery voltage data, speed data and/or accelerometer data.

Event data typically includes a record of a vehicle event. This may include one or more of a maintenance event, a repair event or a failure event. For example, with a vehicle battery the maintenance event would be a record of charging or boosting a battery. A repair event would be a record of replacing the battery. A failure event would be a record of a dead battery. Event data typically includes a date and time associated with each event.

Telematics Predictive Component Event Determination Process

Figure 26:
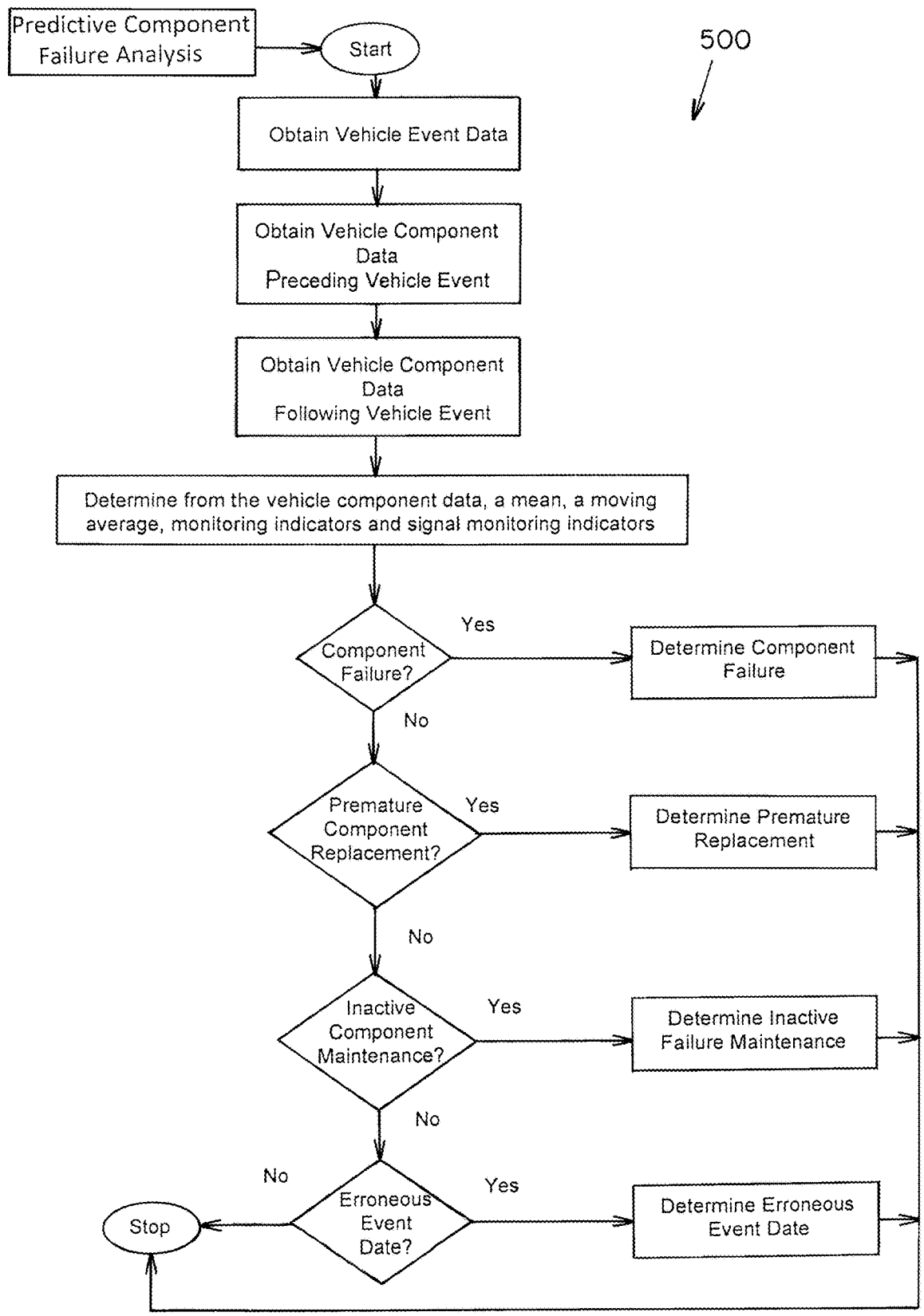
FIG. 26 is a diagrammatic view of a process for predictive component failure analysis.

Referring now to FIG. 26, the predictive component failure analysis process is described. The predictive component failure analysis process is generally indicated at 500. This process and logic may be implemented in a server 19 or in a computing device 20 or in a vehicular telematics hardware system 30 or a combination of a server, computing device and vehicular telematics hardware system. This process may also be implemented as a system including a vehicular telematics hardware system 30 and a remote device 44. Finally, this process may also be implemented as an apparatus that includes a vehicular telematics hardware system 30. The process begins by receiving historical data. The historical data includes vehicle event data and raw telematics data 200. The raw telematics data 200 includes vehicle component data. The vehicle component data includes vehicle component data before one or more vehicle events and after one or move vehicle events. Vehicle component data is the historical operational data obtained over time from a vehicular telemetry hardware system 30 (see FIG. 1). Vehicle component data includes operational data for at least one vehicle component. Vehicle component data is also the life cycle data for a component from a new installation to failure situation. Alternatively, vehicle component data is from a good operational component to a failed operation component.

Vehicle component data includes operational component data from at least one type of vehicle based upon fuel based vehicles, hybrid based vehicles or electric based vehicles. The broad categories include: fuel and air metering, emission control, ignition system control, vehicle idle speed control, transmission control and hybrid propulsion. These broad categories are based upon industry OBDII fault or trouble codes either generic or vehicle manufacturer specific. The vehicle component data may include one or more data generated by thermostat or temperature sensors (oil, fuel, coolant, transmission fluid, electric motor coolant, battery, hydraulic system), pressure sensors (oil, fuel, crankcase, hydraulic system), or other vehicle components, sensors or solenoids (fuel volume, fuel shut off, camshaft position, crankshaft position, 02, turbocharger, waste gates, air injections, mass air flow, throttle body, fuel and air metering, emissions, throttle position, fuel delivery, fuel timing, system lean, system rich, injectors, cylinder timing, engine speed conditions, charge air cooler bypass, fuel pump relay, intake air flow control, misfire (plugs, leads, injectors, ignition coils, compression), rough road, crankshaft position, camshaft position, engine speed, knock, glow plug, exhaust gas recirculation, air injection, catalytic convertor, evaporative emission, vehicle speed, brake switch, idle speed control, throttle position, idle air control, crankcase ventilation, air conditioning, power steering, system voltage, engine control module, throttle position, starter motor, alternator, fuel pump, throttle accelerator, transmission control, torque converter, transmission fluid level, transmission speed, output shaft speed, gear positions, transfer box, converter status, interlock, torque, powertrain, generator, current, voltage, hybrid battery pack, cooling fan, inverter and battery).

An example of vehicle component data is battery voltages during operational use of a vehicle battery or battery voltages based upon a cranking event. The cranking event produces a minimum battery voltage followed by a maximum battery voltage as the battery is recharging to replace the energy used by a vehicle starter motor.

The vehicle event data typically includes a date, or date and time, and the type of vehicle event. The type of vehicle event may be failure, maintenance or service. For example, a failure of a vehicle battery is when the vehicle would not start. Maintenance of a vehicle battery could be replacement of the vehicle battery. Service of a vehicle battery could be a boost.

For each vehicle component under analysis, the moving average 218 from the vehicle component data to filter the vehicle component data is determined. Alternatively, an average moving range or median moving range could be determined.

One example of determining the upper control limit 252 from the vehicle component data will now be described. In an embodiment, the upper control limit 252 is determined from the vehicle component data by multiplying the moving range by 3.14 and adding it to the average. In another embodiment, the upper control limit 252 is determined from the vehicle component data by multiplying the average moving range by 2.66 and addition it to the average. In another embodiment, the upper control limit 252 is determined from the vehicle component data by multiplying the median moving range by 3.87. In another embodiment, the upper control limit 252 is determined from the vehicle component data by multiplying the average moving range by 3.27.

One example of determining the lower control limit 264 from the vehicle component data will now be described. In an embodiment, the lower control limit 264 is determined from the vehicle component data by multiplying the moving range by 3.14 and subtracting it from the average. In another embodiment, the lower control limit 264 is determined from the vehicle component data by multiplying the average moving range by 2.66 subtracting it from the average. In another embodiment, the lower upper control limit 264 is determined from the vehicle component data by multiplying the median moving range by 3.87. In another embodiment, the lower control limit 264 is determined from the vehicle component data by multiplying the average moving range by 3.27.

Persons skilled in the art appreciate the constants of 3.14, 3.87, 2.66 and 3.27 are scaling factors needed to convert the data into appropriate operational limits and that other scaling factors may be applied to determine the upper control limit and the lower control limit from the vehicle component data.

One example of determining from the vehicle component data, a plus and minus standard deviation (256, 260), and a plus and minus two standard deviations (254, 262) will now be described. The determined upper control limit 264, the lower control limit 264, the plus and minus standard deviation (256, 260) and the plus minus two standard deviations (254, 262) are the determined set of first component monitoring indicators 222. Alternatively, the areas intermediate each component monitoring indicators 222 could be applied as a second set of component monitoring indicators 224. Alternatively, either the first set of component monitoring indicators 222 or the second set of component monitoring indicators 224 could be grouped to provide a third set of component monitoring indicators 226. In an embodiment, the third set of component monitoring indicators 226 are grouped to provide indications of a new, good, fair, or poor component. For a new indication, the grouping is between the upper control limit 252 and plus two standard deviation 254. In embodiments, for a good indication, the grouping is between plus two standard deviation 254 and minus two standard deviation 262. For a fair indication, the grouping is between minus two standard deviation 262 and the lower control limit 264. For a poor indication, the grouping is below the lower control limit 264. Grouping provides a different set of variations from the vehicle component data to better gage the operational use and state of a vehicle component.

One example of determining at least one signal monitoring indicator from the vehicle component data will now be described. The signal monitoring indicators may include a first signal, a second signal, a third signal and a fourth signal. A first signal ("R") when a single data point value from the vehicle component data is below the lower control limit 264 value is determined and identified. A second signal ("Y") when a series of 8 consecutive data point values from the vehicle component data are on the same side of the mean value and either between the mean value and the upper control limit 252 value or the mean value and the lower control limit 262 is determined and identified. A third signal ("O") when a series of 4 out of 5 consecutive data point values from the vehicle component data are either on the same side of the mean value and greater than one sigma value or on the same side of the mean value and greater than minus one sigma value is determined and identified. A fourth signal ("B") when a series of 2 out of 3 consecutive data point values from the vehicle component data are either between the mean value and greater than the two sigma value or between the mean value and greater than the minus two sigma value is determined and identified.

The next sequence in the process is component failure analysis. Component failure analysis uses the component event data and at least one of the determined mean, determined moving average, determined moving range, the first set of component indicators, the second set of component indicators, the third set of component indicators and/or at least one signal monitoring indicator. In embodiments, the analysis compares the determined data values from the component data before the component event, or after the component event, or before and after the component event. The analysis determines one of a component failure, a premature replacement, inactive failure maintenance or an erroneous component event. The analysis also determines a set of criteria for determining one of a component failure, a premature replacement, inactive failure maintenance or an erroneous component event. The criteria are in the form of a plurality of indicators such as a failure indicator, predictive maintenance indicator and a maintenance validation indicator.

Figure 27:
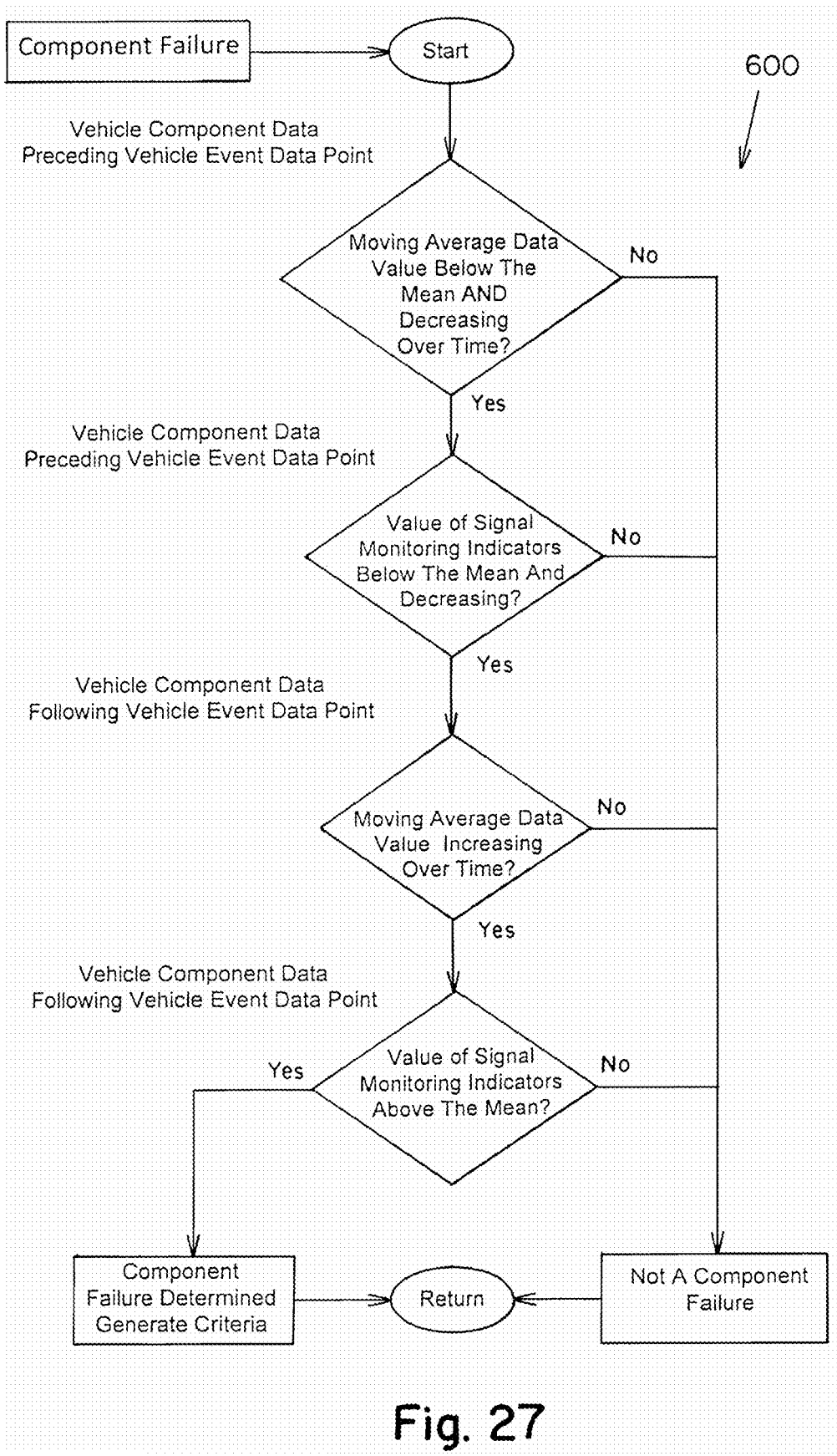
FIG. 27 is a diagrammatic view of a process for detecting component failure in association with FIG. 25.

Referring now to FIG. 17, FIG. 19 and FIG. 27, the component failure determination logic is described. The logic is generally indicated at 600. For this case, the vehicle event data point includes a date and a known vehicle component event of failure.

For the vehicle component data preceding the vehicle event data point, if the moving average data value is not below the mean and not decreasing over time, indicate this is not a vehicle component failure. If the moving average data value is below the mean and decreasing over time, continue to check the signal monitoring indicators.

For the vehicle component data preceding the vehicle event data point, if the value of the signal monitoring indicators is not below the mean and not decreasing, indicate this is not a vehicle component failure. If the value of the signal monitoring indicators is below the mean and decreasing, check the moving average data point.

For the vehicle component data following the vehicle event data point, if the moving average data is not increasing over time, indicate this is not a vehicle component failure. If the moving average data value is increasing over time, check the signal monitoring indicators.

For vehicle component data following the vehicle event data point, if the value of the signal monitoring indicators is not above the mean, indicate this is not a vehicle component failure. If the value of the signal monitoring indicators is above the mean, indicate component failure.

The determined criteria to indicate a component failure is at least one of a moving average below the mean and decreasing before the vehicle event data point, signal monitoring indicators below the mean and above the upper control limit before the vehicle event data point, the fourth set ("R") of signal monitoring indicators below the lower control limit and moving further away from the lower control limit preceding the vehicle event data point. The fourth set ("R") of signal monitoring indicators below the moving average before the vehicle event data point.

Figure 28:
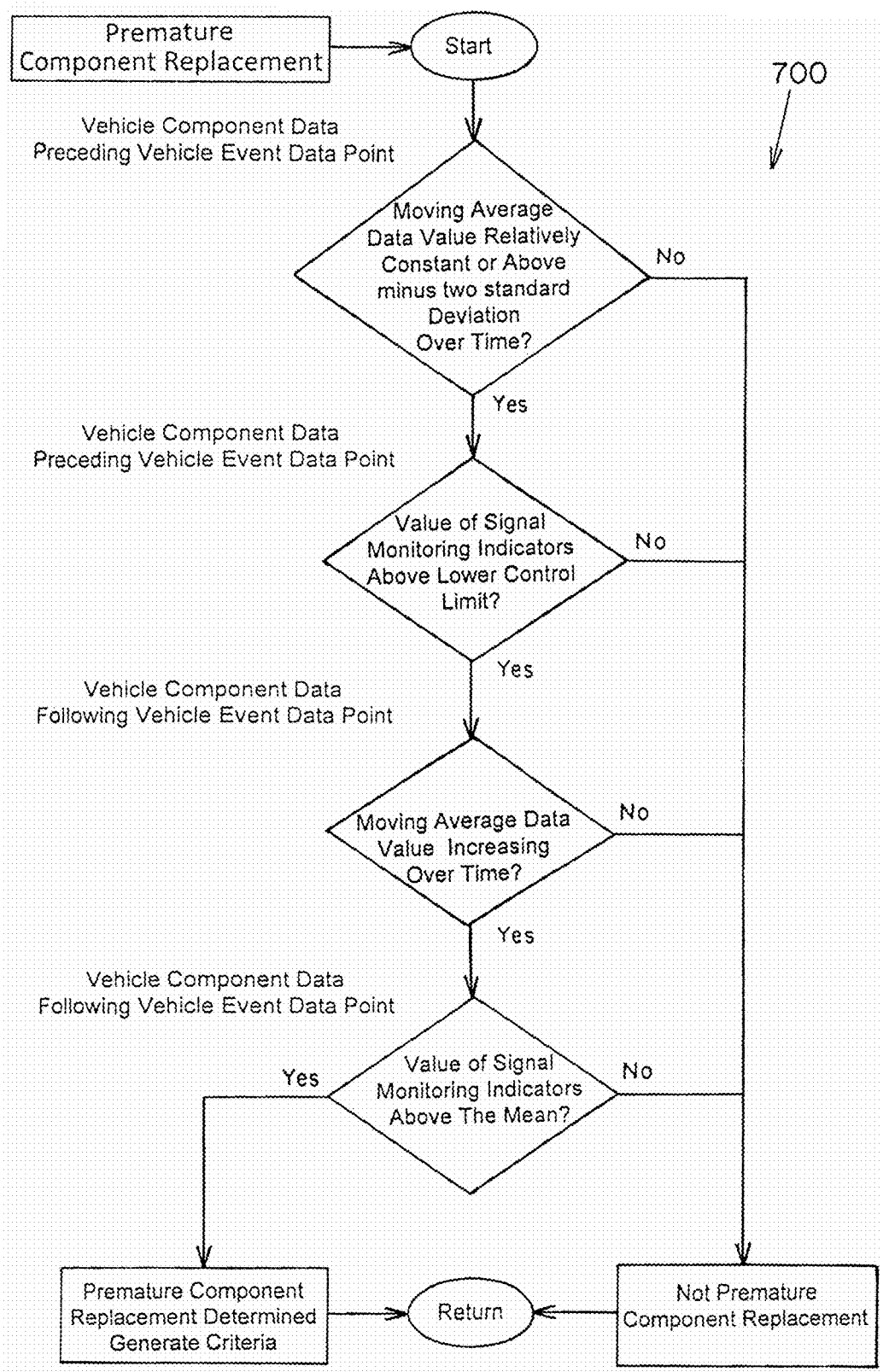
FIG. 28 is a diagrammatic view of a process for detecting premature component replacement in association with FIG. 25.

Referring now to FIG. 17, FIG. 21 and FIG. 28, the premature component replacement determination logic is described. The logic is generally indicated at 700. For this case, the vehicle event data point includes a date and a known vehicle component event of component replacement.

For the vehicle component data preceding the vehicle event data point, if the moving average data value is not relatively constant or is below minus two standard deviation over time, indicate this is not a premature component replacement event. If the moving average data value is relatively constant or above minus two standard deviation over time, then continue and check the signal monitoring indicators.

For the vehicle component data preceding the vehicle event data point, if the value of signal monitoring indicators is below the lower control limit, indicate this is not a premature component replacement event. If the value of the signal monitoring indicates is above the lower control limit, then continue and check the moving average data value following a vehicle event data point.

For the vehicle component data following the vehicle event data point, if the moving average data value is not increasing over time, indicate this is not a premature component replacement event. If the moving average data value is increasing over time, then continue and check the signal monitoring indicators.

For the vehicle component data following the vehicle event data point, if the value of signal monitoring signals is not above the mean, indicate this is not a premature component replacement event. If the value of signal monitoring signals is above the mean, indicate a premature component event.

The determined criteria to indicate a premature component replacement event is at least one of a moving average above minus one standard deviation or signal monitoring indicators above the upper control limit before the vehicle event data point.

Figure 29:
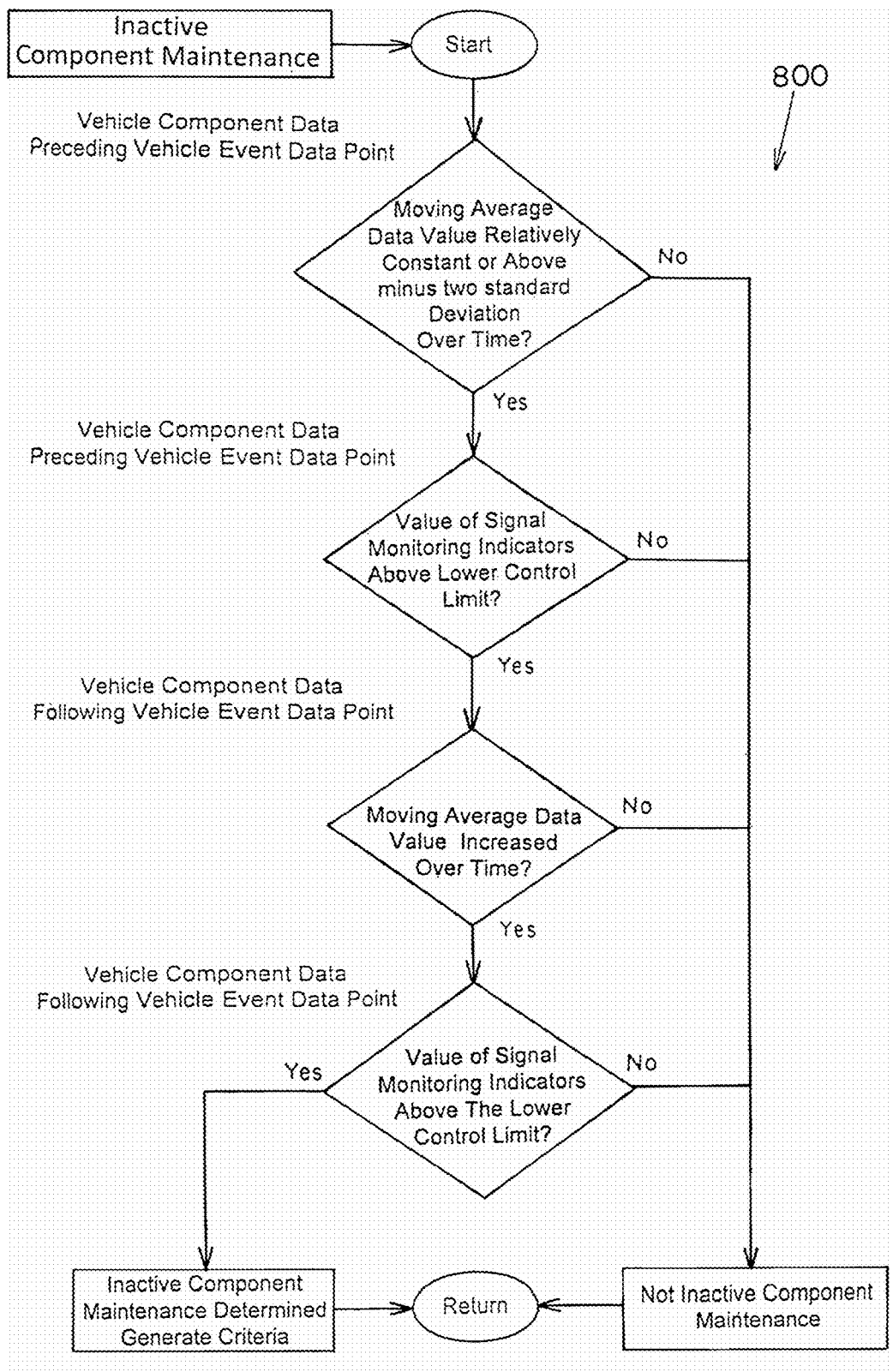
FIG. 29 is a diagrammatic view of a process for detecting inactive component maintenance in association with FIG. 25.

Referring now to FIG. 17, FIG. 23 and FIG. 29, the inactive component maintenance determination logic is described. The logic is generally indicated at 800. For this case, the vehicle event data point includes a date and a known vehicle component event of inactive maintenance.

For the vehicle component data preceding the vehicle event data point, if the moving average data value is not relatively constant or is below minus two standard deviation over time, indicate this is not an inactive component maintenance event. If the moving average data value is relatively constant or above minus two standard deviation over time, then continue and check the signal monitoring indicators.

For the vehicle component data preceding the vehicle event data point, if the value of signal monitoring indicators is below the lower control limit, indicate this is not an inactive component maintenance event. If the value of the signal monitoring indicates is above the lower control limit, then continue and check the moving average data value following a vehicle event data point.

For the vehicle component data following the vehicle event data point, if the moving average data value is not increasing over time, indicate this is not an inactive component maintenance event. If the moving average data value is increasing over time, then continue and check the signal monitoring indicators.

For the vehicle component data following the vehicle event data point, if the value of signal monitoring signals is not above the mean, indicate this is not an inactive component maintenance event. If the value of signal monitoring signals is above the mean, indicate an inactive component maintenance event.

The determined criteria to indicate an inactive component maintenance event is at least one of a moving average above minus one standard deviation or signal monitoring indicators above the upper control limit before the vehicle event data point.

Figure 30:
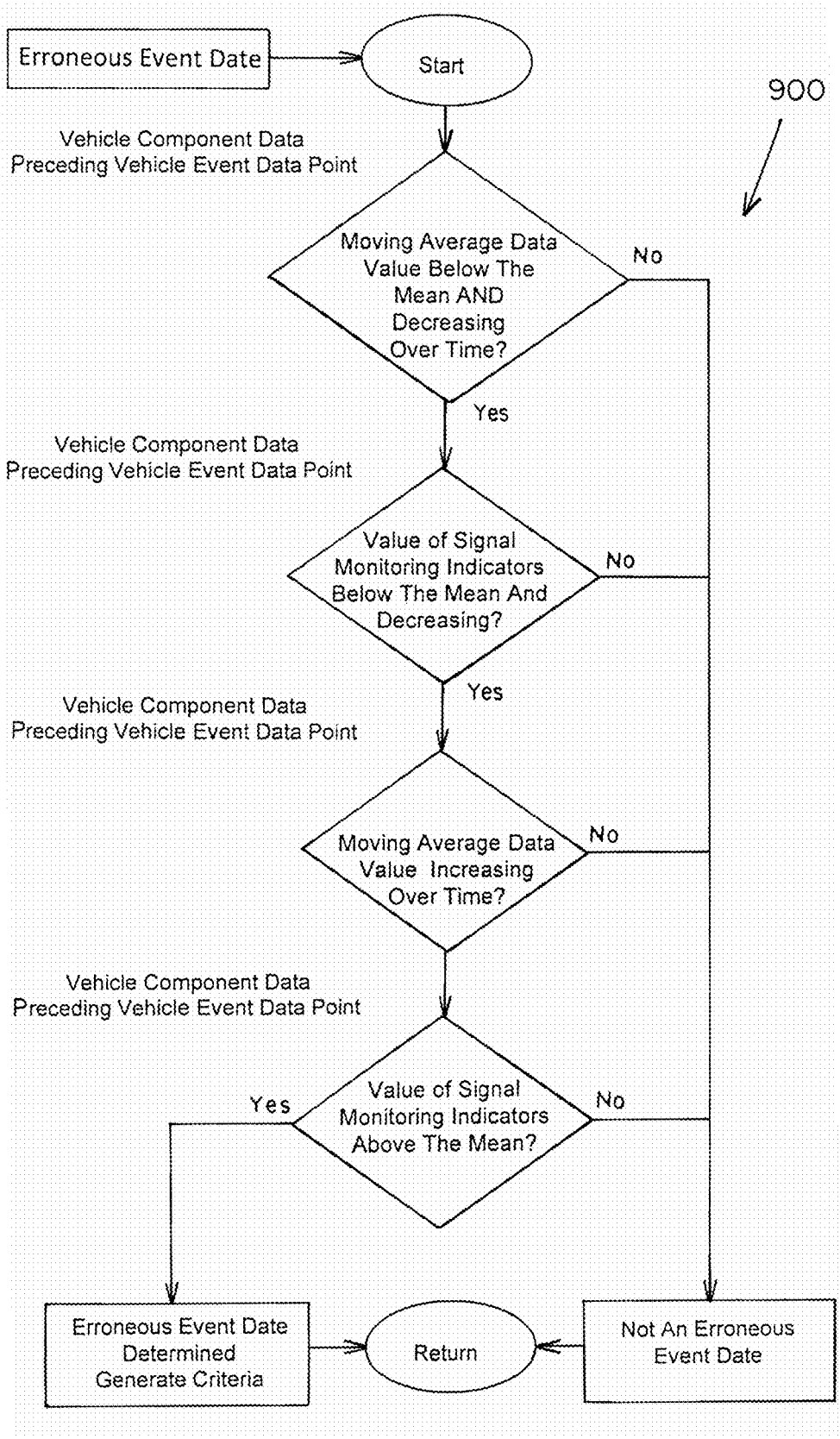
FIG. 30 is a diagrammatic view of a process for detecting an erroneous event date in association with FIG. 25.

Referring now to FIG. 17, FIG. 22 and FIG. 30, the erroneous event date determination logic is described. The logic is generally indicated at 700. For this case, the vehicle event data point includes a date and a known vehicle component event of component failure.

For the vehicle component data preceding the vehicle event data point, if the moving average data value is not relatively constant or is below minus two standard deviation over time, indicate this is not an erroneous date event. If the moving average data value is relatively constant or above minus two standard deviation over time, then continue and check the signal monitoring indicators.

For the vehicle component data preceding the vehicle event data point, if the value of signal monitoring indicators is below the lower control limit, indicates this is not an erroneous date event. If the value of the signal monitoring indicates is above the lower control limit, then continue and check the moving average data value following a vehicle event data point.

For the vehicle component data following the vehicle event data point, if the moving average data value is increasing over time, indicate this is not an erroneous date event. If the moving average data value is not increasing over time, then continue and check the signal monitoring indicators.

For the vehicle component data following the vehicle event data point, if the value of signal monitoring signals is not above the mean, indicate this is not an erroneous date event. If the value of signal monitoring signals is above the mean, indicate an erroneous date event.

The determined criteria to indicate an erroneous date event is at least one of a moving average above minus one standard deviation or signal monitoring indicators above the upper control limit before the vehicle event data point.

Telematics Component Condition Monitoring Process

Figure 31:
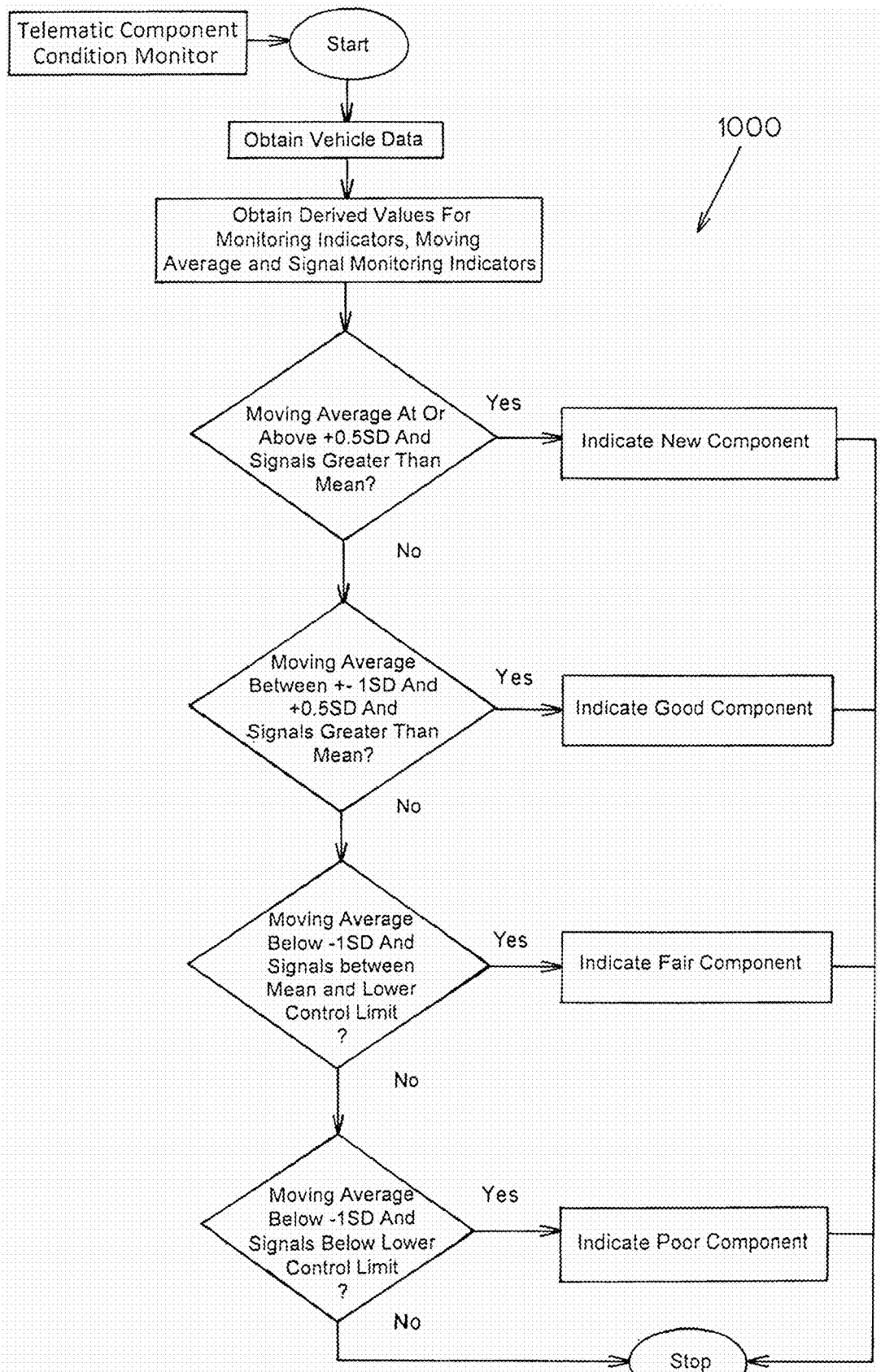
FIG. 31 is a diagrammatic view of a process for monitoring and reporting a vehicle component condition.

Referring now to FIG. 17, FIG. 23 and FIG. 31, the telematics component condition monitoring logic is described. The logic is generally indicated at 1000. This process and logic may be implemented in a server 19 or in a computing device 20 or in a vehicular telematics hardware system 30 or a combination of a server, computing device and vehicular telematics hardware system. This process may also be implemented as a system including a vehicular telematics hardware system 30 and a remote device 44. Finally, this process may also be implemented as an apparatus that includes a vehicular telematics hardware system 30.

The process begins by obtaining operational component data. In some embodiments the operational component data includes operational vehicle component data, for example battery voltages and battery voltages based upon a vehicle engine start from cranking an engine with a starter motor.

Predictive indicator parameters based upon historical operational life cycle use are also obtained. In embodiments the historical operational life cycle data include one or more of filtered data, a moving average, a running average, a mean, plus one standard deviation, plus two standard deviation, an upper control limit, minus one standard deviation, minus two standard deviation or a lower control limit. The predictive indicator parameters may also include signal monitoring indicators and values ("R" signal values, "Y" signal values, "B" signal values and "O" signal values. The predictive indicator parameters are predetermined from the historical operational life cycle data.

A comparison is made between the operational component data and one or more of the predictive indicator parameters checking for new component status. A new component status is determined and based upon one or more predictive indicator parameters alone or in combination. In an embodiment, a new component status is indicated when a moving average is increasing from minus two standard deviation to a minus one standard deviation. Alternatively, a new component status is indicated when the moving average is increasing from minus one standard deviation to a mean. Alternatively, a new component status is indicated when a moving average in increasing from a mean to plus one standard deviation. Alternatively a new component status is indicated when signals are between a mean and an upper control limit or signals are between plus two standard deviation and an upper control limit. The signals include a mix of "B", "Y" and "O" signal values.

Another comparison is made between the operational component data and one or more of the predictive indicator parameters checking for a good component status. A good component status is determined and based upon one or more predictive indicator parameters alone or in combination. In an embodiment, a good component status is indicated when a moving average has a relatively constant slop between a mean and plus two standard deviation. Alternatively, a good component status is indicated when signals are present between a mean and plus two standard deviation. In an embodiment, the signals include a mix of "Y" and "O" signal values. In another embodiment, the signals further include "B" signal values. In an embodiment, there are more signals above the moving average and less signals below the moving average. In another embodiment, the number of signals above and below the moving average are substantially equal in number.

Another comparison is made between the operational component data and one or more of the predictive indicator parameters checking for a fair component status. A fair component status is also based upon one or more predictive indicator parameters alone or in combination. In an embodiment, a fair component status is indicated when a moving average is decreasing from a mean to minus one standard deviation. Alternatively, a fair component status is indicated when a moving average is decreasing from minus one standard deviation to minus two standard deviation. Alternatively, a fair component status is indicated with signals between a mean and a lower control limit. The signals may be one or more of "o", "Y" and "B" signal values. Alternatively, the signals may include "R" signal values at or below the lower control limit.

Another comparison is made between the operational component data and one or more of the predictive indicator parameters checking for a poor component status. A poor component status may include more than one indication of poor. For example, a first level of poor indication may be provided. This occurs when a moving average is decreasing between a mean and minus 1 standard deviation with signals below a lower control limit. In an embodiment, the signals are "R" signal values. A second level of poor indication may also be provided. This occurs when a moving average is decreasing from minus one standard deviation to minus two standard deviation with signals below a lower control limit. In an embodiment, the signals are "R" signal values. In addition, the first level of poor indication and second level of poor indication may be combined to provide an overall indication of poor.

If the moving average is below −1SD and the signals are below the lower control limit, indicate the component status as poor. In an embodiment, the signals include "R" signals below the lower control limit. The number of "R" signals is increasing and the "R" signals are moving further away from the lower control limit. When the moving average is at or below −2SD with "R" signals, the component status is very poor. Alternatively, the signals include "O" and "B" between the mean and the lower control limit.

In an embodiment, the predictive indicator parameters are based upon a collection of vehicle components. The predictive indicator parameters may be separated by the different types of vehicle engine and different types of fuel (gas, diesel, hybrid or electric. The predictive indicator parameters may be further based upon vehicles with the same or similar vehicle characteristics.

For example, if the vehicle component is a battery, then a criteria for a battery replacement status could be the when the current minimum voltage as represented by the operational component data of 8.5 volts from a cranking event. Alternatively, another criteria could be when the variation of the voltage is more than 0.85 volts from a cranking event. A battery rating of 10.70 may further be a criteria for a battery replacement indication. Each battery may receive a percentile ranking and if the percentile ranking is below 6.25% this may be a criteria for a battery replacement indication. The percentile ranking could further be district based (local operational area) or nationally based (broad operational area).

Telematics Optimal Component Replacement Indication Process

Figure 32:
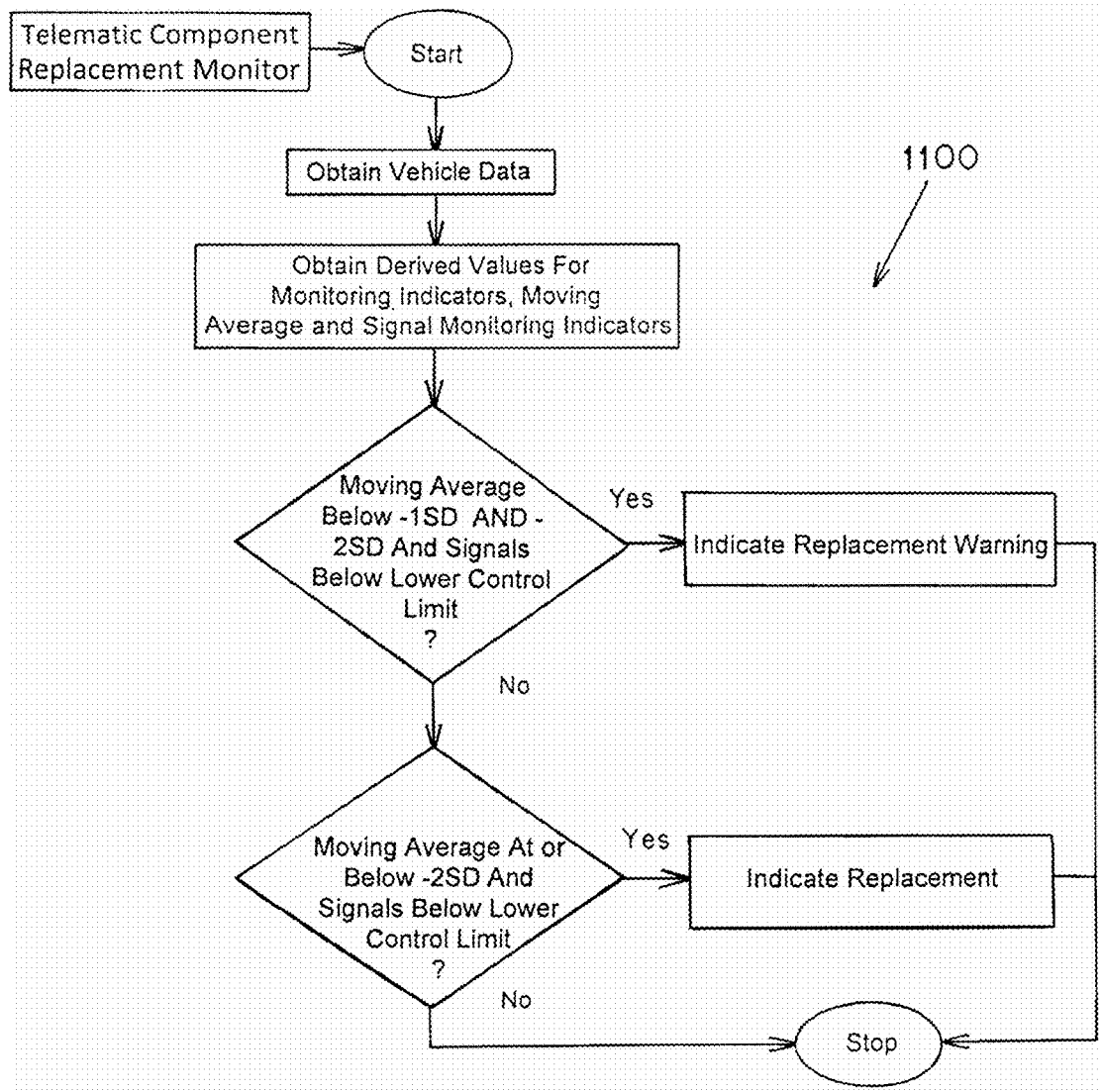
FIG. 32 is a diagrammatic view of a process for monitoring and reporting a vehicle component replacement condition.

Referring now to FIG. 17, FIG. 23 and FIG. 32, the telematics component condition monitoring logic is described. The logic is generally indicated at 1100. This process and logic may be implemented in a server 19 or in a computing device 20 or in a vehicular telematics hardware system 30 or a combination of a server, computing device and vehicular telematics hardware system. This process may also be implemented as a system including a vehicular telematics hardware system 30 and a remote device 44. Finally, this process may also be implemented as an apparatus that includes a vehicular telematics hardware system 30.

This process begins by obtaining operational component data. In embodiments the operational component data include operational vehicle component data, for example battery voltages and battery voltages based upon a vehicle engine start from cranking an engine with a starter motor.

Predictive indicator parameters based upon historical operational life cycle use are obtained. In embodiments the historical operational life cycle data includes one or more of filtered data, moving average, running average, mean, plus one standard deviation, plus two standard deviation, an upper control limit, minus one standard deviation, minus two standard deviation or a lower control limit. The predictive indicator parameters are predetermined from the historical operational life cycle data.

A comparison between a sample of operational component data is made with one or more predictive indicator parameters. The one or more predictive indicator parameters in include a moving average, a mean, minus one standard deviation, a lower control limit and signals. In embodiments, the comparison is made for a warning status and a replace status. The warning status provides a more time to replace the vehicle component before the replace status. The replace status is close to the point of vehicle component failure. A sample of operational component data includes data over a day of operation or a few days of operation of a vehicle. Alternatively, a sample of operational component data includes eight separate data points of operational data. Alternatively, a sample of operational component data includes at least eight separate data points of operational data.

A component replacement status may be determined and indicated as a warning status. In an embodiment, a warning status is determined if the sample of operational component data has a moving average decreasing from a mean to minus one standard deviation with signals between a mean and lower control limit and different signals at or below a lower control limit. The signals between the mean and lower control limit are above and below a moving average. They include "B" signal values and "Y" signal values. Additionally, signals at or below the lower control limit are "R" signal values.

A component replacement status may also be determined and indicated as a replacement status. In an embodiment, a replacement status is determined if the sample of operational component data has a moving average decreasing from a minus one standard deviation to a minus two standard deviation with signals between a mean and lower control limit and different signals at or below a lower control limit. The signals between the mean and lower control limit are above and below a moving average. They may include "B" signal values and "Y" signal values and "O" signal values. Additional signals at or below the lower control limit are "R" signal values.

Telematics Predictive Indicators of Vehicle Component Status

Referring now to FIG. 15, FIG. 16, FIG. 17, FIG. 35 and FIG. 36, determining and identifying predictive indicators of vehicle component status is described. This process and logic may be implemented in a server 19 or in a computing device 20 or in a vehicular telematics hardware system 30 or a combination of a server, computing device and vehicular telematics hardware system. This process may also be implemented as a system including a vehicular telematics hardware system 30 and a remote device 44. Finally, this process may also be implemented as an apparatus that includes a vehicular telematics hardware system 30. The determining process is illustrated at 1200 in FIG. 35 and the identifying process is illustrated at 1210 in FIG. 35. Both processes may be implemented as a method or as a system. In the case of a system, the system includes a telematics hardware device 30 and a remote device 44. The telematics hardware device 30 monitors and logs operational component data. This data includes operational values from various vehicle components. The operational component data also includes vehicle component data based upon measured component events such as a cranking event. The operational component data is communicated from the telematics hardware device 30 to remote device 44. Over time, the logs of operational data provide an operational life cycle view of vehicles components from new, good, fair, poor and failure.

In addition, management event data is also captured over time. Management data provides vehicle component records in the form of component or vehicle events. Vehicle component events may be a failure event, a repair event or a replace event depending upon the corrective action of a management event.

The process begins by access or obtaining management event data. Then, operational vehicle component data is accessed or obtained prior to a management event data point and following a management event data point (prior and post). The operational vehicle component data is filtered. Filtering provides a moving average or a running average of the operational vehicle component data. In addition, signals are derived from the operational vehicle component data. The derived signals may be identified between a lower control limit and an upper control limit, between a mean and upper control limit, between minus one standard deviation and plus one standard deviation, or between minus two stand deviation and plus two standard deviation. In addition, the signals may be above a moving average 218, on either side of a moving average 218, below a moving average 218 or moving from above a moving average 218 to below a moving average 218. The derived signals are representative of a measured component event, for example a cranking event. A cranking event is an example of an operational event that places a high operational load on a vehicle component within the limits of the component. The cranking event provides a series of battery voltages starting with the ignition on voltage, a voltage representative of an active starter motor, a voltage after cranking where the battery is charging followed by a recovery voltage as energy is replaced into the battery following the cranking event. A lower cranking event voltage produces more signals. The operational component data is associated with the management event data typically by database records.

A check for real time predictive indicators occurs to identify potential real time predictive indicators of operational vehicle component status. The check involves comparing the filtered operational component data and one or more signals prior to a vehicle component event data point. There is also a comparison of filtered operational component data with one or more signals post a vehicle component event data point. The results of the comparison identify vehicle component status and associated predictive indicators of component status such as a new component, or a good component, or a fair component, or a poor component, or a replaced component, or a failed component. The check also may involve alone or in combination comparing the filtered operational component data and signals with an upper control limit 252, plus two standard deviation 254, plus one standard deviation 256, a mean value 258, minus one standard deviation 260, minus two standard deviation 262 and a lower control limit 264. The check also may involve alone or in combination comparing the filtered operation component data within zones representative of vehicle component status. For example, a monitoring indicator framework may also be associated with the operational component data and the management event data. The monitoring indicator framework includes different zones or areas representative of vehicle component status. For example a first zone 240 representative of a relatively new component, a second zone 242 for a good component, a third zone 244 for a fair component, a fourth zone for poor component, a fifth zone 248 for a failed component and a sixth zone 216 for a new component.

The filtered operational component data and signals have a particular or unique pattern for the case of a new vehicle component status. This is illustrated within the sixth zone 250 that follows a failure event 210. There are a number of predictive indicators and parameters for operational status that are identified by a check or examination from within the sixth zone 250. Each predictive indicator may be alone or in combination with other predictive indicators. A moving average 218 predictive indicator is identified to be initially increasing in value from minus two standard deviation 262 towards plus one standard deviation. Signal indicators are identified to be initially grouped between a mean 258 and an upper control limit and above the moving average 218. The signals include a mix of "Y" signal values, "O" signal values and "B" signal values. Then, the moving average 218 predictive indicator is further identified to be relatively constant around a plus 1 standard deviation 256 or the moving average is between a mean value 258 and plus two standard deviation 254. At this point, the signal indicators are further identified to be grouped between a mean value 258 and an upper control limit 252 on either side of the moving average 218. The signals continue to include a mix of "Y" signal values, "O" signal values and "B" signal values. Each of the identified predictive indicators for a vehicle component status of new is recorded.

The filtered operational component data and signals also have a particular or unique pattern for the case of a good vehicle component status. This is illustrated within the second zone 242 that follows new vehicle component status in the sense of the vehicle component life cycle. There are another number of predictive indicators and parameters for operational status that are identified by a check or examination from within the second zone 242. Again, each predictive indicator may be alone or in combination with other predictive indicators. A moving average 218 predictive indicator is identified between a mean value 258 and an upper control limit 252. The moving average 218 is relatively constant between a mean value 258 and plus one standard deviation 256. Signal indicators are also identified and grouped between a mean value 258 and an upper control limit 252. These signal indicators are also predominately above the moving average 218. These signal indicators are a mix of "Y" signal values and "O" signal values. There may be a few "B" signal values as well. Each of the identified predictive indicators for a vehicle component status of good is recorded.

The filtered operational component data and signals have yet another particular or unique pattern for the case of a fair vehicle component status. This is illustrated within the third zone 244. There are a number of predictive indicators and parameters for operational status that are identified by a check or examination from within the third zone 244. Each predictive indicator in this zone may also be alone or in combination with other predictive indicators. A moving average 218 predictive indicator identified to be relatively constant and located between plus one standard deviation 256 and minus one standard deviation 260. There are signal predictive indicators grouped on either side of a mean value 258. Above the moving average 218 the signals are a mix of "Y" signal values and "O" signal values. Below the moving average 218 there are a mix of "Y" signal values, "O" signal values and "B" signal values. In addition, there may also be a grouping "R" signal values below a lower control limit 264. The "R" signal values are relatively constant in value and close to the lower control limit value. Each of the identified predictive indicators for a vehicle component status of fair is recorded.

The filtered operational component data and signals have yet another particular or unique pattern for the case of a poor vehicle component status. This is illustrated within the fourth zone 246. There are a number of predictive indicators and parameters for the operational status that are identified by a check or examination from within the fourth zone 246. Again, each predictive indicator in this zone may also be alone or in combination with other predictive indicators. The moving average predictive indicator is decreasing in value from a mean value 258 towards minus two standard deviation 262. The moving average predictive indicator may be further segmented into a range. The first range occurs when the moving average 218 is decreasing from a mean value 258 to minus one standard deviation 260. A second range occurs when the moving average 218 further decreases from minus one standard deviation 260 to minus two standard deviation 262. Signal indicators are also identified to be between a mean value 258 and a lower control limit 264. The signals include a mix of "Y" signal values and "B" signal values on either side of the moving average 218. There may also be a small number of "O" signal values below the moving average 218 and further associated with the first range. In addition, there may also be "R" signal values below the lower control limit 264. Each of the identified predictive indicators for a vehicle component status of fair is recorded.

The filtered operational component data and signals also have another particular or unique pattern for the case of a replace vehicle component status. This is illustrated within the fifth zone 248. Optionally, the indicators from the poor vehicle component status may be combined with the replace vehicle component status to provide an additional level to monitor and gauge replacement of a vehicle component. There are a number of predictive indicators and parameters for operational status that are identified by a check or examination from within the fifth zone 248. Again, each predictive indicator may be alone or in combination with other predictive indicators. The fifth zone 248 does not have a moving average indicator (located in the fourth zone 246). There is a grouping of signals below the lower control limit 264. The group of signals below the lower control limit 264 is moving further away from the lower control limit 264. The signals are solely "R" signal values.

The indicators and parameters for a replace vehicle component status may be further grouped to provide a better indication towards vehicle component replacement when combining indicators and parameters for both the fourth zone 246 and the fifth zone 248. A replacement warning may be indicated. This occurs when the moving average 218 is decreasing from a mean value 258 to minus one standard deviation 260 with signals between the mean value 258 and the lower control limit 264. The signals are above and below the moving average 218 and include a mix of "O" signal values, "Y" signal values and "B" signal values. In addition, there are signals below the lower control limit 264 and these signals are "R" signal values. A replacement warning may also be indicated. This occurs when the moving average 218 is decreasing from minus one standard deviation 260 towards minus two standard deviation 262. The signals are between the mean value 258 and the lower control limit and are above and below the moving average 218. These signals are "B" signal values and "Y" signal values. In addition, there are signals below the lower control limit 264 and these signals are "R" signal values. The "R" signal values are moving further away in value from the lower control limit 264. Each of the identified predictive indicators for this vehicle component status is recorded.

Technical Effects

Embodiments described herein provide one or more technical effects and improvements, for example, an ability to determine a set of monitoring indicators and signal monitoring indicators based upon a historical telematics record of component life cycle use data; an ability to determine and derive monitoring indicator ranges and metrics and signal monitoring values from component life cycle use data; an ability to predict component failure, premature component replacement, inactive component maintenance and erroneous event dates; an ability to monitor the condition of a component in real time; and/or an ability to provide vehicle component replacement indications in real time in advance of a component failure event to optimize the useful life of a vehicle component before failure.

It should be understood that aspects are described herein with reference to certain illustrative embodiments. The illustrative embodiments described herein are not necessarily intended to show all aspects, but rather are used to describe a few illustrative embodiments. Thus, aspects described herein are not intended to be construed narrowly in view of the illustrative embodiments. In addition, it should be understood that certain features disclosed herein might be used alone or in any suitable combination with other features.

What is claimed is:

1. A method of monitoring a vehicle battery during starter motor cranking events where electrical energy is supplied by the battery to start an engine of a vehicle, the method comprising:
receiving, from a telematics device installed in the vehicle, a plurality of first voltage signals indicating a corresponding plurality of first voltages of the battery at beginnings of corresponding cranking events;
receiving, from the telematics device, a plurality of second voltage signals indicating a corresponding plurality of second voltages of the battery at completions of the corresponding cranking events;
determining, by a controller, a plurality of dwell times that occurred during the corresponding cranking events, the dwell times being the times for the second voltages to reach steady state for recharging the battery;
monitoring the plurality of dwell times over a time period;
determining, by the controller, a variance of the plurality of dwell times for the time period; and
generating a prediction of a health of the vehicle battery based, at least in part, on the plurality of dwell times and the variance of the plurality of dwell times.

2. The method of claim 1, wherein:
generating the prediction of the health of the vehicle battery comprises generating a prediction of the health of the vehicle battery based, at least in part, on an increase in dwell time over the time period.

3. The method of claim 2, wherein generating the prediction of the health of the vehicle battery comprises generating a prediction of whether and/or when the vehicle battery will fail based, at least in part, on an environmental condition.

4. The method of claim 3, wherein generating the prediction of whether and/or when the vehicle battery will fail based, at least in part, on an environmental condition comprises generating a prediction of whether and/or when the vehicle battery will fail based, at least in part, on temperature.

5. The method of claim 1, further comprising providing at least one of a warning status and a replace status of the battery.

6. A system configured for monitoring a vehicle battery during starter motor cranking events where electrical energy is supplied by the battery to start an engine of a vehicle, the system comprising:
a telematics device configured to be installed in the vehicle, the telematics device configured to receive a plurality of first voltage signals indicating a corresponding plurality of first voltages of the battery at beginnings of corresponding cranking events and a plurality of second voltage signals indicating a corresponding plurality of second voltages of the battery at completions of the corresponding cranking events, the telematics device including a communication module; and,
a controller disposed at a remote site and configured to communicate with the telematics device, the controller configured to receive the plurality of first and second voltage signals and configured to determine a plurality of dwell times that occurred during the corresponding cranking events, the dwell times being the times for the second voltages to reach steady state for recharging the battery,
wherein the controller is further configured to monitor the plurality of dwell times over a time period, determine a variance of the plurality of dwell times for the time period, and generate a prediction of a health of the vehicle battery based, at least in part, on the plurality of dwell times and the variance of the plurality of dwell times.

7. The system of claim 6, wherein the prediction is based, at least in part, on an increase in dwell time over the time period.

8. The system of claim 7, wherein the prediction is based, at least in part, on an environmental condition.

9. The system of claim 7, wherein the environmental condition comprises temperature.

10. The system of claim 6, wherein the telematics device is configured to provide at least one of a warning status and a replace status of the battery.

* * * * *